(12) United States Patent
Eisele et al.

(10) Patent No.: US 11,291,214 B2
(45) Date of Patent: Apr. 5, 2022

(54) PROTEASES FOR HIGH PROTEIN FERMENTED MILK PRODUCTS

(71) Applicant: DuPont Nutrition Biosciences APS, Copenhagen K (DK)

(72) Inventors: Thomas Eisele, Copenhagen K (DK); Hans Christian Bejder, Brabrand (DK); Enrique Guillermo D'Argence Vargas, Midtjylland (DK)

(73) Assignee: DuPont Nutrition Biosciences APS

( * ) Notice: Subject to any disclaimer, the term of this patent is extended or adjusted under 35 U.S.C. 154(b) by 201 days.

(21) Appl. No.: 15/552,372

(22) PCT Filed: Jan. 28, 2016

(86) PCT No.: PCT/US2016/015299
§ 371 (c)(1),
(2) Date: Aug. 21, 2017

(87) PCT Pub. No.: WO2016/164096
PCT Pub. Date: Oct. 13, 2016

(65) Prior Publication Data
US 2018/0042253 A1 Feb. 15, 2018

Related U.S. Application Data

(60) Provisional application No. 62/143,639, filed on Apr. 6, 2015.

(51) Int. Cl.
*A23C 9/127* (2006.01)
*A23C 9/12* (2006.01)
(Continued)

(52) U.S. Cl.
CPC ............ *A23C 9/1275* (2013.01); *A23C 9/123* (2013.01); *A23C 9/1209* (2013.01); *A23C 9/1234* (2013.01); *A23C 9/1238* (2013.01); *A23C 9/1307* (2013.01); *A23C 9/137* (2013.01); *A23C 9/1422* (2013.01); *A23C 13/16* (2013.01); *C12Y 304/17* (2013.01); *C12Y 304/21* (2013.01); *C12Y 304/24* (2013.01)

(58) Field of Classification Search
None
See application file for complete search history.

(56) References Cited

U.S. PATENT DOCUMENTS

| 4,379,170 A | 4/1983 | Hettinga et al. |
| 6,287,841 B1 | 9/2001 | Mulleners et al. |

(Continued)

FOREIGN PATENT DOCUMENTS

| EP | 0981965 A1 | 3/2000 |
| EP | 1186244 A2 | 3/2002 |

(Continued)

OTHER PUBLICATIONS

Campbell et al., Dietary Protein and Resistance Training Effects on Muscle and Body Composition in Older Persons, Journal of the American College of Nutrition, Dec. 2007, 26(6), 696-703.
Chever et al., High-Protein fat-free acid milk gels: Control of protein composition and heat treatment, International Dairy Journal, Jul. 2014, 37, 95-103.
(Continued)

*Primary Examiner* — Felicia C Turner

(57) ABSTRACT

The present disclosure provides compositions, methods, and uses concerning the enzymatic preparation of a fermented milk product.

11 Claims, 22 Drawing Sheets
Specification includes a Sequence Listing.

(51) Int. Cl.
*A23C 9/123* (2006.01)
*A23C 9/13* (2006.01)
*A23C 13/16* (2006.01)
*A23C 9/137* (2006.01)
*A23C 9/142* (2006.01)

(56) References Cited

U.S. PATENT DOCUMENTS

| | | | |
|---|---|---|---|
| 2005/0095316 A1 | 5/2005 | De Greeftrial et al. | |
| 2007/0003667 A1* | 1/2007 | Klaenhammer | C07K 14/335 426/43 |
| 2011/0045572 A1* | 2/2011 | Roggen | A21D 2/267 435/222 |
| 2012/0021093 A1* | 1/2012 | Qvist | A23C 9/1209 426/43 |
| 2012/0107907 A1* | 5/2012 | Shaw | C11D 3/386 435/221 |
| 2013/0230623 A1* | 9/2013 | Sibakov | A23C 9/1206 426/42 |

FOREIGN PATENT DOCUMENTS

| | | |
|---|---|---|
| WO | 89/06270 A1 | 7/1989 |
| WO | 89/06279 A1 | 7/1989 |
| WO | 92/19729 A1 | 11/1992 |
| WO | 94/25583 A1 | 11/1994 |
| WO | 98/20115 A1 | 5/1998 |
| WO | 03/047358 A1 | 6/2003 |
| WO | 2004/085607 A2 | 10/2004 |
| WO | 2014/095543 A1 | 6/2014 |
| WO | 2014/177644 A1 | 11/2014 |
| WO | WO 2015/014742 * 2/2015 | ............... A23L 2/52 |

OTHER PUBLICATIONS

Hayes et al., Effect of whey protein isolate on strength, body composition and muscle hypertrophy during resistance training, Current Opinion in Clinical Nutrition and Metabolic Care, Jan. 2008, 11(1), 40-44.

Loveday et al., Physicochemical changes in a model protein bar during storage, Food Research International, Aug. 2009, 42(7), 798-806.

Luhovyy et al., Whey Proteins in the Regulation of Food Intake and Satiety, Journal of American College of Nutrition, Dec. 2007, 26(6), 704-712.

Kumar et al., Effects of enzymatic modification of milk proteins on flavour and textural qualities of set yoghurt, J. Sci. Food Agric., vol. 81, No. 1, Nov. 27, 2000, 42-45.

Vijaya et al., Effect of enzymatic hydrolysis of proteins on growth of Bifidobacterium bifidus in milk, J. Sci. Food Agric., vol. 82, No. 5, Feb. 15, 2002, 493-496.

Zhang et al., Influence of casein hydrolysates on the growth of lactic acid production of *Lactobacillus delbrueckii* subsp. *bulgaricus* and *Streptococcus thermophilus*, International Journal of Food Science and Technology, vol. 46, No. 5, Mar. 28, 2011, 1014-1020.

Purwanti et al., New directions towards structure formation and stability of protein rich foods from globular proteins, Trends in Food Science & Technology, 21 (Feb. 2010) 85-94.

Rawlings et al., Evolutionary families of peptidases, Biochem. J., 290, Feb. 1993, 205-218.

International Search Report and Written Opinion issued in PCT/US2016/015299 dated Jun. 29, 2016, 24 pgs.

Beaulieu et al., Thermal Aggregation of Whey Proteins in Model Solutions as Affected by Casein/Whey Protein Ratios, Journal of Food Science, 64(5), Sep. 1999, 776-780.

* cited by examiner

Figure 2 (cont.)
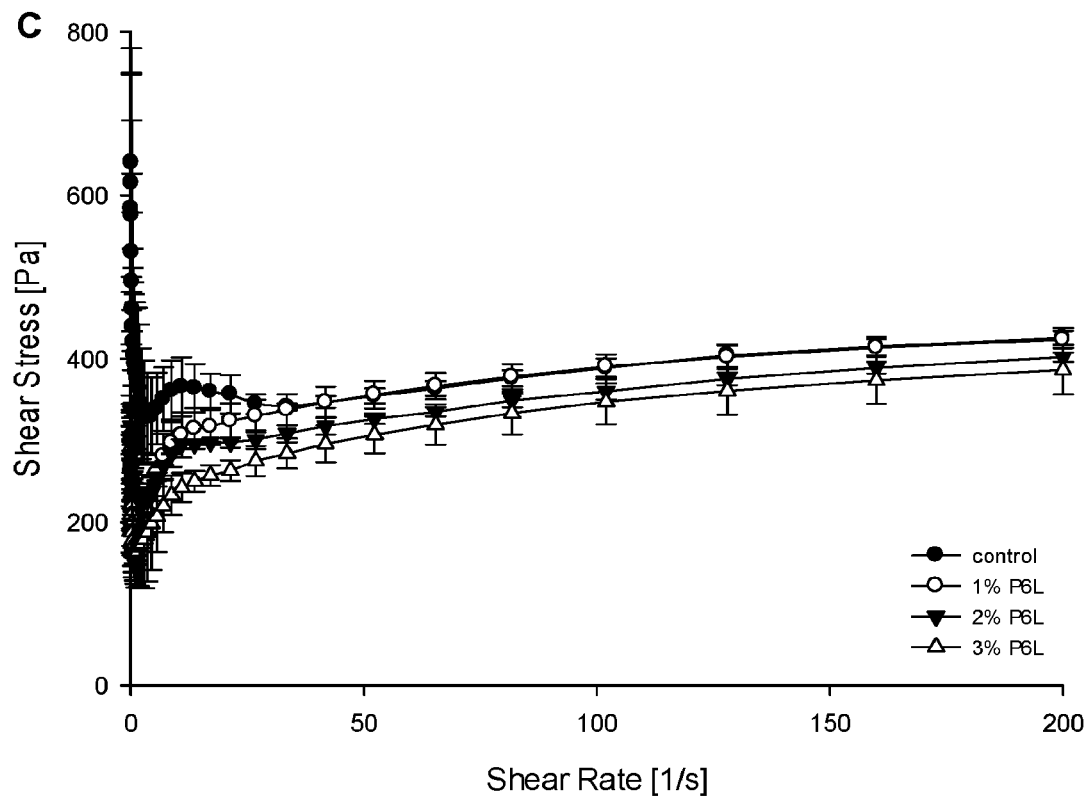
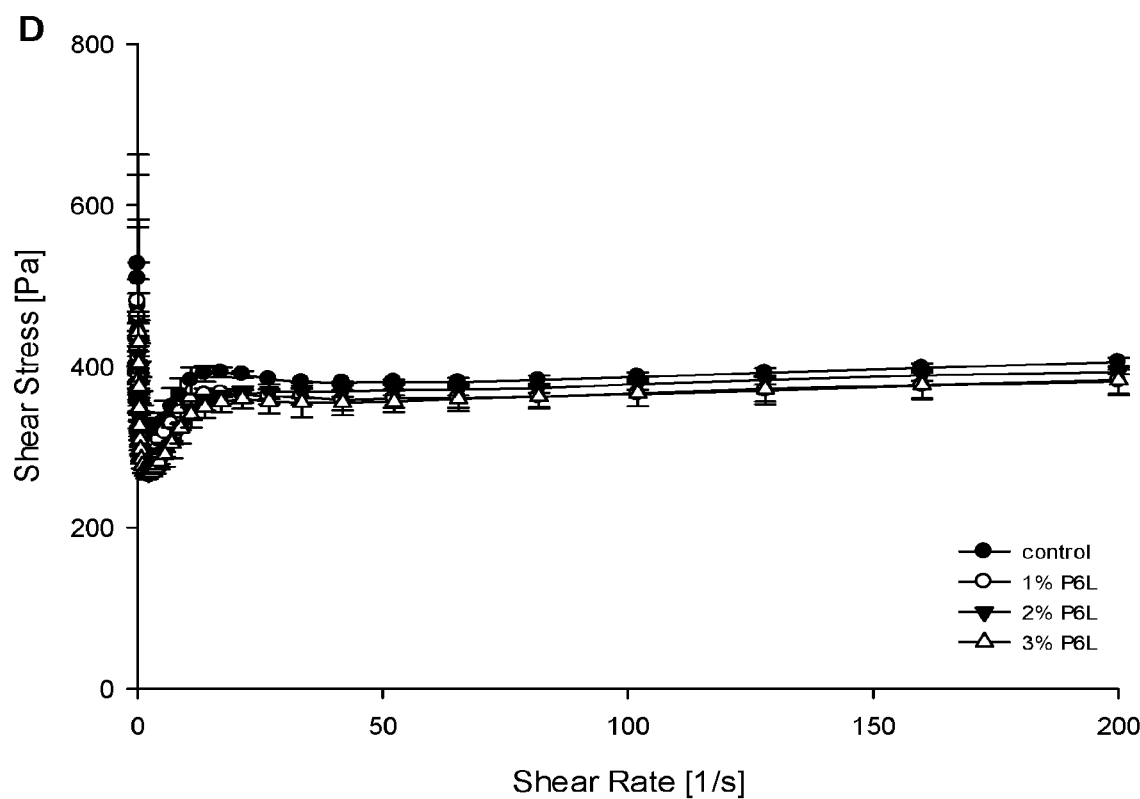

Figure 3 (cont.)
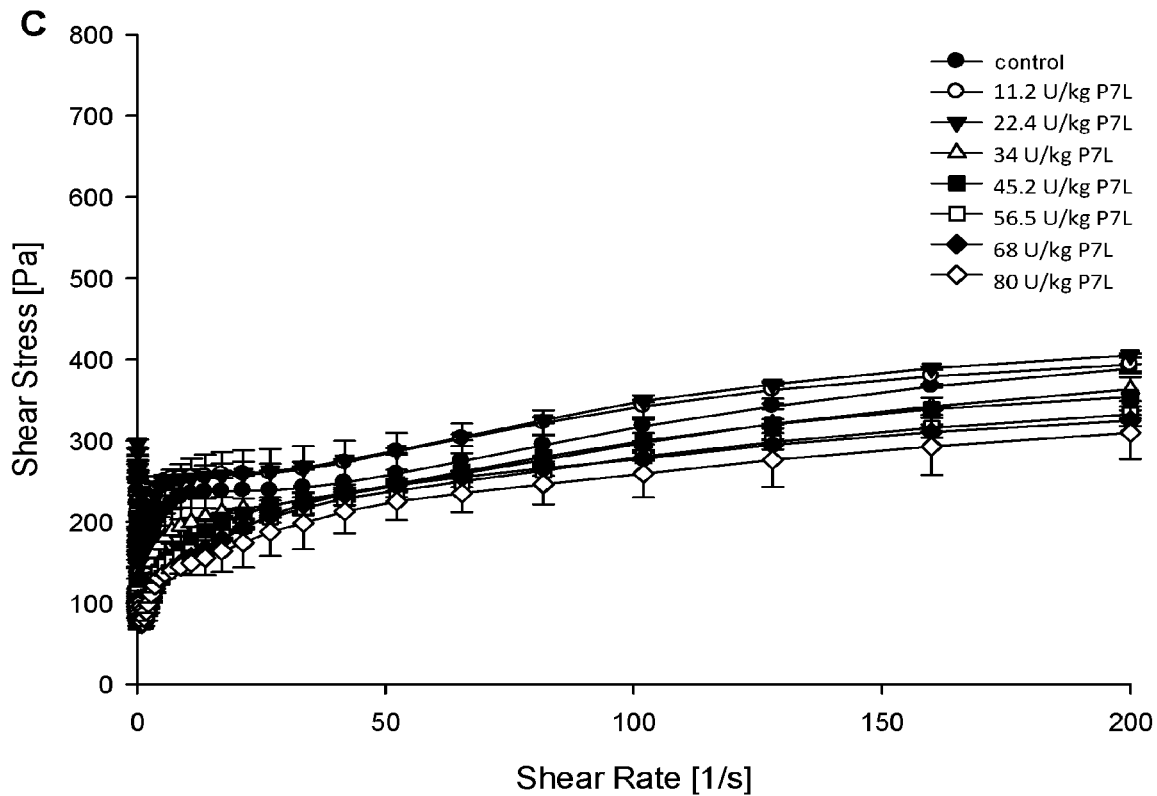
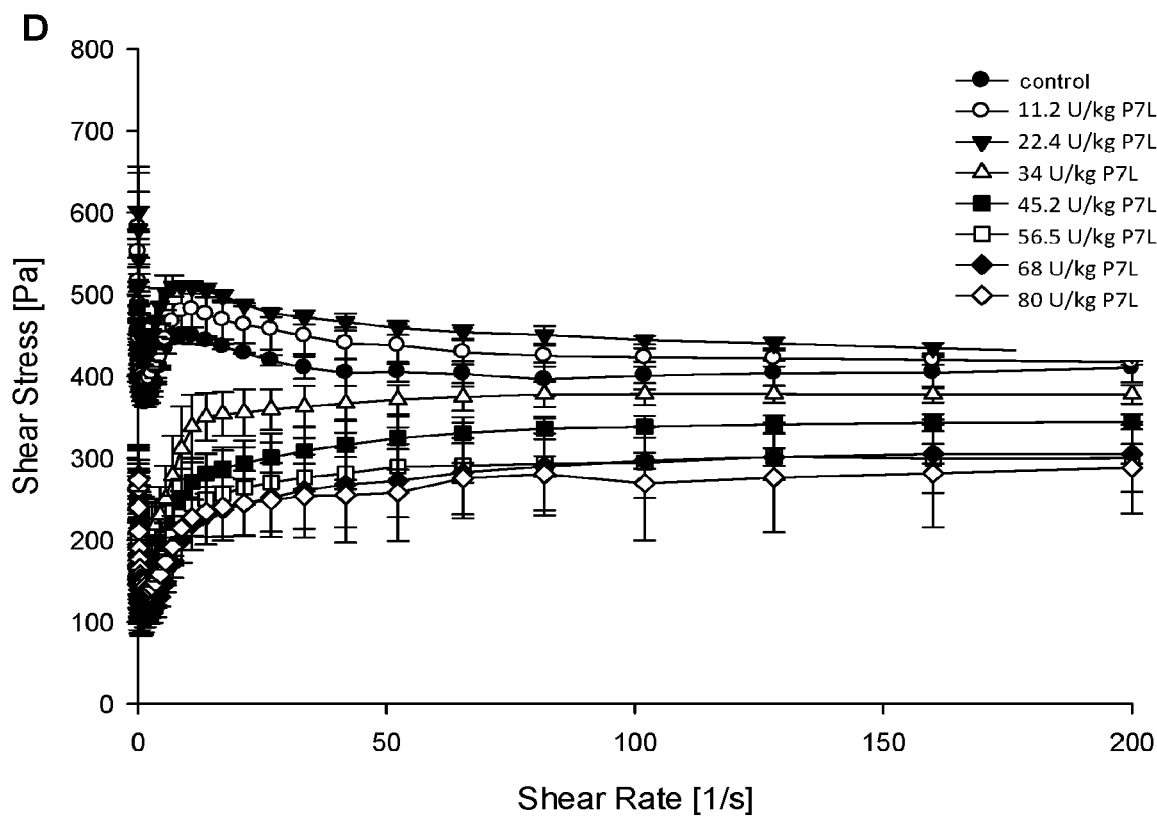

Figure 8

A. Sequence ID NO 1:
AQSVP WGISR VQAPA AHNRG LTGSG VKVAV LDTGI STHPD LNIRG GASFV
PGEPS TQDGN GHGTH VAGTI AALDN SIGVL GVAPS AELYA VKVLG ASGSG
AISSI AQGLE WAGNN GMHVA NLSLG SPSPS ATLEQ AVNSA TSRGV LVVAA
SGNSG AGSIS YPARY ANAMA VGATD QNNNR ASFSQ YGAGL DIVAP GVNVQ
STYPG STYAS LNGTS MATPH VAGAA ALVKQ KNPSW SNVQI RNHLK NTATS
LGSTN LYGSG LVNAE AATR B. Sequence ID NO 2:
AQTVP YGIPL IKADK VQAQG FKGAN VKVAV LDTGI QASHP DLNVV GGASF
VAGEA YNTDG NGHGT HVAGT VAALD NTTGV LGVAP SVSLY AVKVL NSSGS
GSYSG IVSGI EWATT NGMDV INMSL GGASG STAMK QAVDN AYARG VVVVA
AAGNS GSSGN TNTIG YPAKY DSVIA VGAVD SNSNR ASFSS VGAEL EVMAP
GAGVY STYPT NTYAT LNGTS MASPH VAGAA ALILS KHPNL SASQV RNRLS
STATY LGSSF YYGKG LINVE AAAQ

The full amino acid sequence of NP7L (SEQ ID NO:3) Genebank id: P06832 (GI:128528) *Bacillus amyloliquefaciens*.

```
MGLGKKLSVAVAASFMSLTISLPGVQAAENPQLKENLTNFVPKHSLVQSELPSVSDKAIKQYLKQNGKVFKGNPS
ERLKLIDQTTDDLGYKHFRYVPVVNGVPVKDSQVIIHVDKSNNVYAINGELNNDVSAKTANSKKLSANQALDHAY
KAIGKSPEAVSNGTVANKNKAELKAAATKDGKYRLAYDVTIRYIEPEPANWEVTVDAETGKILKKQNKVEHAATT
GTGTTLKGKTVSLNISSESGKYVLRDLSKPTGTQIITYDLQNREYNLPGTLVSSTTNQFTTSSQRAAVDAHYNLG
KVYDYFYQKFNRNSYDNKGGKIVSSVHYGSRYNNAAWIGDQMIYGDGDGSFFSPLSGSMDVTAHEMTHGVTQETA
NLNYENQPGALNESFSDVFGYFNDTEDWDIGEDITVSQPALRSLSNPTKYGQPDNFKNYKNLPNTDAGDYGGVHT
NSGIPNKAAYNTITKIGVNKAEQIYYRALTVYLTPSSTFKDAKAALIQSARDLYGSQDAASVEAAWNAVGL
```

B.

The amino acid sequence of *Bacillus pumilus (Bacillus mesentericus)* Neutral protease NprE (SEQ ID NO:4)

```
>sp|P68734|NPRE_BACPU Neutral protease NprE OS=Bacillus pumilus GN=nprE
PE=1 SV=1
AAATGSGTTLKGATVPLNISYEGGKYVLRDLSKPTGTQIITYDLQNRQSRLPGTLVSSTT
KTFTSSSQRAAVDAHYNLGKVYDYFYSNFKRNSYDNKGSKIVSSVHYGTQYNNAAWTGDQMIYGDGDGSFFSPLS
GSLDVTAHEMTHGVTQETANLIYENQPGALNESFSDVFGYFNDTEDWDIGEDITVSQPALRSLSNPTKYNQPDNY
ANYRNLPNTDEGDYGGVHTNSGIPNKAAYNTITKLGVSKSQQIYYRALTTYLTPSSTFKDAKAALIQSARDLYGS
TDAAKVEAAWNAVGL
```

C.

The amino acid sequence of *Bacillus amyloliquefaciens* peptidase M4 (SEQ ID NO:5)

```
>gi|504283343|ref|WP_014470445.1| peptidase M4 [Bacillus amyloliquefaciens]
MGLGKKLSVAVAASFMSLTISLPGVQAAENPQLKENLTNFVPKHSLVQSELPSVSDKAIKQYLKQNGKVFKGNPS
ERLKLIDQTTDDLGYKHFRYVPVVNGVPVKDSQVIIHVDKSNNVYAINGELNNDVSAKTANSKKLSANQALDHAY
KAIGKSPEAVSNGTVANKNKAELKAAATKDGKYRLAYDVTIRYIEPEPANWEVTVDAETGKILKKQNKVEHAATT
GTGTTLKGKTVSLNISSESGKYVLRDLSKPTGTQIITYDLQNREYNLPGTLVSSTTNQFTTSSQRAAVDAHYNLG
KVYDYFYQKFNRNSYDNKGGKIVSSVHYGSRYNNAAWIGDQMIYGDGDGSFFSPLSGSMDVTAHEMTHGVTQETA
NLNYENQPGALNESFSDVFGYFNDTEDWDIGEDITSQPALRSLSNPTKYGQPDNFKNYKNLPNTDAGDYGGVHTN
SGIPNKAAYNTITKIGVNKAEQIYYRALTVYLTPSSTFKDAKAALIQSARDLYGSQDAASVEAAWNAVGL
```

E.

The amino acid sequence of NP14L from *Bacillus thermoproteolyticus* (SEQ ID NO:6)

```
>gi|441267|emb|CAA54291.1| thermolysin [Bacillus thermoproteolyticus]
MKMKMKLASFGLAAGLAAQVFLPYNALASTEHVTWNQQFQTPQFISGDLLKVNGTSPEELVYQYVEKNENKFKFH
ENAKDTLQLKEKKNDNLGFTFMRFQQTYKGIPVFGAVVTSHVKDGTLTALSGTLIPNLDTKGSLKSGKKLSEKQA
RDIAEKDLVANVTKEVPEYEQGKDTEFVVYVNGDEASLAYVVNLNFLTPEPGNWLYIIDAVDGKILNKFNQLDAA
KPGDVKSITGTSTVGVGRGVLGDQKNINTTYSTYYYLQDNTRGGIFTYDAKYRTTLPGSLWADADNQFFASYDAP
AVDAHYYAGVTYDYYKNVHNRLSYDGNNAAIRSSVHYSQGYNNAFWNGSQMVYGDGDGQTFIPLSGGIDVVAHEL
THAVTDYTAGLIYQNESGAINEAMSDIFGTLVKFYANKNPDWEIGEDVYTPGISGDSLRSMSDPAKYGDPDHYSK
RYTGTQDNGGVHINSGIINKAAYLISQGGTHYGVSVVGIGRDKLGKIFYRALTQYLTPTSNFSQLRAAAVQSATD
LYGSTSQEVASVKQAFDAVGK
```

F.

The full amino acid sequence of GOI269 from *Penicillium oxalicum (SEQ ID NO:7)*

Figure 9 (cont.)

```
MVCHSLAPFVVLVTSLFFLQAKCSPVVFEQRGICATEDPDTSFLDALERVRTDETQLPDTGSEARNGPIEIETWF
HIITSKAEQDQVSDDMIESQISILQDAYQDAGIQYRLQGVTRHVNDVWARNGDDTGMKSALRKGTYRTLNVYFQT
DLQASPDQAGRASHRGASHSSDLSSSVLGFCTLPDPSVNATSPRADYIKDGCNVLASAMSGGTLDLYNRGGTAIH
EIGHWNGLLHTFQGESCAEDNPGDYIADTPQQSVPTGGCPARKDSCPNLPGQDPIHDFMDYSSDVCYESFTPGQN
ERMRNMWASMRAGK
```

G.

The gene sequence of GO1269 from *Penicillium oxalicum* (SEQ ID NO:8)

```
ATGGTCTGTCACTCTTTAGCTCCGTTCGTGGTTCTTGTCACATCTCTCTTTTTCTTGCAAGCGAAATGCAGCCCC
GTGGTGTTTGAACAGCGTGGCATCTGCGCTACCGAAGATCCAGATACGTCCTTCTTGGACGCACTCGAGCGTGTC
AGAACAGATGAGACCCAGCTACCTGACACTGGGTCAGAGGCCCGCAACGGCCCCATCGAGATTGAGACCTGGTTC
CATATCATCACCAGCAAAGCAGAGCAAGACCAGGTTTCTGATGACATGATCGAGTCCCAGGTAAGTCCTACCTCC
ATCGCTCCTGTTCTCGACGACTTCAATCGCATGTCATGAACGAATGCTAAGACACTCGCCTAGATCTCCATTCTA
CAAGATGCGTATCAGGATGCCGGTATTCAATATCGACTGCAAGGTGTCACCCGCCATGTGAACGATGTTTGGGCT
CGCAACGGAGATGACACAGGCATGAAGTCAGCCCTTCGAAAAGGGACCTATCGGACTCTAAACGTTTACTTCCAA
ACCGACCTCCAGGCATCACCCGACCAAGCCGGTCGTGCAAGCCACCGCGGAGCTTCTCATTCAAGTGATCTCTCA
TCCAGCGTGCTAGGATTCTGCACCCTCCCCGATCCAAGCGTGAATGCCACCAGTCCCCGTGCCGACTACATTAAG
GATGGCTGCAACGTTCTCGCTAGCGCGATGTCCGGAGGCACATTGGACCTTTACAACCGAGGAGGAACCGCCATC
CACGAGATCGGACATTGGAATGGCCTTTTGCATACCTTCCAAGGGGAGTCCTGTGCCGAGGATAATCCAGGGGAC
TACATTGCCGACACGCCCCAACAATCTGTCCCAACTGGCGGATGCCCTGCTCGAAAGGATTCTTGTCCCAATTTG
CCGGGGCAGGACCCCATCCACGACTTTATGGACTACTCATCTGATGTCTGTTATGAGAGTTTTACACCTGGTCAG
AATGAACGTATGCGAAATATGTGGGCATCGATGCGTGCAGGGAAATAG
```

H.

The full amino acid sequence of a metalloprotease from *Aspergillus oryzae* (SEQ ID NO:9)

```
MSHFPTLHILILVIANLQIQCFAFVSQSRGFCATGPPTESLKAEYRRLSALGSQSYNP
VDSESRAAITPIVIDTWFHIITGEAGTELISDEMIADQLSYLQNAYWNATISYRLQGVTR
SANDTWARNEDEMAMKTVLRRGSYRTLNVYFHTDLQASPNAGARAFDIVRRELGVSQQQPTSMLGFCTLPDPSIN
ASSPPSTYIKDGCNVLAETMPGGSLAHYNRGGTAIHEIGHWNGLLHTFEGESCSSDNEGDFIADTPQQSKPTEGC
PAQKDSCPELPGFDAIHNFMDYSSDECYDSFTPDQVSRMRSMWFAMRDGK
```

I.

The amino acid sequence of *Bacillus subtilis* Neutral protease NprE (SEQ ID NO:11)
GenBank: BAJ41480.1

```
>gi|315013412|dbj|BAJ41480.1| neutral protease [Bacillus subtilis]
MGLGKKLSVAVAASFMSLTISLPGVQAAENPQLKENLTNFVPKHSLVQSELPSVSDKAIKQYLKQNGKVF
KGNPSERLKLIDHTTDDLGYKHFRYVPVVNGVPVKDSQVIIHVDKSNNVYAINGELNNDASAKTANSKKL
SANQALDHAFKAIGKSPEAVSNGNVANKNKAELKAAATKDGKYRLAYDVTIRYIEPEPANWEVTVDAETG
KVLKKQNKVEHAAATGTGTTLKGKTVSLNISSENGKYVMRDLSKPTGTQIITYDLQNRQYNLPGTLVSST
TNQFTTSSQRAAVDAHYNLGKVYDYFYQTFKRNSYDNRGGKIVSSVHYGSRYNNAAWXGDQMIYGDGDGS
FFSPLSGSMDVTAHEMTHGVTQETANLNYENQPGALNESFSDVFGYFTDTEDWDIGEDITVSQPALRSLS
NPTKYGQPDHYKNYQNLPNTDAGDYGGVHTNSGIPNKAAYNTITKIGVKKAEQIYYRALTVYLTPSSSFK
DAKAALIQSARDLYGSQDAASVEAAWNAVGL
```

J.

PNGase A (Peptide-N(4)-(N-acetyl-beta-D-glucosaminyl) asparagine amidase F) from *Elizabethkingia miricola* (*Chryseobacterium miricola*) (SEQ ID NO:12)

```
>sp|P21163|PNGF_ELIMR Peptide-N(4)-(N-acetyl-beta-D-glucosaminyl)asparagine
amidase F OS=Elizabethkingia miricola GN=ngl PE=1 SV=2
MRKLLIFSISAYLMAGIVSCKGVDSATPVTEDRLALNAVNAPADNTVNIKTFDKVKNAFG
DGLSQSAEGTFTFPADVTTVKTIKMFIKNECPNKTCDEWDRYANVYVKNKTTGEWYEIGR
```

Figure 9 (cont.)

```
FITPYWVGTEKLPRGLEIDVTDFKSLLSGNTELKIYTETWLAKGREYSVDFDIVYGTPDY
KYSAVVPVIQYNKSSIDGVPYGKAHTLGLKKNIQLPTNTEKAYLRTTISGWGHAKPYDAG
SRGCAEWCFRTHTIAINNANTFQHQLGALGCSANPINNQSPGNWAPDRAGWCPGMAVPTR
IDVLNNSLTGSTFSYEYKFQSWTNNGTNGDAFYAISSFVIAKSNTPISAPVVTN
```

K.

The gene sequence encoding NP7L(SEQ ID NO:10)

```
ORIGIN      711 bp upstream of PvuI site.
        1 gatcttaaca tttttcccct atcattttc ccgtcttcat ttgtcatttt ttccagaaaa
       61 aatcgcgtca ttcgactcat gtctaatcca acacgtgtct ctcggcttat cccctgacac
      121 cgcccgccga cagcccgcat gggacgattc tatcaattca gccgcggagt ctagttttat
      181 attgcagaat gcgagattgc tggtttatta taacaatata agttttcatt attttcaaaa
      241 aggggatttt attgtgggtt taggtaagaa attgtctgtt gctgtcgccg cttcctttat
      301 gagtttaacc atcagtctgc cgggtgttca ggccgctgag aatcctcagc ttaaagaaaa
      361 cctgacgaat tttgtaccga agcattcttt ggtgcaatca gaattgcctt ctgtcagtga
      421 caaagctatc aagcaatact tgaaacaaaa cggcaaagtc tttaaaggca atccttctga
      481 aagattgaag ctgattgacc aaacgaccga tgatctcggc tacaagcact tccgttatgt
      541 gcctgtcgta aacggtgtgc ctgtgaaaga ctctcaagtc attattcacg tcgataaatc
      601 caacaacgtc tatgcgatta acggtgaatt aaacaacgat gtttccgcca aacggcaaa
      661 cagcaaaaaa ttatctgcaa atcaggcgct ggatcatgct tataaagcga tcggcaaatc
      721 acctgaagcc gtttctaacg gaaccgttgc aaacaaaaac aaagccgagc tgaaagcagc
      781 agccacaaaa gacggcaaat accgcctcgc ctatgatgta accatccgct acatcgaacc
      841 ggaacctgca aactgggaag taaccgttga tgcggaaaca ggaaaaatcc tgaaaaagca
      901 aaacaaagtg gagcatgccg ccacaaccgg aacaggtacg actcttaaag gaaaaacggt
      961 ctcattaaat atttcttctg aaagcggcaa atatgtgctg cgcgatcttt ctaaacctac
     1021 cggaacacaa attattacgt acgatctgca aaaccgcgag tataacctgc cgggcacact
     1081 cgtatccagc accacaaacc agtttacaac ttcttctcag cgcgctgccg ttgatgcgca
     1141 ttacaacctc ggcaaagtgt atgattattt ctatcagaag tttaatcgca acagctacga
     1201 caataaaggc ggcaagatcg tatcctccgt tcattacggc agcagataca ataacgcagc
     1261 ctggatcggc gaccaaatga tttacggtga cggcgacggt tcattcttct cacctctttc
     1321 cggttcaatg gacgtaaccg ctcatgaaat gacacatggc gttacacagg aaacagccaa
     1381 cctgaactac gaaaatcagc cgggcgcttt aaacgaatcc ttctctgatg tattcgggta
     1441 cttcaacgat actgaggact gggatatcgg tgaagatatt acggtcagcc agccggctct
     1501 ccgcagctta tccaatccga caaatacgg acagcctgat aatttcaaaa attacaaaaa
     1561 ccttccgaac actgatgccg gcgactacgg cggcgtgcat acaaacagcg gaatcccgaa
     1621 caaagccgct tacaatacga ttacaaaaat cggcgtgaac aaagcggagc agatttacta
     1681 tcgtgctctg acggtatacc tcactccgtc atcaactttt aaagatgcaa aagccgcttt
     1741 gattcaatct gcgcgggacc tttacggctc tcaagatgct gcaagcgtag aagctgcctg
     1801 gaatgcagtc ggattgtaaa caagaaaaga gaccggaaat ccggtctctt ttttatatct
     1861 aaaacatttt cacagtggct tcaccatgat catatatgtc ttttcccg
```

L.

PNGase F from *Elizabethkingia meningoseptica* (*Chryseobacter

Figure 9 (cont.)

```
>tr|A0A090KI56|A0A090KI56_ELIME N-glycanase peptide (Fragment)
OS=Elizabethkingia meningoseptica GN=PNGase F-II PE=2 SV=1
MLFFLPLLKTNLMQKILLCSLITGAQMIFAQTYEITYQNSFEGKINPNQNHIISITNSDK
TLLFNEKIKNKKADFPFEVNEINRKNNEVSQFAFLNNNEIVKTSDNTILAKQEFKPTSET
GKILGYNVKKAVTSVNSNTIEVWYTNDLKVKGGPSILGQDLGLVLKTVRNGSSVVEATSV
KKIKALDDQSLFNGKNITEKDALTYKDMIWKSRFITIPVFENETINFSDASKSDQVIQRF
GNGTIILKKVKIPEIKQGNTIFVELKQKSNGDAYDRTGDVFIIPQERAISYYTGLTQGVK
SLPVYQNGNGKSYQGVALTPDYLPFIELMRFFTPFGIGHFNEKIQLKGKNWHNNTPYRQD
ITELRPQLSGKEILIGAFIGNYDKGGHQISLELSIHPDQQKIVNNNFVLPVFNTTNVMEM
AGQDYPTMFNSDKGVEVEFILTKDLKNAQLRYITTGHGGWGAGDEFVPKENSIYLDGKLA
HAFTPWRTDCGSYRLFNPASGNFEDGLSSSDLSRSNWCPGTITNPVYINLGNLNAGKHTI
QVKIPQGAPEGSSQSFWNVSGVLLGQE
```

M.

Endoglycosidase H (Endo-beta-N-acetylglucosaminidase H) from *Streptomyces plicatus* (SEQ ID NO:14)

```
>sp|P04067|EBAG_STRPL Endo-beta-N-acetylglucosaminidase H OS=Streptomyces
plicatus PE=1 SV=1
MFTPVRRRVRTAALALSAAAALVLGSTAASGASATPSPAPAPAPAPVKQGPTSVAYVEVN
NNSMLNVGKYTLADGGGNAFDVAVIFAANINYDTGTKTAYLHFNENVQRVLDNAVTQIRP
LQQQGIKVLLSVLGNHQGAGFANFPSQQAASAFAKQLSDAVAKYGLDGVDFDDEYAEYGN
NGTAQPNDSSFVHLVTALRANMPDKIISLYNIGPAASRLSYGGVDVSDKFDYAWNPYYGT
WQVPGIALPKAQLSPAAVEIGRTSRSTVADLARRTVDEGYGVYLTYNLDGGDRTADVSAF
TRELYGSEAVRTP
```

N.

N-acetyl galactosaminidase, alpha from *Schistosoma japonicum* (SEQ ID NO:15)

```
>tr|C1L5R3|C1L5R3_SCHJA N-acetyl galactosaminidase, alpha OS=Schistosoma
japonicum GN=Naga PE=2 SV=1
MIFYRLLGLIFILETIILISSNVYGLDNGLARTPPMGWMTWQRFRCQIDCKEYPNDCINE
NLIKRTADKLVLNGWRDLGYKYVIIDDCWPARKRDSKTNELVPDPDRFPNGMKNVGEYLH
SKNLLFGIYLDYGTLTCEGYPGSMNYLELDARSIAEWKVDYVKMDGCYSLPNIQPEGYEN
FSRLLNTTGRPMVFSCSYPAYISWINNIKLIDWNRLKKNCNLWRVLGDIQDSLSSVVSII
KCL
```

O.

Dispase (EC=3.4.24.28) a M4 member from *Paenibacillus polymyxa* (syn. *bacillolysin*, Neutral protease, npr ). (SEQ ID NO:16)

```
>gi|515235879|ref|WP_016820063.1| bacillolysin [Paenibacillus polymyxa]
MKKVWFSLLGGAMLLGSVASGASAESSVSGPAQLTPTFHAEQWKAPSSVSGDDIVWSYLNRQKKSLLGVD
SSSVREQFRIVDRTSDKSGVSHYRLKQYVNGIPVYGAEQTIHVGKSGEVTSYLGAVINEDQQEEATQGTT
PKISASEAVYTAYKEAAARIEALPTSDDTISKDAEEPSSVSKDTYAEAANNDKTLSVDKDELSLDKASVL
KDSKIEAVEAEKSSIAKIANLQPEVDPKAELYYYPKGDDLLLVYVTEVNVLEPAPLRTRYIIDANDGSIV
FQYDIINEATGTGKGVLGDSKSFTTTASGSSYQLKDTTRGNGIVTYTASNRQSIPGTLLTDADNVWNDPA
GVDAHAYAAKTYDYYKSKFGRNSIDGRGLQLRSTVHYGSRYNNAFWNGSQMTYGDGDGSTFIAFSGDPDV
VGHELTHGVTEYTSNLEYYGESGALNEAFSDVIGNDIQRKNWLVGDDIYTPNIAGDALRSMSNPTLYDQP
DHYSNLYKGSSDNGGVHTNSGIINKAYYLLAQGGTFHGVTVNGIGRDAAVQIYYSAFTNYLTSSSDFSNA
RAAVIQAAKDLYGANSAEATAAAKSFDAVGVN
```

Serralysin (EC 3.4.24.40) metallopeptidase family M10 member from *Serratia liquefaciens* (SEQ ID NO:17)

```
>gi|336088533|dbj|BAK39731.1| serralysin-like metalloprotease 1 [Serratia
liquefaciens]
MSICLIENNQLMSGIEPMQSTKKAIEITESSLAAAGSGYNAVDDLLHYHERGNGIQVNGKDSFSTEQAGL
FITRENQTWNGYKVFGQPVKLTFSFPDYKFSSTNVAGDTGLSKFSAEQQQQAKLSLQSWSDVANITFTEV
GAGQKANITFGNYSQDRPGHYDYDTQAYAFLPNTIYQGQNLGGQTWYNVNQSNVKHPASEDYGRQTFTHE
IGHALGLSHPGDYNAGEGNPTYRDASYAEDTREFSLMSYWSETNTGGDNGGHYAAAPLLDDISAIQHLYG
ANLTTRTGDTVYGFNSNTGRDFLSTTSNSQKVIFAAWDAGGNDTFDFSGYTANQRINLNEKSFSDVGGLK
GNVSIAAGVTIENAIGGSGNDVIVGNAANNVLKGGAGNDVLFGGGGADELWGGAGKDTFVFSAVSDSAPG
ASDWIKDFQKGIDKIDLSFFNQGAQGGDQIHFVDHFSGAAGEALLSYNASNNVSDLALNIGGHQAPDFLV
KIVGQVDVATDFIV
```

Q.

Metalloprotease family M4 member from *Aspergillus niger* (SEQ ID NO:18)

```
>gi|145246810|ref|XP_001395654.1| thermolysin metallopeptidase, alpha-
helical domain protein [Aspergillus niger CBS 513.88]
MSARNNHTYTFIQPQILQHISTSPNASSKARRAATRTLTLANEIHQTRVSSSPYISLTSHAQAREIYDCR
NKRGLPGLLVRTESSSAPTTQDDTVNHVYNSFGIFLHFLSSVLGRQSIDNDNLRLIGCLHYDKNLDNAFW
NGQEIIFGDGDGVYFAGFPKSLDVVVHELMHGVTDHTAGLLYEGQSGALSESISDVFACVIEQWWRGQGV
EEADWVVGRGVFVWPKGKKGAGAGAGEMGLRSLKAPGTAYDDPVLGRDGQPSHMKELVCTEEDNGGVHWN
SGIPSHAFYLCAVEFGGRSWEKAAIVWYRALLDPRVEPNCSFQRFASVTVDIAEAMFGGEAGEVVKRAWV
AVGVEVGMVLWTVKGDTGC
```

R.

Metalloprotease family M4 member from *Aspergillus terreus* (SEQ ID NO:19)

```
>gi|115437122|ref|XP_001217731.1| metalloprotease [Aspergillus terreus
NIH2624]
MAHLCAFVPQYVLEGIVEKGLAPEHIINRCQSTIDKTTQLRDTRGRHVQSIAAAQQQRISQGIIPPYILE
SIARNPATEQQREAARHTLALSTKHRTAAARGGKLLSEAEDPTNNANECYNGLGKSYDFYFNFFQRNSVD
DNGFELDGFVHAGDLYNAYWDGYELVFGDGDGVIFDGFTDELDVIGHEFSHGVVEHTSPLPYAFQSGALN
ESLADAFGVMIKQWGEGTPKTVDQADWLVGEGIWAEGVNGRALRDMANPGTAYDDPRVGKDPQPAHWKDF
KKLSASDDEGGVHINSGIPNRAFYLAATKIGGYAWEGAGAIWYRALASGKLRKDGKAKFKDFADLTIENA
GEHVDKVREAWTLVGYPFAEERHEL
```

S.

Metalloprotease MEP1 from *Aspergillus kawachii* IFO 4308 (SEQ ID NO:20)

```
>gi|358369009|dbj|GAA85625.1| metalloprotease MEP1 [Aspergillus kawachii
IFO 4308]
MTLLLNLHALFTAIVFANLSTRCSALLSGRDFCSTPAPDESLRAEHRRLYDLQAQRGSTAEESREVVSMI
EIETWFHIVSSNEASNAVSDDMITSQLSYLQKAYESATISYRLEGITRHINDSWARNDDELGMKNALRRG
IYSTLNVYFQTDLQASSDDTSRGFPYNGNRRTDVSGQSSTTVLGFCTLPDPSVNSSSPRSSYIKDGCNVL
ADTMPGGSLAQYNQGGTAVHEVGHWNGLLHTFEGESCSPDNEGDYIDDTPEQSEPTSGCPAEKDSCPDLP
GLDAIHNFMDYSSDDCYESFTPDQAERMRSMWSAMREGK
```

T.

Metalloprotease from *Aspergillus oryzae* (strain ATCC 42149 / RIB 40) (SEQ ID NO:21)

Figure 9 (cont.)

>gi|169764108|ref|XP_001727954.1| metalloprotease MEP1 [Aspergillus oryzae RIB40]
MSHFPTLHILILVIANLQIQCFAFVSQSRGFCATGPPTESLKAEYRRLSALGSQSYNPVDSESRAAITPI
VIDTWFHIITGEAGTELISDEMIADQLSYLQNAYWNATISYRLQGVTRSANDTWARNEDEMAMKTVLRRG
SYRTLNVYFHTDLQASPNAGARAFDIVRRELGVSQQQPTSMLGFCTLPDPSINASSPPSTYIKDGCNVLA
ETMPGGSLAHYNRGGTAIHEIGHWNGLLHTFEGESCSSDNEGDFIADTPQQSKPTEGCPAQKDSCPELPG
FDAIHNFMDYSSDECYDSFTPDQVSRMRSMWFAMRDGK

U.

Extracellular metalloprotease from *Penicillium roqueforti* (SEQ ID NO:22)

>tr|W6QFK8|W6QFK8_PENRO Extracellular metalloprotease AO090012001025
OS=Penicillium roqueforti FM164 GN=PROQFM164_S04g000479 PE=4 SV=1
MVCHSFFQLVIFITVFLQAWCSPFALQKRGACATEDPGANFLHEVRRLQSDEADLAISQA
RKAPIEIETWFHIISSKSESTQVTDNMINSQFSILQQSYADSGISYRLQGVTRNVNDKWA
SNADDTAMKTTLRKGSYRTLNVYFQTDLQASPEQAGRAFGHRGAVTNNDLASSVLGFCTL
PDPSVNASSPASQYIKDGCNVLAKTMPGGSLDLYNRGGTAIHEIGHWNGLLHTFQGESCS
VDNPGDHISDTPQQSTPTDGCPDQKDSCPDSPGLDAVHDFMDYSSDVCYERFTPGQGERM
RSMWISMREGK

PROTEASES FOR HIGH PROTEIN FERMENTED MILK PRODUCTS

CROSS-REFERENCE TO RELATED APPLICATIONS

This application claims priority under 35 USC § 371 as a National Phase of International Patent Application No. PCT/US2016/015299 (filed Jan. 28, 2016; and published on Oct. 13, 2016 as Publication No. WO2016/164096A1), which claims priority to and the benefit of U.S. Provisional Patent Application No. 62/143,639 titled "Proteases for High Protein Fermented Milk Products", filed Apr. 6, 2015.

INCORPORATION BY REFERENCE OF THE SEQUENCE LISTING

The sequence listing provided in the file named "20160126_NB40943PCT_ST25.txt" with a size of 73,308 bytes which was created on Jan. 26, 2016 and which is filed herewith, is incorporated by reference herein in its entirety.

FIELD OF THE INVENTION

The present invention relates to an enzymatic method of preparing a fermented milk product. The method the method comprises treating a milk substrate comprising a protein content of 4% (w/w) or higher with one or more proteases and a microorganism; and allowing the treated milk substrate to ferment to produce the fermented milk product.

BACKGROUND

Recent studies described the positive effects a higher protein intake can have, such as a better body weight control, higher muscle strength, and the delay in onset of sacropenia (Loveday et al., 2009; Luhovyy et al., 2007; Hayes & Cribb, 2008; Campbell & Leidy, 2007). These positive effects led to a growing demand for protein-enriched products and drove the food-industry to develop more and better products and dealing with the problem of a general low stability of high-protein foods (Labuza et al., 2007; Zhou & Labuza, 2006). One of the major problems in high protein food is that it often changes in nutritive and physical properties over time.

Yogurts with high-protein content may show changes in nutritive as well as of technical properties. While the nutritive changes are mostly advantageous, like the emphasis of the feeling of satiety, the technical properties, for example, the characteristic thickening and gelling properties, cause processing, textural, and rheological changes. In most cases these changes are not favorable (Bertenshaw et al., 2008; Purwanti et al., 2010).

In yogurt, the higher protein content produces a tighter product matrix, where the distance between proteins is reduced, resulting in product hardening and syneresis during storage (Purwanti et al., 2010; Labuza et al., 2007; Zhou & Labuza, 2006). Additionally, aggregation may take place within protein-enriched dairy suspensions during the common heat treatment (Singh & Nath, 2004). Furthermore, the sensory properties are affected by these textural changes, changing sensory properties of the yogurt in terms of firmness, viscosity, and visual appearance, which contribute to acceptability of these products by the consumer (Lee & Lucey, 2004 a,b; Lucey, 2002).

The present disclosure solves these problems by providing compositions, methods, and uses that improve properties (e.g. rheological properties) of high protein milk products, e.g. viscosity of yogurt products and the overall acceptability.

SUMMARY OF THE INVENTION

The present disclosure provides compositions and methods for the preparation of milk products.

Aspects and embodiments of the compositions and methods are set forth in the following separately numbered paragraphs. 1. A method for preparing a fermented milk product, the method comprising:
(a) treating a milk substrate comprising a protein content of 4% (w/w) or higher with one or more proteases and a microorganism; and
(b) allowing the treated milk substrate to ferment to produce the fermented milk product.

2. The method as claimed in paragraph 1, characterized in that the protein content of the milk substrate is 10% (w/w) or higher.

3. The method of paragraph 1 or 2, characterized in that the milk substrate is fortified with protein or concentrated in order to increase its protein content to at least 4% (w/w).

4. The method of any one of the preceding paragraphs, wherein one of said one or more proteases belongs to Enzyme Commission (E.C.) No. 3.4.17, 3.4.21 or 3.4.24.

5. The method of any one of the preceding paragraphs, wherein one of said one or more proteases is from family M4.

6. The method of any one of the preceding paragraphs, wherein one of said one or more proteases is a metalloprotease.

7. The method of paragraph 6, wherein said protease has at least 80, 81, 82, 83, 84, 85, 86, 87, 88, 89, 90, 91, 92, 93, 94, 95, 96, 97, 98 or 99% identity with the amino acid sequence of SEQ ID No.3.

8. The method of paragraph 7, wherein said protease has at least 90% identity with the amino acid sequence of SEQ ID No.3.

9. The method of paragraph 8, wherein said protease has at least 95% identity with the amino acid sequence of SEQ ID No.3.

10. The method of any one of paragraphs 1 to 3, wherein one of said one or more proteases is a subtilisin, a serine protease, an acid protease, or a neutral protease.

11. The method of paragraph 10, wherein said protease has at least 80, 81, 82, 83, 84, 85, 86, 87, 88, 89, 90, 91, 92, 93, 94, 95, 96, 97, 98 or 99% identity with the amino acid sequence of SEQ ID No.1.

12. The method of paragraph 11, wherein said protease has at least 90% identity with the amino acid sequence of SEQ ID No.1.

13. The method of paragraph 12, wherein said protease has at least 95% identity with the amino acid sequence of SEQ ID No.1.

14. The method of paragraph 10, wherein said protease has at least 80, 81, 82, 83, 84, 85, 86, 87, 88, 89, 90, 91, 92, 93, 94, 95, 96, 97, 98 or 99% identity with the amino acid sequence of SEQ ID No.2.

15. The method of paragraph 14, wherein said protease has at least 90% identity with the amino acid sequence of SEQ ID No.2.

16. The method of paragraph 15, wherein said protease has at least 95% identity with the amino acid sequence of SEQ ID No.2.

17. The method of any one of the preceding paragraphs, wherein said milk substrate is treated with said one or more proteases prior to a pasteurization step.

18. The method of any one of the preceding paragraphs, wherein said one or more proteases are added together with said microorganism.

19. The method of any one of the preceding paragraphs, wherein a subtilisin, a serine protease, an acid protease, or a neutral protease is added to the milk substrate prior to a pasteurization step.

20. The method of paragraph 19, wherein a subtilisin or a serine protease is added to the milk substrate prior to a pasteurization step.

21. The method of any one of the preceding paragraphs, wherein a metalloprotease is added together with said microorganism.

22. The method of any one of the preceding paragraphs, wherein a subtilisin or a serine protease is added to the milk substrate prior to a pasteurization step and wherein a metalloprotease is added together with said microorganism.

23. The method of paragraphs 19, 20 or 22, wherein said subtilisin or serine protease has at least 80, 81, 82, 83, 84, 85, 86, 87, 88, 89, 90, 91, 92, 93, 94, 95, 96, 97, 98 or 99% identity with the amino acid sequence of SEQ ID No.1 or SEQ ID No.2.

24. The method of paragraph 21 or 22, wherein the metalloprotease has at least 80, 81, 82, 83, 84, 85, 86, 87, 88, 89, 90, 91, 92, 93, 94, 95, 96, 97, 98 or 99% identity with the amino acid SEQ ID No.3.

25. A method according to any one of the preceding paragraphs, wherein the microorganism is a lactic acid bacterium.

26. A method according to paragraph 25, wherein the microorganism is of the genus *Streptococcus, Lactococcus, Lactobacillus, Leuconostoc, Pseudoleuconostoc, Pediococcus, Propionibacterium, Enterococcus, Brevibacterium*, or *Bifidobacterium* or any combination thereof.

27. A method according to paragraph 25 or 26, wherein the microorganism is the thermophilic culture YO-MIX™ 860.

28. A fermented milk product obtainable by the method as claimed in any of the preceding paragraphs.

29. A fermented milk product which has a protein content of 4% (w/w) or higher and which comprises one or more exogenous proteases and an exogenous microorganism.

30. A fermented milk product of paragraph 29, characterized in that the protein content of the milk substrate is 10% (w/w) or higher.

31. A fermented milk product of paragraph 29 or 30, characterized in that the milk substrate is fortified with protein or concentrated in order to increase its protein content to at least 4% (w/w).

32. A fermented milk product of any one of paragraphs 29-31, wherein one of said one or more proteases belongs to Enzyme Commission (E.C.) No. 3.4.17, 3.4.21 or 3.4.24.

33. A fermented milk product of any one of paragraphs 29-32, wherein one of said one or more proteases is from family M4.

34. A fermented milk product of any one of paragraphs 29-33, wherein one of said one or more proteases is a metalloprotease.

35. A fermented milk product of any one of paragraphs 29-31, wherein one of said one or more proteases is a subtilisin, a serine protease, an acid protease, or a neutral protease.

36. A fermented milk product according to any one of paragraphs 29-25, wherein the microorganism is a lactic acid bacterium.

37. A fermented milk product according to paragraph 36, wherein the microorganism is of the genus *Streptococcus, Lactococcus, Lactobacillus, Leuconostoc, Pseudoleuconostoc, Pediococcus, Propionibacterium, Enterococcus, Brevibacterium* or *Bifidobacterium* or any combination thereof.

38. A fermented milk product according to paragraph 25 or 26, wherein the microorganism is the thermophilic culture YO-MIX™ 860.

39. A fermented milk product according to any one of paragraphs 28 to 38, wherein the fermented milk product is a high protein yogurt, Greek yogurt, Labneh or sour cream.

40. Use of a protease in the production of a fermented high protein milk product for:
(a) improving viscosity;
(b) improving gel strength;
(c) improving texture;
(d) improving firmness of curd;
(e) providing earlier onset of fermentation;
(f) providing earlier onset of gelation;
(g) providing earlier conclusion of fermentation;
(h) reducing syneresis;
(i) improving shelf life;
(j) improving flavor;
(k) reducing stickiness; or
(l) any combination of (a) to (k).

41. A method, fermented milk product or use as substantially hereinbefore described with reference to any one of the Examples.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which:

FIGS. 8 A and B show Seq ID No. 1 and Seq ID. No. 2, respectively.

FIGS. 9 A-C and E-U show the sequence of several enzymes.

DETAILED DESCRIPTION OF THE INVENTION

Figure 1:
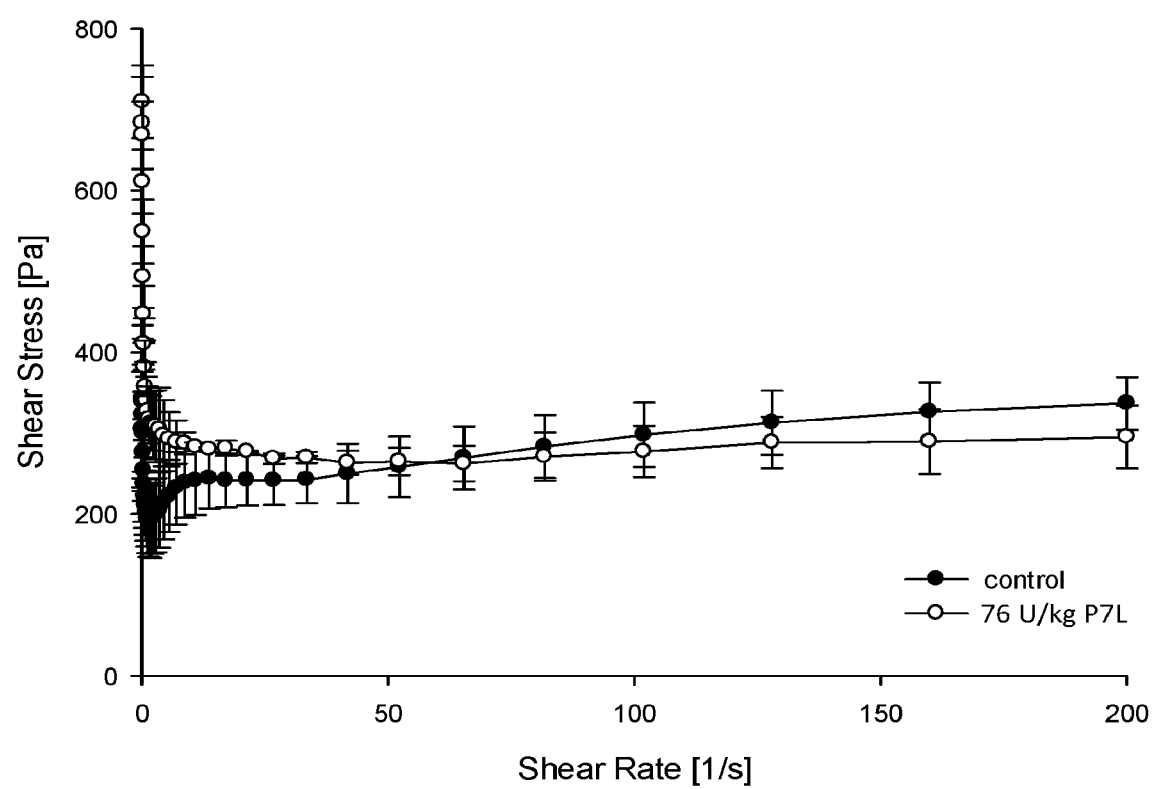
FIG. 1 shows the effect of P7L addition 90 min before pasteurization on shear viscosity of stirred yogurt with a protein content of 10%, after 5 days of storage. Milk standardized with SMP and fermented using YM 410 at 43° C. to a final pH of 4.6.

The present disclosure provides methods, apparatuses, compositions and kits that improve properties of high protein milk products. In some embodiments, the present disclosure provides methods, apparatuses, compositions and kits that improve properties of high protein-enriched milk products by using one or more enzymes. In some embodiments, the present disclosure provides methods, apparatuses, compositions and kits that improve rheological properties and the overall acceptability of fermented protein-enriched milk products, e.g. viscosity of protein-enriched yogurt products.

Unless defined otherwise, all technical and scientific terms used herein have the same meaning as commonly understood by one of ordinary skill in the art to which this disclosure belongs. Singleton, et al., DICTIONARY OF MICROBIOLOGY AND MOLECULAR BIOLOGY, 20 ED., John Wley and Sons, New York (1994), and Hale & Marham, THE HARPER COLLINS DICTIONARY OF BIOLOGY, Harper Perennial, NY (1991) provide one of skill with a general dictionary of many of the terms used in this disclosure.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range. Unless otherwise indicated, any nucleic acid sequences are written left to right in 5' to 3' orientation; amino acid sequences are written left to right in amino to carboxy orientation, respectively.

The headings provided herein are not limitations of the various aspects or embodiments of this disclosure which can be had by reference to the specification as a whole. Accordingly, the terms defined immediately below are more fully defined by reference to the specification as a whole.

It must be noted that as used herein and in the appended claims, the singular forms "a", "an", and "the" include plural referents unless the context clearly dictates otherwise. Thus, for example, reference to "a protease" includes a plurality of such enzymes and reference to "the feed" includes reference to one or more feeds and equivalents thereof known to those skilled in the art, and so forth.

The publications discussed herein are provided solely for their disclosure prior to the filing date of the present application. Nothing herein is to be construed as an admission that such publications constitute prior art to the claims appended hereto.

Milk Products

In some embodiments the present invention provides methods, apparatuses, compositions and kits that improve properties of fermented milk products.

A "fermented milk product" is a product, preferably an edible product, which may also be referred to as a "food product" or "feed product". The fermented milk product is a product produced by fermentation with a microorganism (as defined below).

In some embodiments, the fermented milk product is a dairy product, preferably a yogurt, a Greek yogurt, a Labneh, a frozen yogurt, a cheese (such as an acid curd cheese, a hard cheese, a semi-hard cheese, a cottage cheese), a butter, a buttermilk, quark, a sour cream, kefir, a fermented whey-based beverage, a koumiss, a milk beverage, a yoghurt drink, a fermented milk, a matured cream, a fromage frais, a milk, a fermented milk, a milk curd, a dairy product retentate, a processed cheese, a cottage cheese, a cream dessert, or infant milk.

In some embodiments the fermented milk product is a yogurt, preferably a set yogurt or a stirred yogurt.

A stirred yogurt has been stirred after fermentation for at least 5 to 60 seconds. Most preferably, a stirred yogurt has been stirred after fermentation for at least 10 seconds. Most preferably, a stirred yogurt has been stirred after fermentation for at least 20 seconds. In a preferred embodiment, a stirred yogurt has been stirred after fermentation for at least 30 seconds. Stirring can be carried out with a hand mixer or electric mixer. A set yogurt is not stirred after fermentation. After fermentation a set yogurt may be cooled and then stored. This is carried out without stirring.

The phrase "after fermentation" as used above means when fermentation is ended. Fermentation preferably ends when a specific pH of the fermenting culture is reached. This pH is preferably between 3 and 6, most preferably between 4 and 5. In one embodiment the pH at which fermentation ends is 4.1. In a further embodiment the pH at which fermentation ends is 4.2. In another embodiment the pH at which fermentation ends is 4.3. In another embodiment the pH at which fermentation ends is 4.4. In another embodiment the pH at which fermentation ends is 4.5. In another embodiment the pH at which fermentation ends is 4.6. In another embodiment the pH at which fermentation ends is 4.7. In another embodiment the pH at which fermentation ends is 4.8. In a further embodiment the pH at which fermentation ends is 4.9. In some embodiments, fermentation ends at a pH which inactivates, or reduces the activity of a low pH sensitive peptidase used as described below. This is pH 4.6-4.8.

As used herein, the term "yoghurt" is an alternative spelling of "yogurt" with an identical meaning.

In a preferred embodiment, the fermented milk product is stirred during or following the fermentation step. Preferably stirring is carried out for at least 5 to 60 seconds, or more than 60 seconds. In one embodiment stirring is carried out for, at least 10 to 30 seconds. In a further embodiment stirring is carried out for at least 12 to 20 seconds. In a preferred embodiment stirring is carried out for at least 15 seconds. Stirring can be carried out with a hand mixer or electric mixer.

In one embodiment, the fermented milk product is cooled, preferably immediately. This cooling may take place for example, using a water bath or heat exchanger. Preferably the fermented milk product is cooled to 20-30° C. Most preferably the fermented milk product is cooled to around 25° C. or to 25° C.

Alternatively, in one embodiment the fermented milk product is cooled to a lower temperature of 1-10° C., most preferably 4-6° C. In one embodiment this cooling is carried out slowly by placing the fermented milk product in a cold room or refrigerator.

In a preferred embodiment the fermented milk product is cooled immediately to 20-30° C., most preferably to around 25° C. or to 25° C. Then the fermented milk product is cooled for a second time, but this time to 1-10° C., most preferably 4-6° C. In one embodiment the fermented milk product is cooled for a second time to 3° C. In another embodiment the fermented milk product is cooled for a second time to 4° C. In a further embodiment the fermented milk product is cooled for a second time to 5° C.

In some embodiments the second cooling is carried out slowly, for example over 10 to 48 hours. In one embodiment, cooling is carried out over 12 to 20 hours. In a preferred embodiment cooling is carried out over 15 to 20 hours. In a most preferred embodiment cooling is carried out over 10 hours or cooling is carried out over 15 hours. Most preferably this second cooling is carried out in a cold room or refrigerator.

In some embodiments, the stirring described above is carried out immediately after fermentation and before any cooling step. Stirring may also be carried out between two cooling steps.

The method of the invention may further include a storage step after fermentation. This may be carried out after stirring and/or cooling (one or more times), preferably after both.

The fermented milk product produced by the methods of the current invention has one or more of the following features:
(a) improved viscosity; (b) improved gel strength; (c) improved texture; (d) improved firmness of curd; (e) earlier onset of fermentation; (f) earlier onset of gelation; (g) earlier conclusion of fermentation; (h) reduced syneresis; (i) improved shelf-life; (j) improved flavor (e.g. less off-flavor); (k) decreased stickiness; or (l) any combination of (a) to (k).

In one embodiment, the fermented milk product produced by the methods of the current invention has improved viscosity.

In one embodiment, the fermented milk product produced by the methods of the current invention has improved gel strength.

In one embodiment, the fermented milk product produced by the methods of the current invention has improved texture.

In a further embodiment, the fermented milk product produced by the methods of the current invention has improved firmness of curd.

In one embodiment, the fermented milk product produced by the methods of the current invention has earlier onset of fermentation.

In a further embodiment, the fermented milk product produced by the methods of the current invention has earlier onset of gelation.

In a preferred embodiment, the fermented milk product produced by the methods of the current invention has earlier conclusion of fermentation.

In one embodiment, the fermented milk product produced by the methods of the current invention has reduced syneresis.

In a preferred embodiment, the fermented milk product produced by the methods of the current invention has improved shelf-life.

In a preferred embodiment, the fermented milk product produced by the methods of the current invention has improved flavor.

In a preferred embodiment, the fermented milk product produced by the methods of the current invention has decreased stickiness.

These features change the texture of the fermented milk product, preferably a yogurt, and also change the mouthfeel and taste. In some embodiments, the fermented milk product produced by the methods of the current invention has improved taste, e.g., less off-flavor and/or less bitterness.

The fermented milk product of the current invention also has a longer shelf life than a fermented milk product, most preferably a yogurt, which is not produced by the method of the invention and/or not produced using the one or more enzymes described herein.

As used herein, a "longer shelf-life" means that the fermented milk product can be stored for longer without a change in the texture, mouthfeel or taste, or an increase in syneresis of the product.

Storage is preferably carried out at a low temperature, preferably less than 10° C., most preferably 0-10° C. and more preferably 4-6° C.

In some embodiments, the shelf-life is of the fermented milk product, most preferably a yogurt, produced by the method of the invention is increased by 5 to 28 days compared to a fermented milk product which is not produced by the method of the invention and/or not produced using the one or more enzymes described herein.

In some embodiments, the shelf-life is of the fermented milk product, produced by the method of the invention is increased by 5 to 28 days compared to a fermented milk product which is not produced by the method of the invention and/or not produced using the enzymes described herein.

When two fermented milk products are compared, such as a product produced by the methods of the invention compared to one produced by other methods, they should be the same type of fermented milk product, for example a yogurt. This is illustrated in the examples.

As used herein, the term "milk substrate" may encompass any milk or milk product. In particular the milk substrate may be of animal origin, in particular cow milk, ewe milk or goat milk. In one embodiment, the milk substrate may be reduced fat milk, 1% fat milk, 0.1% fat milk, semi-skimmed milk or a skimmed milk (also known as semi-skim milk and skim milk respectively). The milk substrate may also be a blended milk. A milk substrate is the starting material to which the method of the invention as described herein is applied.

An "inoculated milk substrate" as used herein means a milk substrate with lactic acid bacteria (LAB) added to it.

The milk substrate used in the method of the invention has a protein content of 4% (w/w) or higher. For example, the milk substrate may have a protein content of 4.5%, 5%, 5.5%, 6%, 6.5%, 7%, 7.5%, 8%, 8.5%, 9%, 9.5% or 10% (w/w) or more. Protein content is typically measured in terms of protein weight to volume (w/v) or protein weight to total weight (w/w). Where it is not specified herein, it may be assumed that the measurement of protein content is in terms of protein weight to total weight (w/w). Milk substrates or fermented milk products that have a protein content of 4% (w/w) or greater are referred to herein as "high protein". The density of milk will typically fall within 1.026 kg/L to 1.034 kg/L at 20° C. Non-fat milk has higher density than full fat milk, and higher protein leads to higher density. The density of milk is given by the densities of its constituents according to their mass content. The following densities of milk components (at 20° C.) mainly contribute to milk density: water 0.998 g/cm3; fat 0.931 g/cm3; proteins 1.451 g/cm3 (average); lactose 1.545 g/cm3 (average); salts 3.000 g/cm3. Since milk has a typical density of approximately 1 kg/L, protein content measured or expressed in terms of either protein weight to volume (w/v) or protein weight to total weight (w/w) will provide very similar results, and so may be treated as equivalent measurements.

The milk substrate may be standardized or homogenized. For example, the milk substrate may be standardized at 1 to 20% or more protein content (w/w). In some embodiments, the milk substrate may be standardized at 4-15% protein (w/w). In some embodiments, the milk substrate may be standardized at or about 6% protein (w/w). In other embodiments, the milk substrate may be standardized at or about 10% protein (w/w). In some embodiments, the milk substrate may be standardized at about higher than 4% or at about higher than 10% protein (w/w).

Alternatively, the milk substrate may be standardized at 1 to 20% or more protein weight to volume (w/v). In some embodiments, the milk substrate may be standardized at 4-15% protein w/v. In some embodiments, the milk substrate may be standardized at or about 6% protein w/v. In other embodiments, the milk substrate may be standardized at or about 10% protein w/v. In some embodiments, the milk substrate may be standardized at about higher than 4% or at about higher than 10% protein w/v.

In some embodiments, the milk substrate is fortified with protein. In one embodiment, the milk substrate is fortified with milk protein such as skimmed milk powder, milk protein (e.g. MP 70) or whey protein concentrate (e.g. WPC 80). In some embodiments, milk substrates that have been fortified with additional proteins are standardized at 4 to 20% or more protein (w/w). In some embodiments, the milk substrate that has been fortified with additional proteins may be standardized at 4-15% protein (w/w). In some embodiments, the milk substrate that has been fortified with additional proteins may be standardized at or about 4% protein (w/w). In some embodiments, the milk substrate that has been fortified with additional proteins may be standardized at or about 6% protein (w/w). In other embodiments, the milk substrate that has been fortified with additional proteins may be standardized at or about 10% protein (w/w). In some embodiments, the milk substrate that has been fortified with additional proteins may be standardized at higher than 4% or at higher than 10% protein w/w.

In some embodiments, milk substrates that have been fortified with additional milk proteins are standardized at 4 to 20% or more protein weight to volume (w/v). In some embodiments, the milk substrate that has been fortified with additional milk proteins may be standardized at 4-15% protein w/v. In some embodiments, the milk substrate that has been fortified with additional milk proteins may be standardized at or about 4% protein w/v. In some embodiments, the milk substrate that has been fortified with additional milk proteins may be standardized at or about 6% protein w/v. In other embodiments, the milk substrate that has been fortified with additional milk proteins may be standardized at or about 10% protein w/v. In some embodiments, the milk substrate that has been fortified with additional milk proteins may be standardized at higher than 4% or at higher than 10% protein w/v.

In some embodiments, the milk substrate is concentrated in order to increase the protein content. The milk substrate may be subjected to ultrafiltration or evaporation in order to concentrate the milk.

In a preferred embodiment, the milk is concentrated using ultrafiltration before fermentation, instead of applying a separator method post-fermentation. One advantage of this approach is a higher yield per liter of milk as most of the whey proteins will be in the concentrate after ultrafiltration whereas these are lost in the separator method. Another advantage is that no acidic whey is produced. Acidic way has little value as it is difficult to process due to the low pH and is often used as animal feed at a cost to the dairy. In contrast, the eluate from ultrafiltration can be used for production of lactose or lactose and mineral containing powder. A further advantage is that less fermentation tank capacity required, such as approximately 50% capacity. Furthermore, the ultrafiltration technique allows for better control of protein content in final product.

The milk substrate may be standardized at 0 to 5% or more fat w/v. In one embodiment the milk substrate may be standardized at 0-1% fat w/v. In a preferred embodiment the milk substrate may be standardized at about 0.1% or at 0.1% fat w/v. In another embodiment the milk substrate may be standardized at about 0.025% to 0.05% fat w/v. In a further embodiment the milk substrate may be standardized at about 0.025% to 0.05% fat w/v. In a further embodiment the milk substrate may be standardized at about 1% to 5% fat w/v. In a preferred embodiment the milk substrate may be standardized at about 2% to 4% fate w/v. In a further embodiment the milk substrate may be standardized at about 3% fat w/v.

The milk substrate may be standardized for both fat and protein content. In some embodiments, the milk substrate may be standardized at 4-10% protein (w/w) and 0-1% fat (w/w). In some embodiments, the milk substrate may be standardized at or about 6.0 to 10.0% protein (w/w) and 0 to 10% fat (w/w). In some embodiments, the milk substrate may be standardized at or about 10.0% protein (w/w) and 0.1% fat (w/w).

In other embodiments, the milk substrate may be standardized at 4-10% protein and 0-1% fat v/w. In some embodiments, the milk substrate may be standardized at or about 6.0 to 10.0% protein w/v and 0 to 10% fat v/w. In some embodiments, the milk substrate may be standardized at or about 10.0% protein w/v and 0.1% fat w/v.

The milk substrate may be concentrated, condensed, heat treated, evaporated or filtered. It may also be dried or produced from a dried milk or a dried milk powder or other dried dairy product. It may be UHT milk. It may be rehydrated.

The milk substrate is preferably pasteurized and/or pre-pasteurized before or after treatment with the enzymes described herein. Pasteurization involves heating the milk substrate to at least 72° C. for at least 15 seconds, preferably 25 seconds or more. In one embodiment pasteurization is carried out at least 73° C. for at least 15 seconds. In one embodiment pasteurization is carried out at least 75° C. for at least 15 seconds. In a further embodiment pasteurization is carried out at least 85° C. for at least 15 seconds. In a further embodiment pasteurization is carried out at least 90°

C. for at least 15 seconds. In another embodiment pasteurization is carried out at least 95° C. for at least 15 seconds.

Pasteurization may be carried out for at least 30 seconds. In some embodiments, pasteurization may be carried out for at least 1 minute. In further embodiments, pasteurization may be carried out for at least 2-15 minutes. In another embodiment, pasteurization may be carried out for at least 3-10 minutes. In a further embodiment, pasteurization may be carried out for at least 15 minutes or more. Pasteurization may take place in an autoclave.

In some embodiments, pasteurization is carried out at least 95° C. for 4-6 minutes.

In some embodiments, both pre-pasteurization and pasteurization are carried out. In some embodiments, pre-pasteurization is carried out on the raw milk before standardization. In some embodiments, pre-pasteurization is carried out at 72-80° C., such as 72-75° C., or 72° C. In one embodiment pre-pasteurization is carried out for 15-25 seconds, most preferably 15 seconds. In one aspect of the invention, the milk substrate is pasteurized after standardization. Preferably this is carried out at the temperatures and for the times described above. In some embodiments, pasteurization after standardization is carried out at around 90° C. for around 10 minutes, preferably at 90° C. for 10 minutes. Pasteurization as described above may also be carried out in the absence of standardization.

In one aspect the milk substrate has a pH (before fermentation) of 6-8, most preferably of at or around pH 6-7 and in some embodiments of at or around pH6.7-6.8. The milk substrate is treated with one or more of the enzymes described herein. As used herein, the terms "treating" and "treated" may encompass, adding to, mixing with, incubating with, stirring with, contacting with, fermenting with, inoculating with, admixing and applying to. In some embodiments, the milk substrate is treated with the one or more enzymes described herein before or after pasteurization. In some embodiments, the milk substrate is treated with the one or more enzymes as described herein before pasteurization, and with additional one or more enzymes as described herein after pasteurization. The one or more enzymes for the treatment before pasteurization can be the same as the one or more enzymes for treatment after pasteurization, or they can be different. In some embodiments, the one or more enzymes for the treatment before pasteurization are different than the one or more enzymes for treatment after pasteurization.

The term "treating" is used herein to mean the addition of one or more proteases and a microorganism to the milk substrate.

Proteolytic Enzymes

In one aspect, the present invention is directed to systems, compositions and methods for improving the properties of milk products comprising adding one or more enzymes during the process. In one embodiment, the present invention provides compositions and methods for improving the properties of milk products comprising adding one or more proteases alone or in combination with other enzymes during the process.

The protease used according to the invention is an exogenous protease. The term "exogenous" as used herein means that the protease is not typically found in milk, and hence is obtained from a different (i.e. non-milk) source.

The term "protease" as used herein is synonymous with peptidase or proteinase.

The protease for use in the present invention may be a subtilisin (E.C. 3.4.21.62) or a bacillolysin (E.C. 3.4.24.28) or an alkaline serine protease (E.C. 3.4.21.x) or a keratinase (E.C. 3.4.x.x). Suitably, a protease for use in the present invention may be an Protease endopeptidase K (EC 3.4.2.1.64), pronase, papain, an endopeptidase Arg-C, an endoprotease Gluc-C (EC 3.4.21.19), an enterokinase (EC 3.4.21.9), a collagenase (EC 3.4.24.3), a thermolysin (EC 3.4.24.27), a trypsin (EC 3.4.21.4), a chymotrypsin (EC 3.4.21.1), a pepsin (EC 3.4.23.1), an aspergillopepsin (EC 3.4.23.18), a sedolisin (EC 3.4.21.100), or a dipeptidyl peptidase (EC 3.4.14.1).

Preferably the protease in accordance with the present invention is a subtilisin, a serine protease, a metalloprotease, an acid protease, a neutral protease or a keratinase.

Suitable proteases include those of animal, vegetable or microbial origin. Chemically modified or protein engineered mutants are also suitable. The protease may be a serine protease or a metalloprotease, e.g., an alkaline microbial protease or a trypsin-like protease. Examples of alkaline proteases are subtilisins, especially those derived from *Bacillus* sp., e.g., subtilisin Novo, subtilisin Carlsberg, subtilisin 309 (see, e.g., U.S. Pat. No. 6,287,841), subtilisin 147, and subtilisin 168 (see, e.g., WO 89/06279). Examples of trypsin-like proteases are trypsin (e.g., of porcine or bovine origin), and *Fusarium* proteases (see, e.g., WO 89/06270 and WO 94/25583). Examples of useful proteases also include but are not limited to the variants described in WO 92/19729 and WO 98/20115. All of which are incorporated herein by reference.

In one embodiment the protease for use in the present invention may be one or more of the proteases in one or more of the commercial products below:

| Commercial product ® | Company | Protease type | Protease source |
|---|---|---|---|
| Protex 30L ™ | Genencor/DuPont | Serine protease | B. subtilis |
| Protex 6L ™ | Genencor/DuPont | Serine protease | B. licheniformis |
| Protex 7L ™ | Genencor/DuPont | Neutral metalloendopeptidase | B. amyloliquefaciens |
| Purafect 4000L ™ | Genencor/DuPont | Serine protease | |
| FNA ™ | Genencor/DuPont | Serine protease | B. amyloliquefaciens |
| Properase 1600L ™ | Genencor/DuPont | Serine protease | B. alcalophilus |
| Protex P ™ | Genencor/DuPont | subtilisin | B. lentus |
| Esperase 8.0L | Novozymes | protease | Bacillus sp. |
| Everlase 16.0 ™ | Novozymes | subtilisin | Bacillus sp. |
| Alcalase 2.4 ™ | Novozymes | subtilisin | Bacillus sp. |
| Neutrase 0.8L ™ | Novozymes | protease | B. amyloliquefaciens |
| Allzyme FD ™ | Alltech | protease | Aspergillus niger |
| Arazyme One-Q ™ | Insect Biotech Co. | metalloprotease | Serratia proteamacula ns HY-3 |
| Savinase ™ | Novozymes | subtilisin | Bacillus sp. |

| Commercial product® | Company | Protease type | Protease source |
|---|---|---|---|
| Ronozyme ProAct | DSM/Novozymes | Alkaline serine protease | *Nocardiopsis prasina* gene expressed in *Bacillus licheniformis* |
| Versazyme/Cibenza DP100 | Novus | Keratinase | *Bacillus licheniformis* |

Additionally or in the alternative the protease may be comprised in one or more of the following commercially available products: Kannase,™, NovoCarne Tender™, and Novozym 37020, Novo-Pro D™ (all available from Novozymes); BioSorb-ACDP™ (Noor Creations, India); or Angel™ Acid Protease (Angel Yeast Co, Ltd., China).

Suitably, the protease may be a protease from *Bacillus* (such as *Bacillus subtilis, Bacillus amyloliquefaciens, B. alcalophilus* and *B. licheniformis*), *Trichoderma, Nocardiopsis, Serratia* or *Aspergillus*.

In one embodiment, the protease is from *Bacillus*. Suitably, the protease may be from the species *Bacillus subtilis, Bacillus amyloliquefaciens, B. alcalophilus, B. lentus* and *B. licheniformis*. In one embodiment, the protease is from the species *Bacillus subtilis*.

In one embodiment, the protease has the amino acid SEQ ID No.1. In some embodiments, the protease has at least 80, 81, 82, 83, 84, 85, 86, 87, 88, 89, 90, 91, 92, 93, 94, 95, 96, 97, 98 or 99% identity with the amino acid SEQ ID No.1.

In one embodiment, the protease has the amino acid SEQ ID No.2. In some embodiments, the protease has at least 80, 81, 82, 83, 84, 85, 86, 87, 88, 89, 90, 91, 92, 93, 94, 95, 96, 97, 98 or 99% identity with the amino acid SEQ ID No. 2.

In one embodiment, the protease has the amino acid SEQ ID No.3. In some embodiments, the protease has at least 80, 81, 82, 83, 84, 85, 86, 87, 88, 89, 90, 91, 92, 93, 94, 95, 96, 97, 98 or 99% identity with the amino acid SEQ ID No. 3.

In some embodiments, the protease for use in the present invention may be a low pH sensitive peptidase.

In some embodiments, the protease for use in the present invention may be a metalloprotease.

The term "metalloprotease" as used herein refers to an enzyme having protease activity, wherein the catalytic mechanism of the enzyme involves a metal, typically having a metal ion in the active site. In some embodiments, the metalloprotease is a low pH sensitive peptidase. The metal ion or ions of a metalloprotease may be any metal ion. Most preferably the metalloprotease as used herein contains metal ion or ions which are zinc, calcium or a combination of zinc and calcium.

Treatment with chelating agents removes the metal ion and inactivates metalloproteases. For example, EDTA is a metal chelator that removes essential zinc from a metalloprotease and therefore inactivates the enzyme.

In some embodiments, the metalloprotease as used herein has a divalent ion, or two divalent ions, or more than two divalent ions at the active site.

In some embodiments, the metalloprotease as used herein has a zinc ion in the active site, most preferably Zn2+. In some preferable metalloproteases there may be one zinc ion, in others there may be two or more zinc ions.

Preferably a metalloprotease comprises a His-Glu-Xaa-Xaa-His motif (where "Xaa" is any amino acid) which forms the metal ion binding site or part thereof.

In one embodiment, wherein the metalloprotease is a member of the GluZincin superfamily, a zinc ion is bound by the amino acid motif His-Glu-Xaa-Xaa-His plus an additional glutamate. Preferably it contains 1 zinc ion and 2 calcium ions.

In some embodiments, the metalloprotease is from family M4, or the GluZincin superfamily. The M4 enzyme family is characterized in that all enzymes in this family bind a single, catalytic zinc ion. As in many other families of metalloproteases, there is an His-Glu-Xaa-Xaa-His motif. The M4 family is further defined in *Biochem. J.* 290:205-218 (1993).

In some embodiments, the metalloprotease used in the present invention adopts a 3D structure similar to protein databank structures 1BQB (*Staphylococcus aureus* metalloprotease), 1EZM (*Pseudomonas aeruginosa* metalloprotease) and 1N PC (*Bacillus cereu s*metalloprotease). In a preferred embodiment, the metalloprotease has a cannibalistic autolysis site. This means that the metalloprotease may cause lysis of itself.

As used herein, the term "metalloprotease" may be used interchangeably with "metallopeptidase", "metalloproteinase" and "neutralaprotease". In some embodiments, the metalloprotease or a protease as described herein is low pH sensitive. As used herein, the term "low pH sensitive" refers to a peptidase whose pH optimum is the same as or close to the pH of fresh milk (pH6.5-6.7) and whose activity is at least 2 times lower at pH 4.6-4.8 compared to pH6.5-6.7.

In some embodiments, the low pH sensitive peptidase used in the present invention has an activity at least 10 times lower at pH 4.6-4.8 compared to pH6.5-6.7, and most preferably at least 15 times lower.

In some embodiments, during fermentation the production of organic acids (e.g. lactic acid) lowers the pH and deactivates the low pH sensitive peptidases during the methods of the invention.

In some embodiments, the low pH sensitive peptidase is irreversibly inactivated by low pH of 4.6-4.8. In a preferred embodiment, the low pH that reduces or inactivates the peptidases used in the invention is caused by fermentation. Most preferably this low pH is caused by microbial fermentation of sugars to organic acids, such as the fermentation of lactose to lactic acid. Most preferably the inactivation is permanent and the resulting fermented milk product therefore contains little, no, or only trace amounts of active peptidase. Preferably proteolytic activity is reduced, most preferably stopped, by the end fermentation, or before or during storage.

The reduction in activity at low pH for low pH sensitive peptidases that are metalloproteases is preferably caused by the disassociation of the metal ions. These metal ions are essential to the function of the enzyme, as described above.

The term "reduced activity" as used herein in the context of peptidases means a reduction in protease activity (also known as "peptidase activity", "enzyme activity", "endo-peptidase activity" or "exopeptidase activity") of 2 times or more units of peptidase activity compared to the units of peptidase activity at the activity maximum of pH6.5-6.7. In a preferred embodiment, "reduced activity" refers to activity of less than 50% that at the activity maximum of pH6.5-6.7.

The term "inactivates" as used herein in the context of peptidases means a reduction in protease activity of 2 times or more units of peptidase activity compared to the units of peptidase activity at the activity maximum of pH6.5-6.7. In a preferred embodiment, "inactivated" refers to activity of less than 90% that at the activity maximum of pH6.5-6.7. One unit of endopeptidase activity was defined as the absorbance increase per min at 450 nm caused by 1 ug (microgram) NP7L active protein. as described in Example 1 (Omondi et al (2001)).

In one embodiment the low pH sensitive peptidase is a thermostable peptidase. As used herein, the term "thermostable" means the enzyme has protease activity at temperatures of greater than 30° C., preferably 30° C.-60° C.

In one embodiment of the present invention, the low pH sensitive peptidase belongs to Enzyme Commission (E.C.) No. 3.4.17, 3.4.21 or 3.4.24.

In a further embodiment, the low pH sensitive peptidase is a thermolysin, an NprE molecule, proteolysin, aureolysin, Gentlyase or Dispase, or a peptidase having a high percentage identity to such an enzyme.

In some embodiments, the low pH sensitive peptidase used in the present invention is not chymosin or chymosin-like (that is, does not have chymosin-like activity and does not specifically cleave the Met105-Phe106 bond), and does not belong to E.C. No. 3.4.23.4. The low pH sensitive peptidase used in the present invention preferably does not cleave the Met105-Phe106 bond, and most preferably does not cleave strictly the Met105-Phe106 bond only.

In some embodiments, the peptidase used consists of or comprises a mature protein excluding any signal sequence. In a further embodiment, the peptidase consists of or comprises a full length protein including a signal sequence.

In some embodiments, the low pH sensitive peptidase is of non-mammalian origin, and most preferably of non-animal origin. In some embodiments, the low pH sensitive peptidase is a bacterial peptidase, a fungal peptidase, an archaeal peptidase or an artificial peptidase. In some embodiments the low pH sensitive peptidase is a bacterial metalloprotease, a fungal metalloprotease, an archaeal metalloprotease or an artificial metalloprotease.

An artificial peptidase is an enzyme in which one or more amino acids have been mutated, substituted, deleted or otherwise altered so the amino acid sequence of the enzyme differs from the wild-type, wherein the wild-type is obtainable from a living organism. An artificial peptidase may also be referred to as a variant peptidase.

Peptidases of bacterial origin as used herein are preferably obtained or obtainable from *Bacillus* species, most preferably *Bacillus amyloliquefaciens* or *Bacillus pumilus*. Most preferably the low pH sensitive peptidase is, or has a high percentage identity to, NP7L, also known as NprE, Protex 7L, P7L, FoodPro PNL, Bacillolysin or Neutrase. Such a peptidase is shown as SEQ ID NO: 3 (FIG. 9A), and encoded by the nucleotide sequence of SEQ ID NO:10 (FIG. 9K). NP7L is a metalloprotease.

Peptidases of bacterial origin as used herein may also be, or have a high percentage identity to, NP14L (SEQ ID NO:6, FIG. 9E) also known as Thermolysin and Protex 14L. NP14L is also a metalloprotease.

Peptidases of fungal origin as used herein are preferably obtained or obtainable from *Penicillium* (see for example SEQ ID NO:7, FIG. 9F) *Aspergillus* (see for example SEQ ID NO:9, FIG. 9H) *Photorhabdus* or *Trichoderma* species.

Peptidases of archaeal origin as used herein are preferably from *Sulfolobus*, most preferably *Sulfolobus solfataricus*.

In one embodiment the low pH sensitive peptidase as used herein comprises a polypeptide having the amino acid sequence of SEQ ID NO:3 or a polypeptide having at least 70%, such as at least 75%, such as at least 80%, such as at least 85%, such as at least 90%, such as at least 95%, such as at least 97%, such as at least 98%, such as at least 99%, sequence identity thereto, or a functional variant thereof.

In one embodiment the low pH sensitive peptidase as used herein comprises a polypeptide having the amino acid sequence of SEQ ID NO:3, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:3, or a polypeptide having one or several amino acid deletions, substitutions and/or additions, or a functional variant thereof. For example, such a polypeptide may have 1, 2, 3, 4, 5, 6, 7, 8, 9, 10, 15, 20 or more amino acid deletions, substitutions and/or additions.

In one embodiment the low pH sensitive peptidase as used herein comprises a polypeptide having the amino acid sequence of SEQ ID NO:4 or a polypeptide having at least 70%, such as at least 75%, such as at least 80%, such as at least 85%, such as at least 90%, such as at least 95%, such as at least 97%, such as at least 98%, such as at least 99%, sequence identity thereto, or a functional variant thereof.

In one embodiment the low pH sensitive peptidase as used herein comprises a polypeptide having the amino acid sequence of SEQ ID NO:4, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:4, or a polypeptide having one or several amino acid deletions, substitutions and/or additions, or a functional variant thereof. For example, such a polypeptide may have 1, 2, 3, 4, 5, 6, 7, 8, 9, 10, 15, 20 or more amino acid deletions, substitutions and/or additions.

In one embodiment the low pH sensitive peptidase as used herein comprises a polypeptide having the amino acid sequence of SEQ ID NO:5 or a polypeptide having at least 70%, such as at least 75%, such as at least 80%, such as at least 85%, such as at least 90%, such as at least 95%, such as at least 97%, such as at least 98%, such as at least 99%, sequence identity thereto, or a functional variant thereof.

In one embodiment the low pH sensitive peptidase as used herein comprises a polypeptide having the amino acid sequence of SEQ ID NO:5, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:5, or a polypeptide having one or several amino acid deletions, substitutions and/or additions, or a functional variant thereof. For example, such a polypeptide may have 1, 2, 3, 4, 5, 6, 7, 8, 9, 10, 15, 20 or more amino acid deletions, substitutions and/or additions.

In one embodiment the low pH sensitive peptidase as used herein comprises a polypeptide having the amino acid sequence of SEQ ID NO:6 or a polypeptide having at least 70%, such as at least 75%, such as at least 80%, such as at least 85%, such as at least 90%, such as at least 95%, such as at least 97%, such as at least 98%, such as at least 99%, sequence identity thereto, or a functional variant thereof.

In one embodiment the low pH sensitive peptidase as used herein comprises a polypeptide having the amino acid sequence of SEQ ID NO:6, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:6, or a polypeptide having one or several amino acid deletions, substitutions and/or additions, or a functional variant thereof. For example, such a polypeptide may have 1, 2, 3, 4, 5, 6, 7, 8, 9, 10, 15, 20 or more amino acid deletions, substitutions and/or additions.

In one embodiment the low pH sensitive peptidase as used herein comprises a polypeptide having the amino acid sequence of SEQ ID NO:7 or a polypeptide having at least 70%, such as at least 75%, such as at least 80%, such as at least 85%, such as at least 90%, such as at least 95%, such as at least 97%, such as at least 98%, such as at least 99%, sequence identity thereto, or a functional variant thereof.

In one embodiment the low pH sensitive peptidase as used herein comprises a polypeptide having the amino acid sequence of SEQ ID NO:7, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:7, or a polypeptide having one or several amino acid deletions, substitutions and/or additions, or a functional variant thereof. For example, such a polypeptide may have 1, 2, 3, 4, 5, 6, 7, 8, 9, 10, 15, 20 or more amino acid deletions, substitutions and/or additions.

In one embodiment the low pH sensitive peptidase as used herein comprises a polypeptide having the amino acid sequence of SEQ ID NO:9 or a polypeptide having at least 70%, such as at least 75%, such as at least 80%, such as at least 85%, such as at least 90%, such as at least 95%, such as at least 97%, such as at least 98%, such as at least 99%, sequence identity thereto, or a functional variant thereof.

In one embodiment the low pH sensitive peptidase as used herein comprises a polypeptide having the amino acid sequence of SEQ ID NO:9, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:9, or a polypeptide having one or several amino acid deletions, substitutions and/or additions, or a functional variant thereof. For example, such a polypeptide may have 1, 2, 3, 4, 5, 6, 7, 8, 9, 10, 15, 20 or more amino acid deletions, substitutions and/or additions.

In one embodiment the low pH sensitive peptidase as used herein comprises a polypeptide having the amino acid sequence of SEQ ID NO:11, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:16, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:17, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:18, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:19, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:20, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:21, or a polypeptide having at least 70%, 75%, 80%, 85%, 90%, 95%, 97%, 98%, 99% sequence identity thereto, or a functional variant thereof.

In one embodiment the low pH sensitive peptidase as used herein comprises a polypeptide having the amino acid sequence of SEQ ID NO:22, or a polypeptide having at least 70%, 75%, 80%, 85%, 90%, 95%, 97%, 98%, 99% sequence identity thereto, or a functional variant thereof.

As used herein, a "functional variant" of a peptidase meant that the enzyme has peptidase activity despite changes such as substitutions, deletions, mutations, missing or additional domains and other modifications.

As used herein, a "functional variant" of a metalloprotease meant that the enzyme has metalloprotease activity despite changes such as substitutions, deletions, mutations, missing or additional domains and other modifications.

In one embodiment the low pH sensitive peptidase comprises a full length enzyme including a signal peptide (also known as a signal sequence). A signal sequences directs the secretion of the polypeptide through a particular prokaryotic or eukaryotic cell membrane. In one embodiment the low pH sensitive peptidase comprises a polypeptide having the amino acid sequence of SEQ ID NO:3, lacking a signal sequence. In one embodiment the low pH sensitive peptidase used in the current invention comprises a polypeptide having the amino acid sequence of SEQ ID NO:4, but lacking a signal sequence. In a further embodiment the low pH sensitive peptidase used in the current invention comprises a polypeptide having the amino acid sequence of SEQ ID NO:5, but lacking a signal sequence. In a further embodiment the low pH sensitive peptidase used in the current invention comprises a polypeptide having the amino acid sequence of SEQ ID NO:6, but lacking a signal sequence. In a further embodiment the low pH sensitive peptidase used in the current invention comprises a polypeptide having the amino acid sequence of SEQ ID NO:7, but lacking a signal sequence. In a further embodiment the low pH sensitive peptidase used in the current invention comprises a polypeptide having the amino acid sequence of SEQ ID NO:9, but lacking a signal sequence. In a further embodiment the low pH sensitive peptidase used in the current invention comprises a polypeptide having the amino acid sequence of SEQ ID NO:11, but lacking a signal sequence. In a further embodiment the low pH sensitive peptidase used in the current invention comprises a polypeptide having the amino acid sequence of SEQ ID NO:16, but lacking a signal sequence. In a further embodiment the low pH sensitive peptidase used in the current invention comprises a polypeptide having the amino acid sequence of SEQ ID NO:17, but lacking a signal sequence. In a further embodiment the low pH sensitive peptidase used in the current invention comprises a polypeptide having the amino acid sequence of SEQ ID NO:18, but lacking a signal sequence. In a further embodiment the low pH sensitive peptidase used in the current invention comprises a polypeptide having the amino acid sequence of SEQ ID NO:19, but lacking a signal sequence. In a further embodiment the low pH sensitive peptidase used in the current invention comprises a polypeptide having the amino acid sequence of SEQ ID NO:20, but lacking a signal sequence. In a further embodiment the low pH sensitive peptidase used in the current invention comprises a polypeptide having the amino acid sequence of SEQ ID NO:21, but lacking a signal sequence. In a further embodiment the low pH sensitive peptidase used in the current invention comprises a polypeptide having the amino acid sequence of SEQ ID NO:22, but lacking a signal sequence.

In a further embodiment the low pH sensitive peptidase comprises an amino acid sequence having at least 70%, such as at least 75%, such as at least 80%, such as at least 85%, such as at least 90%, such as at least 95%, such as at least 97%, such as at least 98%, such as at least 99%, sequence identity to SEQ ID NOs:3, 4, 5, 6, 9, 11 or 13-22 lacking a signal peptide, or a functional variant thereof. In a further embodiment the low pH sensitive peptidase comprises an amino acid sequence having at least 70%, 75%, 80%, 85%, 90%, 95%, 97%, 98% or 99% sequence identity to SEQ ID NOs:3, 4, 5, 6, 9, 11, or 16-22 and also lacking a signal peptide, or a functional variant thereof.

In a further embodiment, the low pH sensitive peptidase consists of a polypeptide having the amino acid sequence of SEQ ID NO:2, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:4, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:5, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:6, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:7 or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:9, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:11, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:16, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:17, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:18, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:19, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:20, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:21, or a polypeptide having at least 70%, 75%, 80%, 85%, 90%, 95%, 97%, 98%, 99% sequence identity thereto.

In a further embodiment, the low pH sensitive peptidase consists of a polypeptide having the amino acid sequence of SEQ ID NO:22, or a polypeptide having at least 70%, 75%, 80%, 85%, 90%, 95%, 97%, 98%, 99% sequence identity thereto.

Peptidases, like all proteins, may be encoded by a nucleic acid having a nucleotide sequence. The low pH sensitive peptidases used in the current invention may be obtained from or obtainable from a nucleic acid, for example as demonstrated by SEQ ID NO:10 or a variation thereof, which encodes SEQ ID NO:3, or SEQ ID NO:8 or a variation thereof which encodes SEQ ID NO:7. Said nucleic acid may be expressed in a host cell. Said nucleic acid may be obtained or obtainable from a host cell.

In some embodiments, the enzyme has a total number of amino acids of less than 350, such as less than 340, such as less than 330, such as less than 320, such as less than 310, such as less than 300 amino acids, such as in the range of 200 to 350, such as in the range of 220 to 345 amino acids than the one or more enzyme described herein.

In some embodiments, the amino acid sequence of the enzyme has at least one, two, three, four, five, six, seven, eight, nine or ten amino acid substitutions.

The amino acid sequence may be prepared/isolated from a suitable source, or it may be made synthetically or it may be prepared by use of recombinant DNA techniques.

The protein encompassed in the present invention may be used in conjunction with other proteins, particularly enzymes. Thus the present invention also covers a combination of proteins wherein the combination comprises the protease of the present invention and another enzyme, which may be another protease according to the present invention.

Preferably the amino acid sequence when relating to and when encompassed by the per se scope of the present invention is not a native enzyme. In this regard, the term "native enzyme" means an entire enzyme that is in its native environment and when it has been expressed by its native nucleotide sequence.

Glycosidases

The milk substrate may additionally be treated with one or more glycosidases. This treatment may occur at any point, of the methods described herein. One or more glycosidases may be added during fermentation.

Glycosidases Hydrolyze Glycosidic Bonds

In one aspect of the invention, the glycosidase is an N-linked or an O-linked glycosidase. In some embodiments, the glycosidase is a PNGase F belonging to Enzyme Commission (E.C.) No. 3.5.1.52.

In other embodiments the glycosidase is an Endoglycosidase H belonging to E.C. 3.2.1.96. In some embodiments the glycosidase is a PNGase A belonging to E.C. 3.5.1.52. In some embodiments the glycosidase is a Neuraminidase (NaNase) belonging to E.C. 3.2.1.18. In some embodiments, the glycosidase is selected from SEQ ID NO. 12, a PNGase A ((Peptide-N(4)-(N-acetyl-beta-D-glucosaminyl) asparagine amidase, EC 3.5.1.52), SEQ ID NO:13, a PNGase F, SEQ ID NO:14, an Endoglycosidase H (Endo-beta-N-acetylglucosaminidase H, EC 3.2.1.96,) or SEQ ID NO:15, an N-acetyl galactosaminidase, or a glycosidase having at least 70%, such as at least 75%, such as at least 80%, such as at least 85%, such as at least 90%, such as at least 95%, such as at least 97%, such as at least 98%, such as at least 99%, sequence identity to any thereof.

In some embodiments, the glycosidase comprises a polypeptide having an amino acid sequence of SEQ ID No. 12, SEQ ID NO:13, SEQ ID NO:14 or SEQ ID NO:15, or a glycosidase having at least 70%, 75%, 80%, 85%, 90%, 95%, 97, 98%, 99%, sequence identity to any thereof. In some embodiments, the glycosidase comprises a polypeptide having an amino acid sequence of SEQ ID No. 12, or a glycosidase having at least 70%, 75%, 80%, 85%, 90%, 95%, 97, 98%, 99%, sequence identity to any thereof. In some embodiments, the glycosidase comprises a polypeptide having an amino acid sequence of SEQ ID No. 13, or a glycosidase having at least 70%, 75%, 80%, 85%, 90%, 95%, 97, 98%, 99%, sequence identity to any thereof. In some embodiments, the glycosidase comprises a polypeptide having an amino acid sequence of SEQ ID No. 14, or a glycosidase having at least 70%, 75%, 80%, 85%, 90%, 95%, 97, 98%, 99%, sequence identity to any thereof. In some embodiments, the glycosidase comprises a polypeptide having an amino acid sequence of SEQ ID No. 15, or a glycosidase having at least 70%, 75%, 80%, 85%, 90%, 95%, 97, 98%, 99%, sequence identity to any thereof.

Formulating and Packaging

The one or more enzymes used in the present invention, and/or starter cultures of the present invention, may be formulated into any suitable form.

Formulating may include pelleting, capsules, caplets, tableting, blending, coating, layering, formation into chewable or dissolvable tablets, formulating into dosage controlled packets, formulating into stick packs and powdering.

Formulating may also include the addition of other ingredients to the low pH sensitive peptidases used in the present invention, and/or starter cultures of the present invention. Suitable ingredients include for example food ingredients, sugars, carbohydrates, and dairy products.

In some embodiments formulating does not include the addition of any further microorganisms. In a preferred embodiment formulating does include the addition of any further microorganisms, for example additional strains of lactic acid bacteria.

The one or more enzymes used in the present invention, and/or starter cultures of the present invention of the present invention, may be packaged.

In some embodiments, packaging occurs after freezing and/or drying and/or mixing the one or more enzymes used in the present invention, and/or starter cultures of the present invention.

Suitably the packaging may be comprised of a vacuum pack, sachet, box, a blister pack, stick pack, or tin.

As used in the current invention, the one or more proteases may be mixed with a carrier, preferably an insoluble carrier. In some embodiments, the one or more proteases may be mixed a carrier to obtain a slurry. The slurry may be dried to obtain a dried enzyme powder. This may be used as a starter culture or in a starter culture.

In some embodiments this dried slurry powder contains with particles having a volume mean diameter greater than 10-30 pm, most preferably greater than 30 pm, and the content of insoluble carrier in the dried enzyme powder is at least 10% (w/w) and at the most 90% (w/w) based on the weight of the dried enzyme powder. The insoluble carrier is preferably selected from the group consisting of polyvinylpolypyrrolidone (PVPP), microcrystalline cellulose, and wheat starch, maltodextrins, preferably microcrystalline cellulose, and it may contain a disintegrant. These have been described in WO/2014/177644A1, Example 1-13.

The methods of the current invention may be carried out using a kit. Preferably such a kit comprises one or more proteases as described herein and a microorganism, which may be in the form of a starter culture and/or formulated and/or packaged as described above. The specific combination of one or more peptidases described herein and their doses may be adjusted depending of the type of microorganisms and type of the milk substrate. For example, a higher dose of the one or more peptidases and/or a more active protease as described herein can be used when the microorganisms used contain a higher ratio of probiotic bacteria or when the milk substrate in has a high percent of milk protein.

Dosage

Preferably the dose of the one or more enzymes described herein is in the range of 0.1 µg to 1000 µg active enzyme protein per kilo milk substrate, more preferably it is in the range of 1 µg to 100 µg active enzyme protein/kg milk products, more preferably it is 5-15 µg active enzyme/kg milk substrate and even more preferably it is 10 µg active enzyme protein/kg milk substrate. In some embodiments, the dose of the one or more proteases described herein is 0.1-1 µg active enzyme protein/kg milk substrate.

In some embodiments, the methods of the invention in one aspect use a dose of 0.01-30 units of peptidase enzyme. In some embodiments, the methods of the invention in one aspect use a dose of 00.1-10 units of peptidase enzyme. In some embodiments, the methods of the invention use a dose of 0.1-1 units of peptidase enzyme. In some embodiments, around or exactly 0.9 units of peptidase enzyme per 100 ml of inoculated milk substrate are used. Alternatively the peptidase dose may be measured as an amount per kilo of milk substrate. For example, in some embodiments, the methods of the invention use a dose of up to 1-10000 µg dosed to 1 kilo milk substrate (i.e, the enzyme concentration is in the range of 1-10000 ppb, parts per billion). In some embodiments, the peptidase dose is at an amount of up to 1-100 ppb.

If the dose of enzyme is too low, it may not cause the desired effect, while overdose may lead to over hydrolysis converting milk proteins as polymers to oligomers and even amino acid. Overdosing may change the texture, gelation, decrease viscosity, firmness of yogurt products. The dose of the one or more peptidases described herein may be adjusted depending of the type of and ratio of microorganisms used during fermentation, and the amount and type of milk protein present in the milk substrate. For example, a higher dose of the one or more peptidases described herein can be used when the microorganisms used contain a higher ratio of probiotic bacteria or when the milk substrate in has a high percent of milk protein.

In some embodiments, the dose of the one or more enzymes described herein is selected such that the viscosity of a high protein milk substrate is decreased without exceeding the threshold for the perception of bitterness due to the liberation of small bitter tasting peptides.

A milk substrate or fermented milk product which has been treated with a peptidase may also be referred to as "enzymated".

Fermentation

As used herein, the term "fermentation" refers to the conversion of carbohydrates (such as sugars) to alcohols and CO2 or organic acids using microorganisms such as yeasts and bacteria or any combination thereof. Fermentation is usually carried out under anaerobic conditions. A fermented product has been produced using fermentation.

As used herein, the term "allowing the treated milk substrate to ferment" means fermenting the milk substrate. This may include incubating the treated milk substrate under suitable conditions (e.g. anaerobic) and at a suitable temperature for a sufficient period of time for fermentation to occur.

In the case of the fermented milk products of the invention, preferably they result from a milk substrate inoculated with a lactic acid bacterium, or any microbes that have GRAS status and can acidify milk by fermenting milk carbohydrates. For example a thermophilic culture such as YO-Mix 465, 532, 860 or 414 or a mesophilic culture such as Choozit 220, Choozit 230 or Probat 505. These culture strains are commercially available from DuPont.

In one embodiment, the milk substrate is fermented at 35-55° C., preferably 40-50° C. This temperature range is preferable for a thermophilic microorganism or a thermophilic culture. Most preferably, the fermentation temperature for a thermophilic microorganism or a thermophilic culture is 41° C. In some embodiments, the fermentation temperature is 42° C. In some embodiments, the fermentation temperature is 43° C. In other embodiments, the fermentation temperature is 44° C. In some embodiments, the fermentation temperature is 45° C. In another embodiment, the milk substrate is fermented at 15-30° C., preferably 20-25° C. This temperature range is preferable for a mesophilic microorganism or a mesophilic culture. Most preferably, the fermentation temperature for a mesophilic microorganism or a mesophilic culture is 21° C. In some embodiments, the fermentation temperature is 22° C. In some embodiments the fermentation temperature is 23° C. In other embodiments, the fermentation temperature is 24° C. In some embodiments, the fermentation temperature is 25° C. Examples for fermentation temperature include at 30, 37 and 43° C. Fermentation temperature may affect the properties of the resulting fermented milk product.

In some embodiments, fermentation is conducted in a water bath or heat exchanger. In some embodiments, fermentation is carried in a fermentation tank or a beaker. In particular fermentation is carried in a fermentation tank for stirred yogurt or in a beaker for set yogurt.

In some embodiments, fermentation, is ended when a specific pH is reached. This pH is preferably a more acidic pH than the starting pH of the milk substrate, most preferably a pH between 3 and 6, more preferably between 4 and 5. In some embodiments the pH at which fermentation ends is 4.5-4.8. In some embodiment the pH at which fermentation ends is 4.7. In some embodiments, the pH at which fermentation ends is 4.7. In some embodiments, the pH at which fermentation ends is at or around 4.6.

Most preferably, fermentation ends when the reduction in pH reduces the activity of, or completely inactivates, the low pH sensitive peptidase.

In some embodiments, after fermentation, the now fermented milk product is cooled, preferably immediately as described above (see section entitled "Fermented Milk Product"). This may be before or after stirring, or no stirring may occur depending on the preferred product. This cooling may take place for example, using a water bath. Cooling can take place in one or two steps as described above. In some embodiments, the fermented milk product is cooled to 20-30° C. In some embodiments, the fermented milk product is cooled to around 25° C. or to 25° C. Alternatively, in one embodiment the fermented milk product is cooled to a lower temperature of 1-10° C., most preferably 4-6° C., after step (b) of the method of the invention. In some embodiments, this cooling is carried out slowly by placing the fermented milk product in a cold room or refrigerator. Alternatively both of these cooling steps can be applied, one after the other (as described above).

Fermentation may be stopped by cooling, or by the pH which may inhibit or kill the microorganisms of the fermentation culture. Cooling stops the fermentation process. The fermented milk product can be stored at preferably 4-6° C., as further described above.

Microorganism

The methods as described herein use a microorganism. This is for fermentation purposes. The microorganism used according to the invention is an exogenous microorganism.

The term "exogenous" as used herein means that the microorganism is not typically found in milk, and hence is obtained from a different (i.e. non-milk) source.

In some embodiments, said microorganism is a lactic acid bacterium.

As used herein, the term "lactic acid bacteria" (LAB) refers to any bacteria which produce lactic acid as the end product of carbohydrate fermentation. In a particular embodiment, the LAB is selected from the group consisting of species *Streptococcus, Lactococcus, Lactobacillus, Leuconostoc, Pseudoleuconostoc, Pediococcus, Propionibacteriu, Enterococcus, Brevibacterium* and *Bifidobacterium* or any combination thereof, and any strains thereof. Examples of suitable microorganism strains include *Lactococcus lactis* subsp *lactis, Lactococcus lactis* subsp *cremoris, Lactococcus lactis* subsp. *lactis biovar diacetylactis, Leuconostoc mesenteroides* subsp *cremoris, Lactococcus lactis* subsp *lactis, Lactococcus lactis* subsp *cremoris, Streptococcus thermophilus* and *Lactobacillus delbrueckii* subsp. *Bulgaricus*. A fermenting or otherwise growing colony of microorganisms (particularly LAB) may be referred to as a "culture".

In one aspect the LAB is a mesophilic culture. In some embodiments, fermentation of such a LAB is carried out at 15-30° C., most preferably 20-25° C.

A mesophilic culture may be Probat 505, Choozit 220 or Choozit 230 for example. These cultures are commercially available from DuPont.

In a further aspect, the LAB is a thermophilic culture. In some embodiments, fermentation of such a LAB is carried out at 30-55° C., most preferably 37-43° C. and most preferably at 43° C.

A thermophilic culture may be YO-MIX 414, 532 and 860 for example. These cultures are commercially available from DuPont.

In one embodiment the thermophilic culture used in the present invention is YO-MIX™ 860. This culture comprises the *Streptococcus thermophilus* strain CNCM I-2980 as taught by WO 2004/085607 (incorporated herein by reference) and *Lactobacillus delbrueckii* subsp. *Bulgaricus*.

In particular, the lactic acid bacteria (LAB) may be used in a blended culture, in an inoculum or a starter culture.

Starter Cultures

The lactic acid bacteria (LAB) may be used in a starter culture.

In a particular embodiment the starter culture of the invention comprises the LAB and a low pH sensitive peptidase as described above.

The starter culture of the invention may be frozen, dried (e.g. spray dried), freeze dried, liquid, solid, in the form of pellets or frozen pellets, or in a powder or dried powder. The starter culture may be formulated and/or packaged as described above.

The starter culture may also comprise more than one LAB strain. In some embodiments, said LAB starter culture, has a concentration of LAB which is between 107 and 1011 CFU, and more preferably at least at least 107, at least 108, at least 109, at least 1010 or at least 1011 CFU/g of the starter culture.

The invention also provides the use of a starter culture as defined above.

The starter culture of the invention may preferably be used for producing a fermented milk product, in particular a fermented milk product of the invention. A fermented milk product of the invention may be obtained and is obtainable by adding a starter culture to a milk substrate and allowing the treated milk substrate to ferment.

Methods

In some embodiments, the methods describe herein produce a fermented milk product. Said fermented milk products have unexpected properties as described above.

Fermented milk products of the current invention preferably have improved viscosity. Preferably said fermented milk products have improved gel strength. Preferably said fermented milk products have improved texture. In one embodiment said fermented milk products have improved firmness of curd. Preferably said fermented milk products have earlier onset of fermentation and/or earlier onset of gelation and/or earlier conclusion of fermentation. In a preferred embodiment said fermented milk products have reduced syneresis. In one embodiment said fermented milk products have improved shelf-life.

In some embodiments the fermented milk products of the current invention have one or more of the following features: (a) improved viscosity; (b) improved gel strength; (c) improved texture; (d) improved firmness of curd; (e) earlier onset of fermentation; (f) earlier onset of gelation; (g) earlier conclusion of fermentation; (h) reduced syneresis; (i) improved shelf-life and/or (j) improved taste.

In particular, the current invention includes the use of one or more proteases in the production of a fermented milk product as discussed above.

In some embodiments, the present disclosure includes a method for preparing a fermented milk product, the method comprising: (a) treating a milk substrate whose protein content is higher than 4% with one or more proteases and a microorganism; and (b) allowing the treated milk substrate to ferment to produce the fermented milk product.

In some embodiments, the protein content of the milk substrate is between 5 and 10% inclusive. In some embodiments, the protein content of the milk substrate is 10% or higher.

In some embodiments, the peptide lysis level in the milk substrate is equal to or greater than 20%.

In some embodiments, one of said one or more proteases belongs to Enzyme Commission (E.C.) No. 3.4.17, 3.4.21 or 3.4.24. In some embodiments, the one of said one or more proteases is from family M4. In some embodiments, the one or more proteases is a metalloprotease.

In some embodiments, the protease has at least 80, 81, 82, 83, 84, 85, 86, 87, 88, 89, 90, 91, 92, 93, 94, 95, 96, 97, 98 or 99% identity with the amino acid SEQ ID No.3. In some embodiments, the protease has at least 90% identity with the amino acid SEQ ID No.3. In some embodiments, the protease has at least 95% identity with the amino acid SEQ ID No.3. In some embodiments, the one of said one or more proteases is a subtilisin, a serine protease, an acid protease, or a neutral protease. In some embodiments, the protease has at least 80, 81, 82, 83, 84, 85, 86, 87, 88, 89, 90, 91, 92, 93, 94, 95, 96, 97, 98 or 99% identity with the amino acid SEQ ID No.1. In some embodiments, the protease has at least 90% identity with the amino acid SEQ ID No.1. In some embodiments, the protease has at least 95% identity with the amino acid SEQ ID No.1.

In some embodiments, the protease has at least 80, 81, 82, 83, 84, 85, 86, 87, 88, 89, 90, 91, 92, 93, 94, 95, 96, 97, 98 or 99% identity with the amino acid SEQ ID No.2. In some embodiments, the protease has at least 90% identity with the amino acid SEQ ID No.2. In some embodiments, the protease has at least 95% identity with the amino acid SEQ ID No.2. In some embodiments, the milk substrate is treated with said one or more proteases prior to a pasteurization step as described above.

In some embodiments, the one or more proteases are added together with said microorganism. In some embodiments, a subtilisin, a serine protease, an acid protease, or a neutral protease is added to the milk substrate prior to a pasteurization step. In some embodiments, a subtilisin or a serine protease is added to the milk substrate prior to a pasteurization step.

In some embodiments, a metalloprotease is added together with said microorganism. In some embodiments, a subtilisin or a serine protease is added to the milk substrate prior to a pasteurization step and wherein metalloprotease is added together with said microorganism. In some embodiments, the subtilisin or serine protease has at least 80, 81, 82, 83, 84, 85, 86, 87, 88, 89, 90, 91, 92, 93, 94, 95, 96, 97, 98 or 99% identity with the amino acid SEQ ID No.1 or SEQ ID No.2.

In some embodiments, a metalloprotease has at least 80, 81, 82, 83, 84, 85, 86, 87, 88, 89, 90, 91, 92, 93, 94, 95, 96, 97, 98 or 99% identity with the amino acid SEQ ID No.3. In some embodiments, the dose of the one or more proteases described herein is selected such that the viscosity of a high protein milk substrate is decreased without exceeding the threshold for the perception of bitterness due to the liberation of small bitter tasting peptides.

In some embodiments, the microorganism is a lactic acid bacterium. In some embodiments, the microorganism is of the genus *Streptococcus, Lactococcus, Lactobacillus, Leuconostoc, Pseudoleuconostoc, Pediococcus, Propionibacterium, Enterococcus, Brevibacterium* and *Bifidobacterium* or any combination thereof.

The process of fermenting milk to produce fermented milk products is well known in the art and the specific conditions vary depending on the type of milk substrate and microorganisms used, the final specifications needed for the fermented product and the specific fermenting processes. The methods described herein can be applied to any fermenting process known in the art. It is to be understood that certain parameters of the compositions and methods described herein may be adjusted depending to the properties needed for the fermented milk products and/or the specific fermenting process and/or specific microorganism to obtain such optimal properties in the fermented milk products.

EXAMPLES

The present disclosure is described in further detail in the following examples, which are not in any way intended to limit the scope of the disclosure as claimed. The attached figures are meant to be considered as integral parts of the specification and description of the disclosure. The following examples are offered to illustrate, but not to limit the claimed disclosure.

Example 1

The objective of the following example was to reduce the viscosity of high protein yoghurts. In order to standardize the milk to a protein content of 10% (w/v), skimmed milk powder and Milkprotein70 were applied. Different amounts of Protex 7L (P7L) as well as Protex 6L (P6L) were added to the yogurt milk before or after pasteurization in order to test the optimal conditions to reduce the yogurt viscosity. The fermentations were conducted employing YM 860 and YM 410 at 43° C. to a final pH of 4.6. High protein yogurts produced by YM 860 showed an overall better appearance than the ones fermented with YM 410. For the protein sources used, Milkprotein70 showed better properties in terms of the yogurts general texture and had less off-flavor compared to yogurt from milk standardized with SMP. The best results, related to enzyme addition, were shown when P7L was added after pasteurization, in dosages >22.4 U/kg. The addition of 80 U/kg P7L to yogurt standardized with MP70 led to a 30% reduced shear stress, which was the highest achieved reduction in this study.

Materials and Methods
Laboratory-Scale Production of Stirred Yogurt Samples

Either Skimmed milk powder, Milk Protein (MP 70) or whey protein concentrate (WPC 80) was added to skimmed milk (1.5% (w/v) fat; Arla, Viby, Denmark) in order to standardize the milk to a protein content of 10% (w/v). In order to test their capability of viscosity reduction, Protex 6L (P6L) and Protex 7L (P7L) were added 90 min before or after pasteurization (600 s, 90° C.) before the fermentation was conducted. Fermentation was started by applying YO-Mix 860 (YM 860) and YO-Mix 410 (YM 410). Both cultures are used in the dairy industry for yogurts with higher protein content. A rather high amount of pre-culture, 5 mL/L, was applied, since the high amount of protein and its partial hydrolysis after enzyme addition, is resulting in an increased buffering capacity, which led in pre-trials to very long fermentation times (data not shown). The inoculated milk was poured into glass beakers containing 100 ml each and fermented at 43° C. to a final pH of 4.6. Subsequently, the yogurts were first mixed by hand with a spoon 30-times, before they were stirred in glass beakers for 15 s using a hand mixer (IdeenWelt, Rossmann, Germany) at level 1. The yogurt was filled into plastic cups and closed with a lid to prevent the yoghurt from drying. Until the measurements were performed after 5, 14 and 27 days the samples were stored at 5° C.

Rheological Analysis

The viscosity of the pasteurized milk before pasteurization was measured applying a viscometer (Brookfield, Middleboro, USA) 30 rpm, spindle S62.

For the stirred yogurt samples a flow curve was performed after 6 and 14 days of storage.

Measurements were performed using the MCR302 rheometer by Anton Paar. A rheometer applies a well-defined shear rate (rotation) to the product and measures the force needed to do that. The instrument is normally used to simulate shear stress in industrial-scale plants for mouth feel, thereby giving information about the robustness of the products. The rheometer draws a flow curve. This means that the shear stress is measured during an increased shear rate (up curve). At the defined endpoint, the shear rate is decreased again, and the down curve is obtained. The area between the curves provides information about structure recovery potentials in the product.

The MCR 302 Rheometer from Anton Paar can be used for characterizing drinking yogurt and stirred yogurt. It enables forecasting (and quantification) of thickness, stickiness and mouthfeel. The instrument can be used for other applications and products. Years of experiments show that sensory attributes can be estimated at specific shear rates.

TABLE 1

| Extraction of sensory attributes from flow curves | |
|---|---|
| Sensory attribute | Shear rate value |
| Thickness in the mouth | 10 s$^{-1}$ |
| Stickiness in the mouth | 10 s$^{-1}$ to 40 s$^{-1}$ |
| Mouthfeel in the mouth | Endpoint 200 s$^{-1}$ or 350 s$^{-1}$ |

Flow curves were measured at 10° C. using the measuring system CP50-2/TG-SN25648 with the measuring cone CP50-2/TG. The flow curve is measured during increasing and subsequent decreasing shear rate with $Y_{up}$=0,1-200 s$^{-1}$ and $Y_{down}$=200-0,1 s$^{-1}$, considering only the increasing shear rate in the following results.

Results and Discussion
Influence of Used Protein Source and Heat Treatment

To check if there is a protein source favorable in terms of processability, SMP, Promilk 70, and WPC 80 were used to obtain the protein content of 10% (w/v). Already before the fermentation, right after pasteurization (90° C., 10 min), an increase in viscosity was recognized, regardless which protein source was used. The addition of the whey protein (WPC 80) resulted in a gel-like product, which made further processing impossible.

This solidity can be explained by a disadvantageous whey protein proportion combined with an unfavorable combination of length and temperature of heat treatment, which leads to the formation of aggregates mainly composed out of whey proteins (Beaulieu et al., 1999, Chever et al., 2014). Pasteurized milk made out of MP 70 showed better results in terms of viscosity than SMP right after pasteurization. Whereas the milk standardized with SMP was hard to pour and had many visible lumps, the milk with MP 70 addition resembled more the control. As a control, milk without any protein addition was pasteurized together with the samples. The results of the viscosity measurement, presented in Table 2 reveal that in both samples the protein addition caused an increase in viscosity. The high viscosity measured for SMP confirms the impression of a very viscous product, which is hard to handle during further processing.

Table 2 shows the viscosity of milk with a protein content of 10% (w/v) after pasteurization, standardized with either SMP or MP70 compared to milk, from the same batch, but without any protein addition (3.5% (w/v) protein content).

TABLE 2

Viscosity of milk with a protein content of 10% (w/v) after pasteurization

| | Viscosity [mPa · s] |
|---|---|
| Skimmed milk powder | 560 |
| Milkprotein70 | 28 |
| Control | 3 |

A possible explanation for these results is the higher protein content of Promilk 70 (70% (w/w) Protein). Since SMP has only a protein content of about 36% (w/w), it is necessary to add a higher amount of SMP to the milk compared to MP70, leading to a higher dry mass and thereby to a higher viscosity. Maybe also the whey protein ratio is more favorable in MP70, resulting in fewer aggregates.

Trying to avoid the aggregation of whey protein, a different heat-treatment was tested as well. The milk was heated in the autoclave only for 1 min at 85° C., which resulted for samples enriched with WPC in a stiff product as well. Milk mixed with SMP and MP70 showed a thinner consistency compared to a normal heat treatment right after pasteurization (data not shown). To determine the influence of the two protein sources in products fermented by different cultures (YM 410, YM 860), the following experiments were performed twice for milk enriched with SMP as well as for milk with a protein content of 10% (w/v) achieved by adding MP 70.

After general problems of protein addition to milk in connection with the pasteurization were shown in the previous experiment, the following experiments were conducted dealing with the viscosity reduction of the fermented high-protein yogurts and the influence the protein source, the used culture and, above all, the addition of the enzymes P6L and P7L have.

Influence of the Addition of Different Amounts of P6L or P7L on Yogurt Viscosity, when Added to Milk Before Pasteurization The addition of P7L, 90 min before milk pasteurization, resulted in a measurable decreased viscosity, compared to control samples without enzyme addition. FIG. 1 shows the best result achieved for the P7L addition before fermentation. The addition of 76 U/Kg P7L resulted in a 12% reduced shear stress after 5 days of storage.

However, the yogurts had other shortcomings. They were very grainy, showing big lumps and also causing problems during rheometer measurement.

Figure 2:
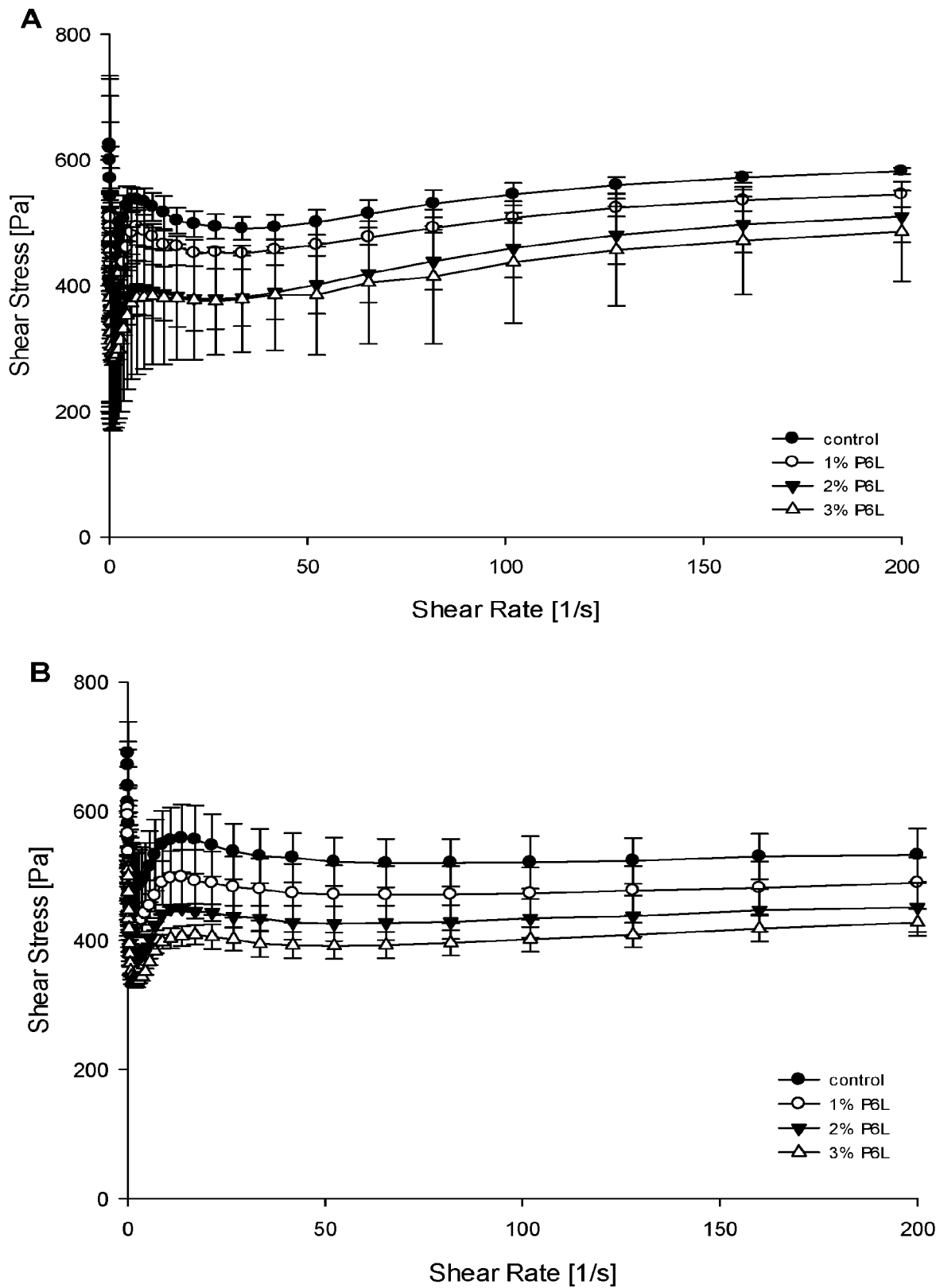
FIGS. 2A-2D show the effect of P6L addition on shear viscosity of stirred yogurt with a protein content of 10%. After 14 days of storage at 5° C. (A: YM 860, SMP; B: YM 860, MP70; C: YM 410, SMP; D: YM 410, MP70) Fermentation conditions: 43° C., pH: 4.6

The addition of P6L, also added 90 min before fermentation, showed more promising results. First positive results were visible right after pasteurization. The milk with added P6L, showed less lumps, a in general lower viscosity compared to the control and was thereby much easier to handle, the more enzyme was added. The produced yogurts showed as well a more significant reduction in viscosity compared to yogurts where P7L was added. The results of the rheometer measurements are shown in FIG. 2 A-D.

The results reveal that for stirred yogurt samples produced using YM 860 (FIGS. 2A and B) a slightly higher shear stress and thereby viscosity was measured, than for yogurts fermented by YM 410 (FIGS. 2C and D). However, the enzyme addition seemed to have more influence on yogurt fermented by YM 860. There, around 17% reduced shear stress was measured for yogurts with SMP and for MP70 yogurts a 20% reduction when 3% (v/w) P6L was added. For YM 410 the shear stress was only reduced by 9% (SMP) and 6% (MP70) for the highest amount of P6L tested. Furthermore, YM 860 resulted in a general creamier texture and also less graininess in all tested samples, so all of the following trials were conducted using YM 860. It also should be mentioned that no bitter taste or other off-flavors were perceivable, neither for SMP nor for MP70 at all the tested enzyme concentrations added before fermentation.

Influence of the Addition of P6L and P7L on Yogurt Viscosity; Addition after Pasteurization Having shown that P7L is not suitable for the use prior to pasteurization, its effect on viscosity should be shown when it was added after the pasteurization in the following experiments.

Figure 3:
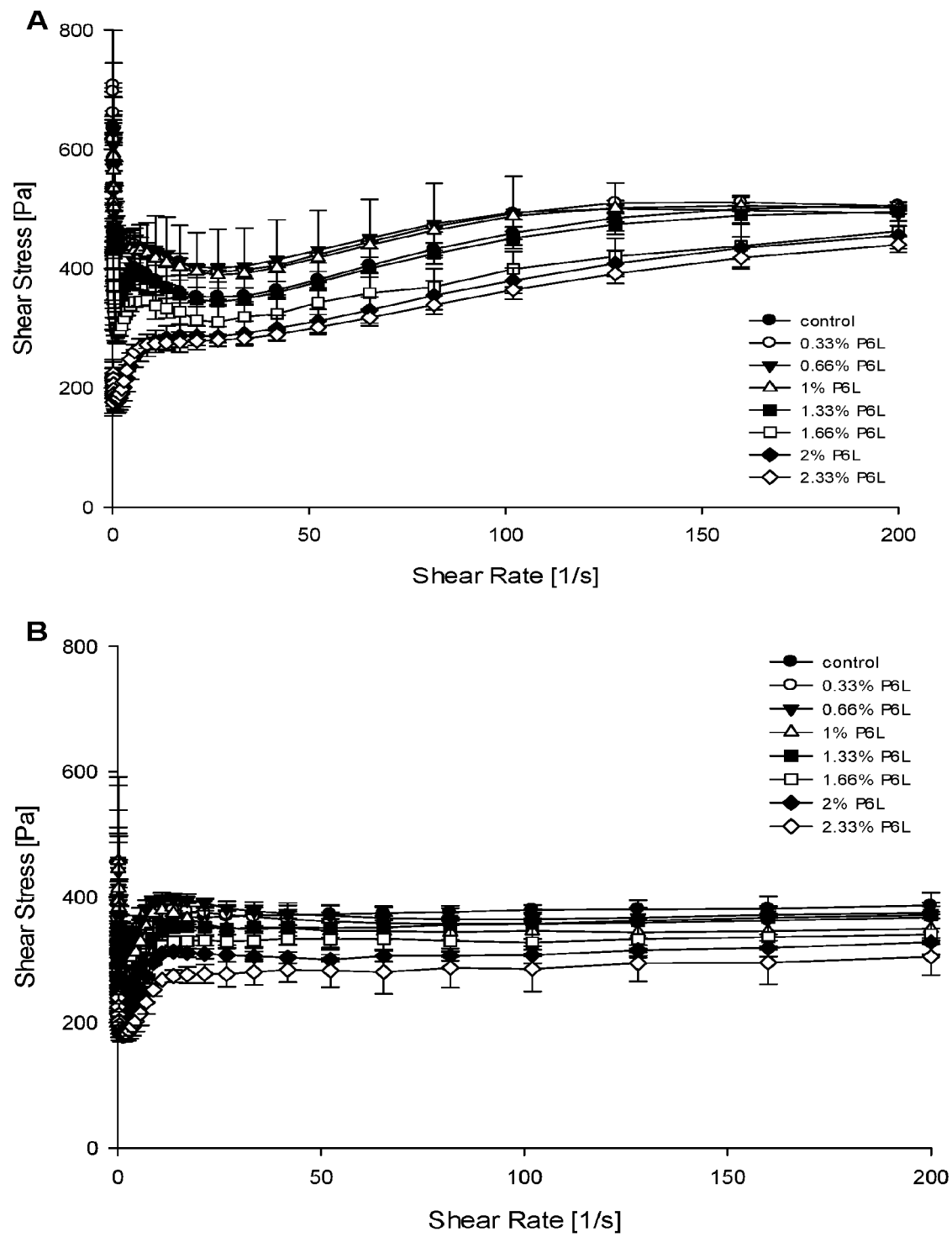
FIG. 3A-3D show the effect of P6L and P7L addition after pasteurization on shear viscosity of stirred yogurt with a protein content of 10%. After 5 days of storage at 5° C. (P6L: A: SMP; B: MP70; P7L: C: SMP; D: MP70) Fermentation conditions: 43° C., pH: 4.6
Figure 4:
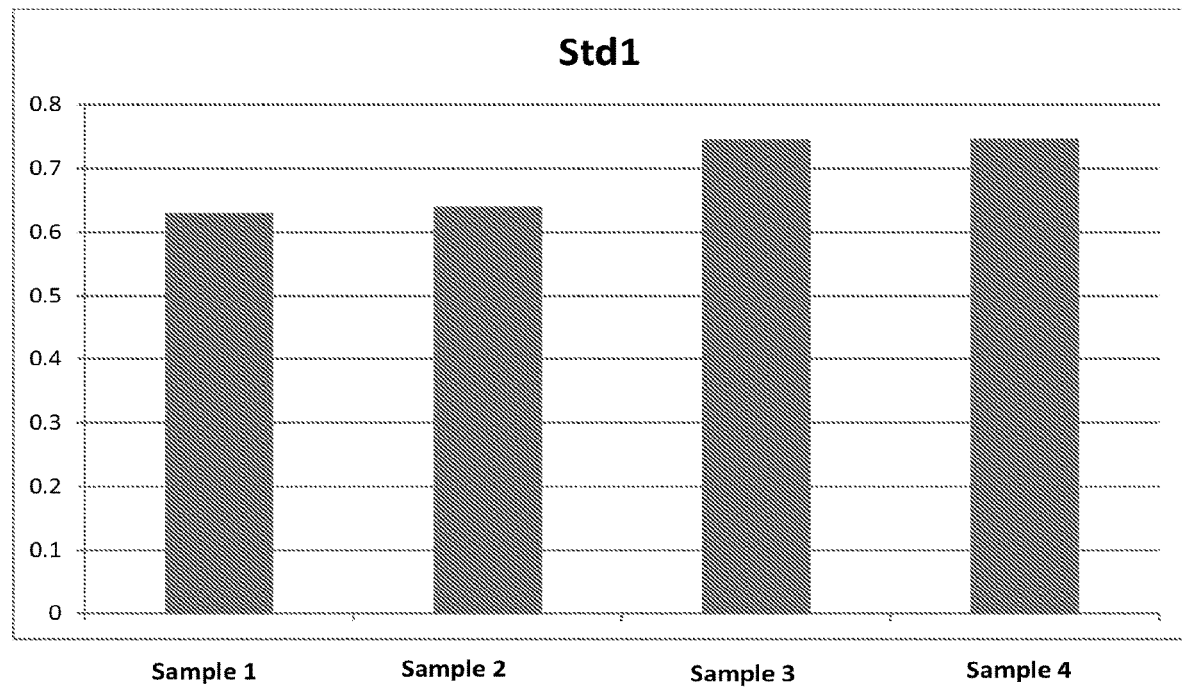
FIG. 4 shows std1 for samples 1-4 from Example 2.
Figure 5:
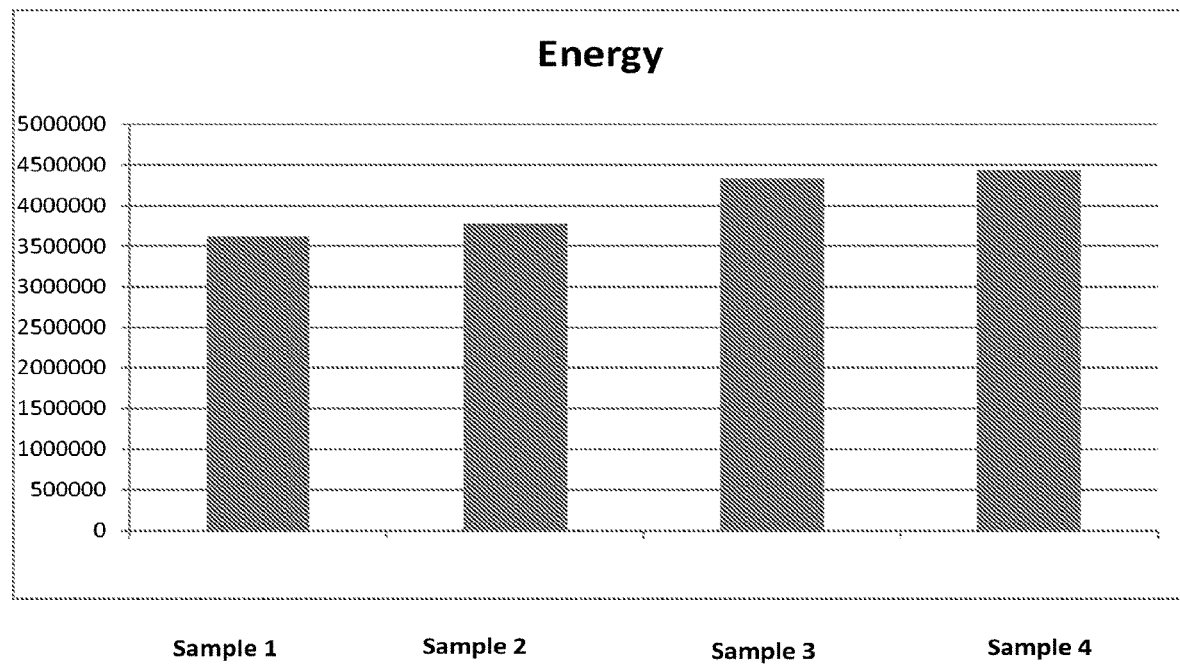
FIG. 5 shows Energy for samples 1-4 from Example 2.
Figure 6:
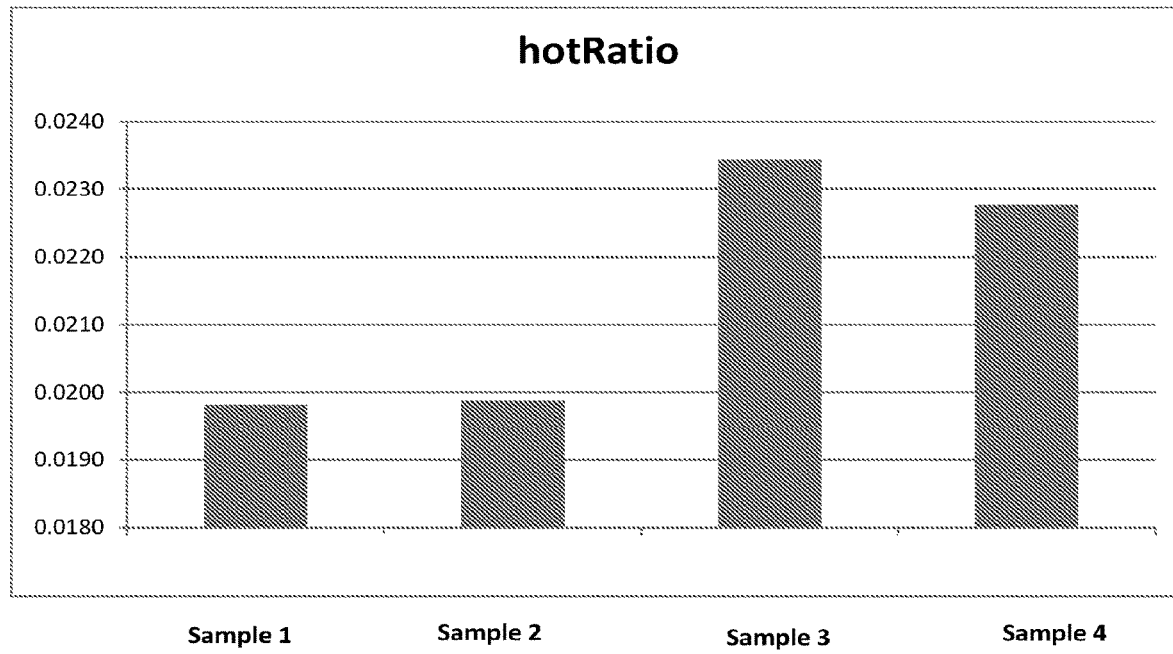
FIG. 6 shows hotRatio for samples 1-4 from Example 2.
Figure 7:
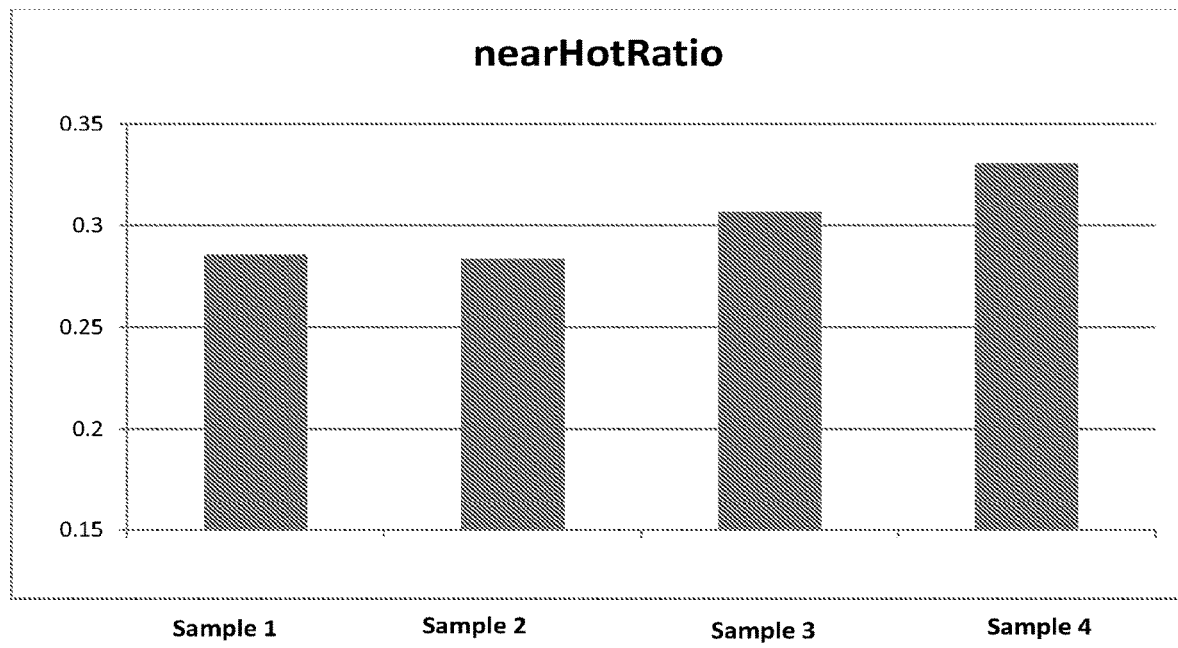
FIG. 7 shows nearhotRatio for samples 1-4 from Example 2.

Furthermore, the addition of P6L was tested as well. Again both, SMP and MP70 were tested. The results obtained are shown in FIG. 3 (A-D).

Both the addition of P6L as well as of P7L after pasteurization led to a visible improvement of the yogurts viscosity compared to the control samples. This could also be numerically represented by the rheometer results. An addition of 2.33% (v/w) resulted for yogurts, with P6L addition and where SMP was used for standardization, to a 13% reduction in shear stress. For yogurts with MP70, the reduction was 21%.

Even better results were obtained when high amounts of P7L were added. Whereas the addition of 11.2 U/kg and 22.4 U/kg resulted in, as expected due to the results of other studies, a slight increase of the measured shear stress, the addition of 80 U/kg lead to a significant reduction of 21% for SMP and 30% for MP70. Here the yogurts showed a creamy texture, almost without visible lumps.

A tasting of yogurt samples with different various amounts of P7L added showed that the yogurts with MP70 were perceived as more pleasant in taste, with less off-flavor. The adjustment of protein content with SMP resulted in a slightly cooked flavor for the addition of 68 U/kg and 80 U/kg P7L.

Conclusion

This study showed that by adding Protex 7L and/or Protex 6L it is possible to reduce the viscosity of high-protein yogurt samples, with best results shown for yogurts standardized to 10% protein content by adding MP70 and fermented by YM 860. Furthermore, the results revealed that in order to lower the viscosity it was most favorable to add P7L after pasteurization. For P6L, the time of addition was not as significant as for P7L. The highest viscosity reduction (30%) was achieved for the addition of 80 U/kg P7L added after pasteurization to milk standardized with MP70 and fermented with YM 860.

Example 2

The objective of this example was to produce a smoother high protein yogurt.

Measured Temperatures/Holding Time, During Processing:

| | 1 | 2 | 3 | 4 |
|---|---|---|---|---|
| Pasteurisation temperature ° C. | 95.00 | 95.00 | 95.00 | 95.00 |
| Holding time in seconds | 360.00 | 360.00 | 360.00 | 360.00 |

In order to standardize the milk to a protein content of 10% (w/w), Milkprotein 70 was applied. Different amounts of Protex 7L as well as Protex 6L were added to the yogurt milk before or after pasteurization in order to test the optimal conditions to produce a smoother high protein yogurt. The fermentations were conducted employing YM 860 at 43° C. to a final pH of 4.6.

Materials and Methods
Laboratory-Scale Production of Stirred Yogurt Samples

Milk Protein (MP 70) and cream (38% (w/w); Arla, Viby, Denmark) was added to skimmed milk (0.1% (w/w) fat; Arla, Viby, Denmark) in order to standardize the milk to a protein content of 10% (w/w) and a fat content of 1.5% (w/w). The milk was mixed under good agitation at 45° C. Protex 6L was added prior to pasteurization and homogenization, which was conducted at 95° C. for 6 min (P1: 65° C.; homogenization 80 bar P2: 80° C.; P3: 95° C. for 6 min). Following the pasteurization the milk was cooled to 22° C., and Protex 7L was added at a 7.8 U*kg-1 dosage together with the culture, just before the fermentation was started by applying YO-Mix 860 (YM 860). This culture is used in the dairy industry for yogurts with higher protein content. The inoculated milk was poured into glass beakers containing 100 ml each and fermented at 43° C. to a final pH of 4.6. As soon as pH 4.6 was achieved, the yogurt was manually stirred and subsequently cooled with a PHE with no additional backpressure than the one created by the fully opened backpressure valve to 24° C., and following stored in a cold room (4-6° C.).

Yoghurt stirred-UHT-MINI

Procedure 1) Mix all powder ingredients and add the dry blend to the milk/water under good agitation at 45° C. except the enzymes; 1 a) Cool down to ambient temperature to about 20-25 C; 1b) Add enzyme Protex 6 L to trial number 2 and 4, enzymate for 30 min under agitation Mini UHT.

START by adding 2 l UHT milk; 2-preheat to 65° C. (P1); 3) homogenize at 65° C./200 bar; 4) preheat to 80° C. (P2); 5) pasteurize 95° C. for 6 minutes (P3); 6) cool to 45° C. (K1); 7) cool to 5° C. (K2); END by adding 1 l milk Add the Protex 7 L to the trials 3 and 4; 8) Real time fermentation: Add starter culture YO-mix 860; 9) Fermentation at 43 C; 10) measure fermentation by Cinac pH equipment; 11) fermentation to pH 4,60; 12) cooling on plate heat exchanger to 24° C.; 13) filling; 15-store at 5° C.

FIGS. 4-7 show results. The results shown that all four samples are dull, but samples 1 and 2 are grainer than samples 3 and 4, as seen from the std1. Very smooth surfaces have a high 'Std1' value. Std1 is calculated by measuring the standard deviation a at the base level(0) and first level(1) in a Gaussian Pyramid. Std1 is value from level 1 divided with the value from level 0.

Sample 3 and 4 also appear more white and shinny than sample 1 and 2. (seen from the energy and HotRatio/nearHotRatio values).

Energy=how much light reflected from the whole sample.
HotRatio=How much light reflected in the small red ring seen in the picture from the surfacescan.
nearHotRatio=How much light reflected in the green ring seen in the picture from the surfacescan.

SurfaceScan has been developed to visualize and quantify light reflection from food surfaces, e.g. how shiny and grainy a yoghurt appears. The SurfaceScan uses a ring light with six LEDs and a standard greyscale camera. Smooth and very glossy yoghurt acts as a perfect mirror, resulting in a sharp image of the LED whereas grainy yoghurt is a "poor mirror" and hence results in a very diffuse image where the LED cannot be seen.

Example 3

Texture Increase in Protein Fortified Labneh by Applying NP7L in Combination with and without Alginate Labneh has been traditionally produced by physical separation of whey and subsequent concentration of dairy solids, mainly protein, in yogurt. Mainly due to its high levels of fat and protein (8-15% fat and 5-7% protein), production of Labneh without separation rarely achieves the same texture as a traditional method. Sandy, soft and dull looking textures represent a serious hurdle to overcome for dairy producers looking to upscale production of Labneh in a hygienic method that involves no concentration by separation. Skim recombined milk was standardised in terms of protein (6.1% (w/v)) and fat (8.0% (w/v)) with MPC70 and sweet whey powder. NaCl at 0.20-0.40% and sodium alginate at 0.054-0.072% were added prior to processing as part of industrialized Labneh's common recipes. The standardised milk was subjected to pasteurisation in a plate heat exchanger (PHE; 95° C.; 6 min). Subsequently, the milk was cooled to 4° C. for overnight storage and later on heated up and inoculated with YO-Mix 300 (20 DCU/100L; DuPont Culture Units) and CHOOZIT MA14 (10 DCU/100L) respectively. At the same time, an appropriate amount of NP7L (22.5-34.0 Units/kg), which was adjusted to each particular protein concentration, was added per 100 ml inoculated milk. The fermentation was conducted at 35° C. in a water bath in 5 liter vats. As soon as pH 4.6 was reached, the labneh was stirred manually and subsequently cooled with a PHE with no additional backpressure than the one created by the fully opened backpressure valve to 20-22° C., and following to 4-6° C. in a cooled room. Labneh samples were stored for 28 days, whereas flow curves were measured after 4 days using a cone plate method.

Figure 10:
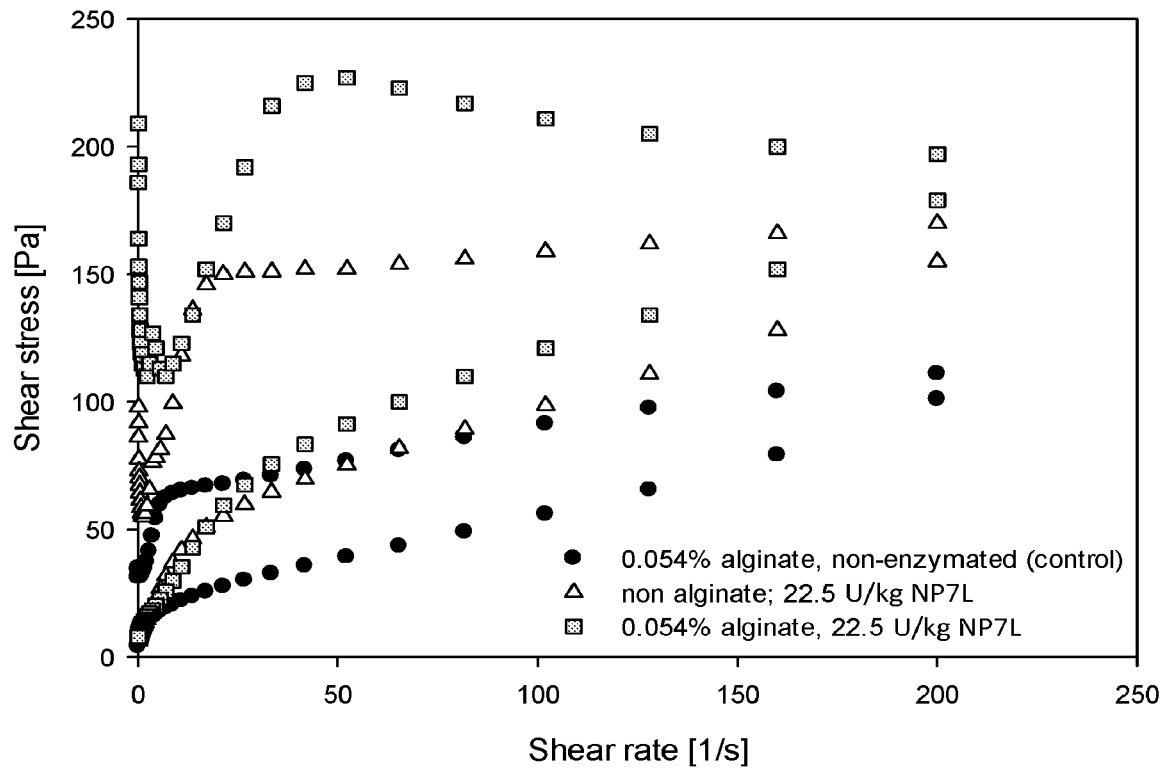
FIG. 10 shows an increase of apparent viscosity in Labneh fermentations with and without NP7L addition.
Figure 11:
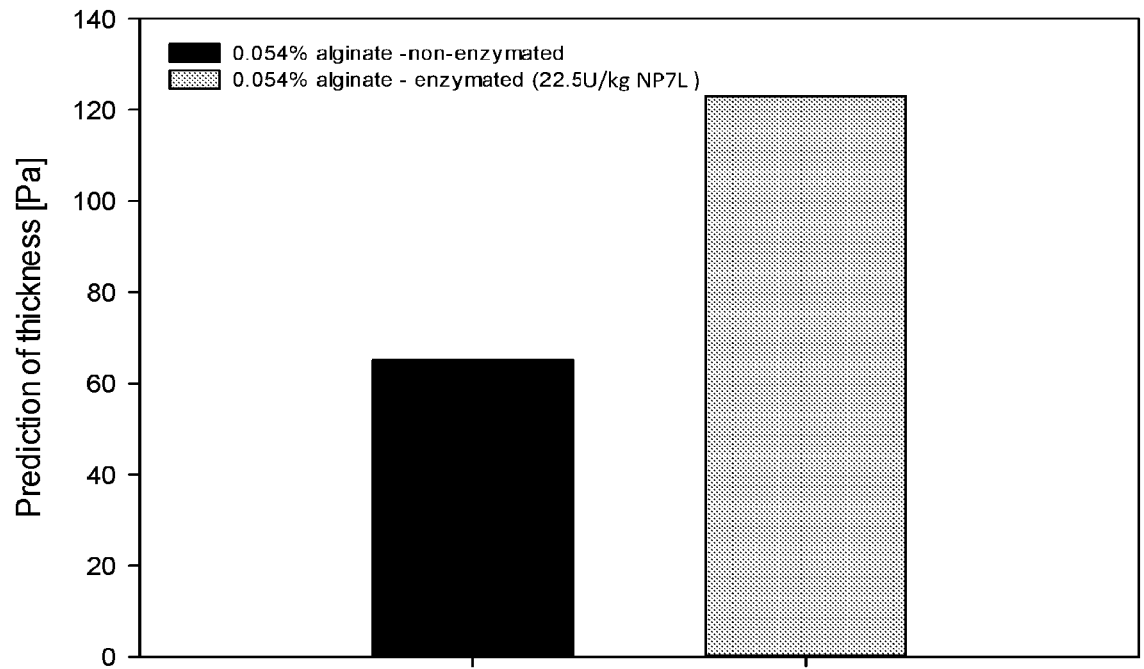
FIG. 11 shows the predicted thickness in mouth of Labneh fermentations with and without NP7L addition.
Figure 12:
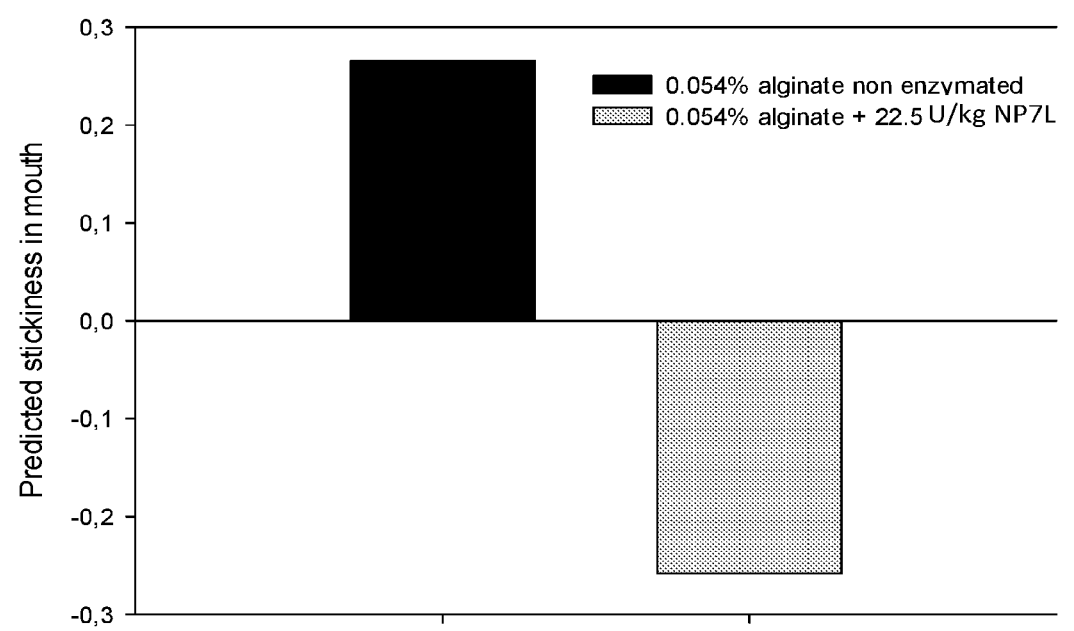
FIG. 12 shows the predicted stickiness in mouth of Labneh fermentations with and without NP7L addition.

Upon the application of NP7L, the apparent viscosity as well as the predicted "viscosity in mouth" (extracted shear stress at a shear rate of 10 $s^{*-1}$) were significantly increased by the addition of NP7L (FIGS. 10 and 11). Furthermore, the stickiness in mouth (slope of the linear regression of the shear rate range of 33-160 $s^{*-1}$) was eliminated due to the fact the slope of the enzymatically treated Labneh together with alginate addition has a negative slope (FIG. 12). A direct correlation between NP7L dosage and final Labneh viscosity was observed as well (data not shown). Labneh produced with the presence of NP7L was thick on the spoon, smooth in the mouth and eye and had a melting mouthcoating, all of these being positive attributes which cannot be obtained unless NP7L with or without alginate is used.

Example 4

Texture Increase in Sour Cream Employing NP7L

Pre-pasteurized skim milk (72° C.; 15 sec) was standardised in terms of fat (5.0 and 9.0% (w/w)) with cream 38% fat (w/w) which resulted in a protein content of 3.7% and 3.5% (w/w) for the 5% and 9% fat containing sour cream base, respectively. In a further trial, the milk was standardised to protein and fat of 4.2% (w/w) protein and 5% (w/w) fat as well as 4.2% (w/w) protein and 9% (w/w) fat. The protein fortified milk was subjected to pasteurisation in a plate heat exchanger (PHE; 95° C.; 6 min). Subsequently, the milk was cooled to 4° C. for overnight storage and later on reheated to 45° C. and cooled down to 22° C. to avoid fat crystallisation and inoculated with Probat™ 505 (7 DCU/100L; DuPont Culture Units) and *Lactococcus lactis* subsp. *cremoris* at 3 gram/100L, respectively. At the same time, an appropriate amount of NP7L (6.4-8.5 Units/kg), which was adjusted to each particular protein concentration, was added per 100 ml inoculated milk. The fermentation was conducted at 22° C. in a water bath in 5 liter vats for about 16-18 hours. As soon as pH 4.6 was reached, the sour cream fermentation was terminated, stirred manually and smoothened through a plate heat exchanger in-series with a Ytron-Z 1.50FC-2.0.1 (YTRON Process technology GmbH, Bad Ensdorf, Germany) adjusted to level 5 (5%) followed by filling in cups and storage in a cold room at 4-6° C. The sour cream samples were stored for 28 days, whereas flow curves were measured after 14 days using a cone plate method.

Figure 13:
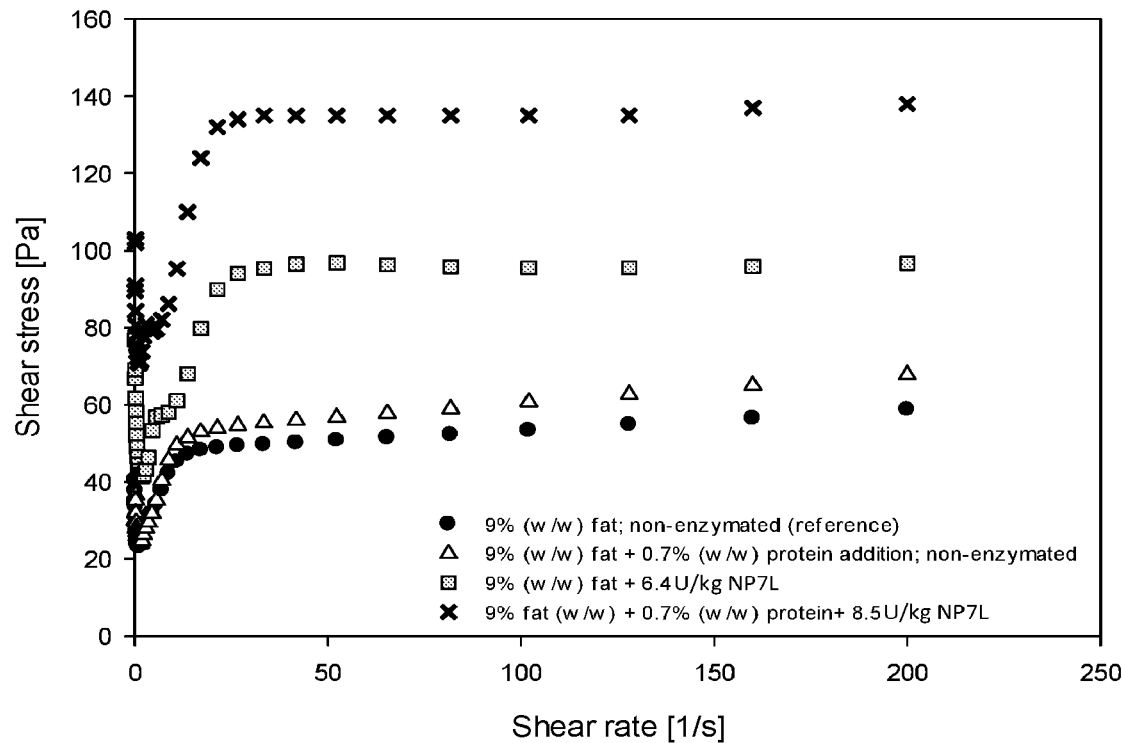
FIG. 13 shows an increase of apparent viscosity (up-curves) in sour cream containing 9% (w/w) fat with and without NP7L addition.
Figure 14:
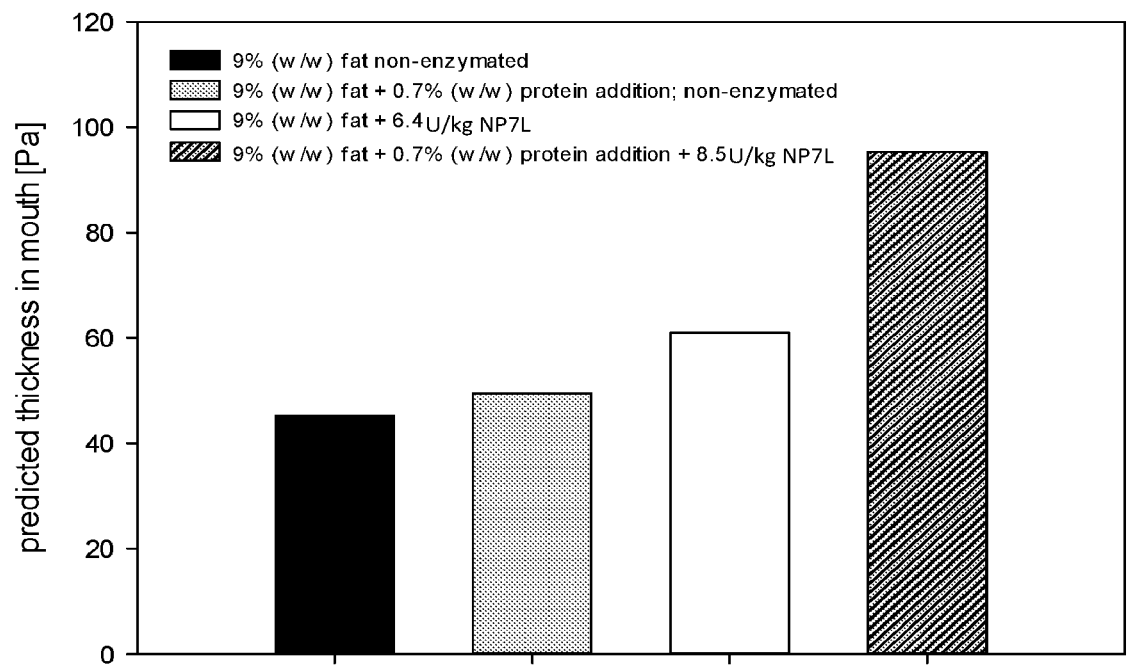
FIG. 14 shows predicted "thickness in mouth" of sour cream fermentations (with protein fortification, with NP7L or both in combination)
Figure 15:
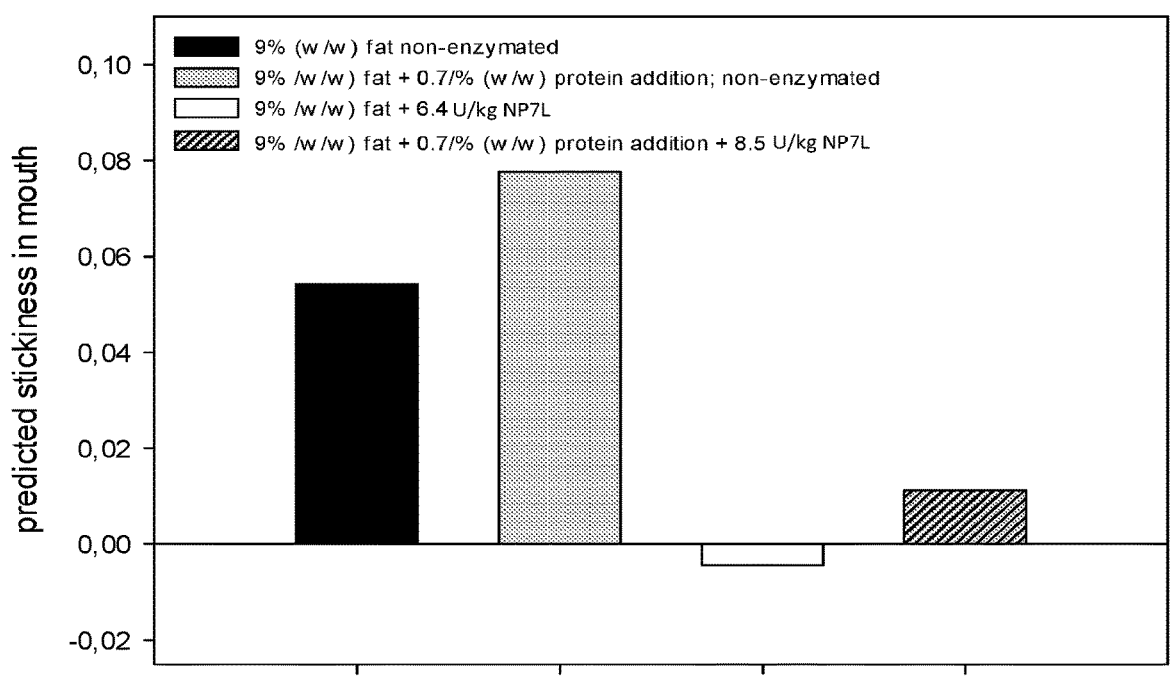
FIG. 15 shows the predicted stickiness in mouth of sour cream fermentations (with protein fortification, with NP7L or both in combination).

Upon the application of NP7L, the apparent viscosity (FIG. 13) as well as the predicted "thickness in mouth" (extracted shear stress at a shear rate of 10 s$^{*-1}$; FIG. 14) were significantly increased by the addition of NP7L. Moreover, a protein fortification together with enzymation with NP7L resulted in a synergistic viscosity increase being higher than the sum of protein fortification and NP7L addition on their own. Overall, the texture of the product was dominated by the thickness, while the stickiness (slope of the linear regression of the shear rate range of 33-160 s$^{*-1}$) of the produced sour cream was low. Moreover, the stickiness in mouth was significantly reduced due to the fact the slope of the enzymatically treated sour cream, or fortified and enzymatically treated sour cream has a negative slope or is less steep compared to the non-enzymatically treated reference (FIG. 15). A direct correlation between NP7L dosage and final sour cream viscosity was observed as well (data not shown).

Example 5

Sensory Analysis of Sour Cream with and without the Addition of NP7L

The 9% (w/w) fat containing sour cream base was made as follows. Skimmed milk (~4443 g), cream 38% fat (~1421 g) and skim milk powder (~146 g) were mixed under good agitation at 45° C. and subjected to homogenization and pasteurization at 95° C. for 6 minutes (P1: 65° C.; homogenization 80 bar P2: 80° C.; P3: 95° C. for 6 minutes). Following the pasteurization, the milk was cooled to 22° C. and the starter culture mixture was added (7 DCU/100L Probat™ 505 and *Lactococcus lactis* subsp. *cremoris* at 3 gram/100 L). At the same time, between 3.4 and 5.8 U/kg NP7L were added. The fermentation was conducted at 22° C. until pH 4.60 was measured. Next the sour cream was passed through a plate heat exchanger in-series with a Ytron-Z 1.50FC-2.0.1 (YTRON Process technology GmbH, Bad Ensdorf, Germany) adjusted to level 5 (5%) followed by filling in cups and storage in a cold room at 4-6° C. The final product had a fat content of 9.09% (w/w) and a protein content of 4.0% (w/w). The sour cream samples were stored at least for 5 days but no longer than 14 days and assessed by the sensory panel.

To describe the impact on sensory perceivable product attributes, descriptive sensory analysis was chosen. The basis for the descriptive analysis is ISO 13299 "Sensory analysis—Methodology—General guidance for establishing a sensory profile". In the sensory descriptive analysis, the intensity of each descriptor was evaluated on a line scale with two anchor points indicating low and high intensity, respectively. The anchor points for low and high was taught to the panel in the training/calibration sessions. All samples were evaluated in triplicate. The sensory panel consists of 7 persons, who have all passed the basic sensory screening test before they were accepted in the panel before taking part in the descriptive analysis of this analysis. The panelists were trained in recognizing and intensity scaling of the product attributes. A definition of the attributes can be found in Table 3.

TABLE 3

| Definition of tested attributes in the sensory assessment of high protein yogurt | |
|---|---|
| Uneven surface | Use the spoon to cut the sample, inspect the cut surface and evaluate how gritty/uneven the freshly cut surface is |
| Resistance - Spoon | Slowly stir the sample 5 times without letting the spoon touch the beaker. Evaluate the samples resistance against the spoon. "Much" is when much force is needed. |
| Thickflow - Spoon | Let some sample drip from the spoon held 5 cm above the beaker. "Much" is when it falls in lumps and "little" is when it runs continuously from the spoon to the beaker. |
| Thickflow - Mouth | Take some sample into your mouth. Evaluate its thickness. How much force is needed to press the tongue towards the palate? |
| Soft/Velvet | Take some sample into your mouth. Evaluate its softness by gently swirling the sample around in the oral cavity with your tongue. How velvet-like does the sample feel? |
| Fat perception | Take some sample into your mouth. Evaluate its fat content by gently swirling the sample around in the oral cavity with your tongue. |
| Acidity | Take a new spoonful of sample. Evaluate the intensity of acidic taste in your mouth. |
| Bitter | Evaluate the intensity of bitter taste in your mouth. |
| Sweetness | Evaluate the intensity of sweet taste in the mouth. |
| Flavor | In a new spoonful of sample, app. 5 ml, evaluate the harmony among flavors and the overall flavor/aroma intensity in the mouth. |

Figure 16:
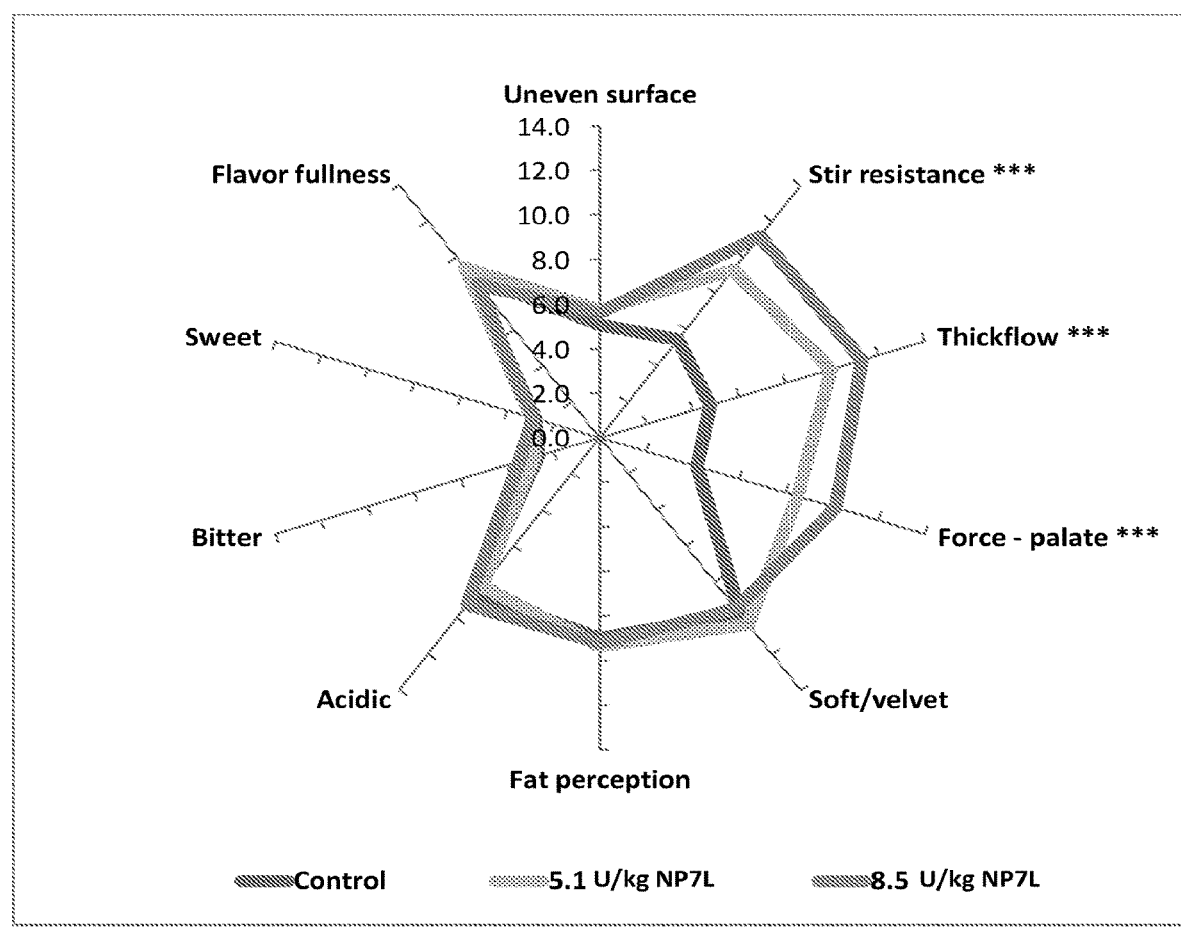
FIG. 16 shows a spidergraph of a sensory evaluation of an 9% (w/w) fat containing sour cream with and without addition of NP7L (***both enzymated samples are different from the non-enzymated ($p<0.05$)).

As shown in FIG. 16, the sensory attributes: uneven surface, flavor fullness, sweet, bitter, acidic, fat perception and soft/velvet remained non-significant upon the application of the NP7L. However, all attributes related to viscosity were significantly increased (p<0.05) (stir resistance, thickflow spoon and force-palate). There was no change in bitterness upon the application of the NP7L (non-significant).

Example 6

Sensory Analysis of Prior to Fermentation Concentrated Skimmed Milk Resulting in High Protein Yogurt Pre-pasteurized skim milk (72° C.; 15 sec) was subjected to ultrafiltration (tailor-made; 20 kDa spiral-membrane; 4 h; 4-6° C.) in order to concentrate the milk to 10% (w/w) protein. The pre-concentrated milk was either diluted to 9% (w/w) protein with permeate and subjected to pasteurization or was kept frozen (−20° C.) for no longer than 6 weeks, defrosted and then diluted with frozen permeate. The UF pre-concentrated milk was pasteurized as follows. Preheat to 65° C. (P1), homogenize at 65° C./200 bar, preheat to 80° C. (P2) and finally pasteurized 95° C. for 6 minutes (tailor-made pasteurizer, Service Teknik, Randers, Denmark). Subsequently, the milk was cooled down to 10° C. until the fermentation was started. As starter culture YO-Mix™ 860 (20 DCU/100 L) was used, at the same time 18.4 U/kg NP7L were added to the milk. The fermentation was conducted at 43° C. until pH 4.60, subsequently, the yogurt was manual stirred and passed through a plate heat exchanger in-series with a Ytron-Z 1.50FC-2.0.1 (YTRON Process technology GmbH, Bad Ensdorf, Germany) adjusted to 30% followed by filling in cups and storage in a cold room at 4-6° C.

To describe the impact on sensory perceivable product attributes, descriptive sensory analysis was chosen. The basis for the descriptive analysis was ISO 13299 "Sensory analysis—Methodology—General guidance for establishing a sensory profile". In the sensory descriptive analysis, the intensity of each descriptor was evaluated on a line scale with two anchor points indicating low and high intensity, respectively. The anchor points for low and high was taught to the panel in the training/calibration sessions. All samples were evaluated in triplicate. The sensory panel consisted of 8 persons, who have all passed the basic sensory screening test before they were accepted in the panel before taking part in the descriptive analysis of this analysis. The panelists were trained in recognizing and intensity scaling of the product attributes. A definition of the attributes can be found in Table 4.

TABLE 4

| | Definition of tested attributes in the sensory assessment of high protein yogurt |
|---|---|
| Gloss | Evaluate the reflection of light in the sample surface before any manipulation. "Much" is mirror-like. |
| Resistance - Spoon | Slowly stir the sample 5 times without letting the spoon touch the beaker. Evaluate the samples resistance against the spoon. "Much" is when much force is needed. |
| Sticky - Spoon | Let some sample drip from the spoon held 5 cm above the beaker. "Much" is when it falls in lumps and "little" is when it runs continuously from the spoon to the beaker. |
| Thickflow - Mouth | Take some sample into your mouth. Evaluate its thickness. How much force is needed to press the tongue towards the palate? |

TABLE 4-continued

| | Definition of tested attributes in the sensory assessment of high protein yogurt |
|---|---|
| Sticky - Mouth | How difficult is it to remove the tongue from the palate after the above evaluation? Press the tongue repeatedly against the palate and notice how it is released. "Much" is when the tongue seems to stick to the palate. |
| Soft/Velvet | Take some sample into your mouth. Evaluate its softness by gently swirling the sample around in the oral cavity with your tongue. How velvet-like does the sample feel? |
| Particles | Evaluate the amount of "flour"/powder or grains or lumps in the mouth after swallowing, perceived as not-dissolved sample left in the mouth. |
| Dry/Astringent | When the sample is gone, the astringent sensation in the mouth is evaluated. "Much" is if the throat feels dry, as with tannin acid. |
| Acidity | Take a new spoonful of sample. Evaluate the intensity of acidic taste in your mouth. |
| Bitter | Evaluate the intensity of bitter taste in your mouth. |
| Cheesy | Evaluate the intensity of cheesy taste in your mouth. |
| Mouth Coating | Wait for 10-15 seconds after swallowing, before evaluating the amount of sample in the mouth. "Much" is if it is necessary to swallow several times. |

Figure 17:
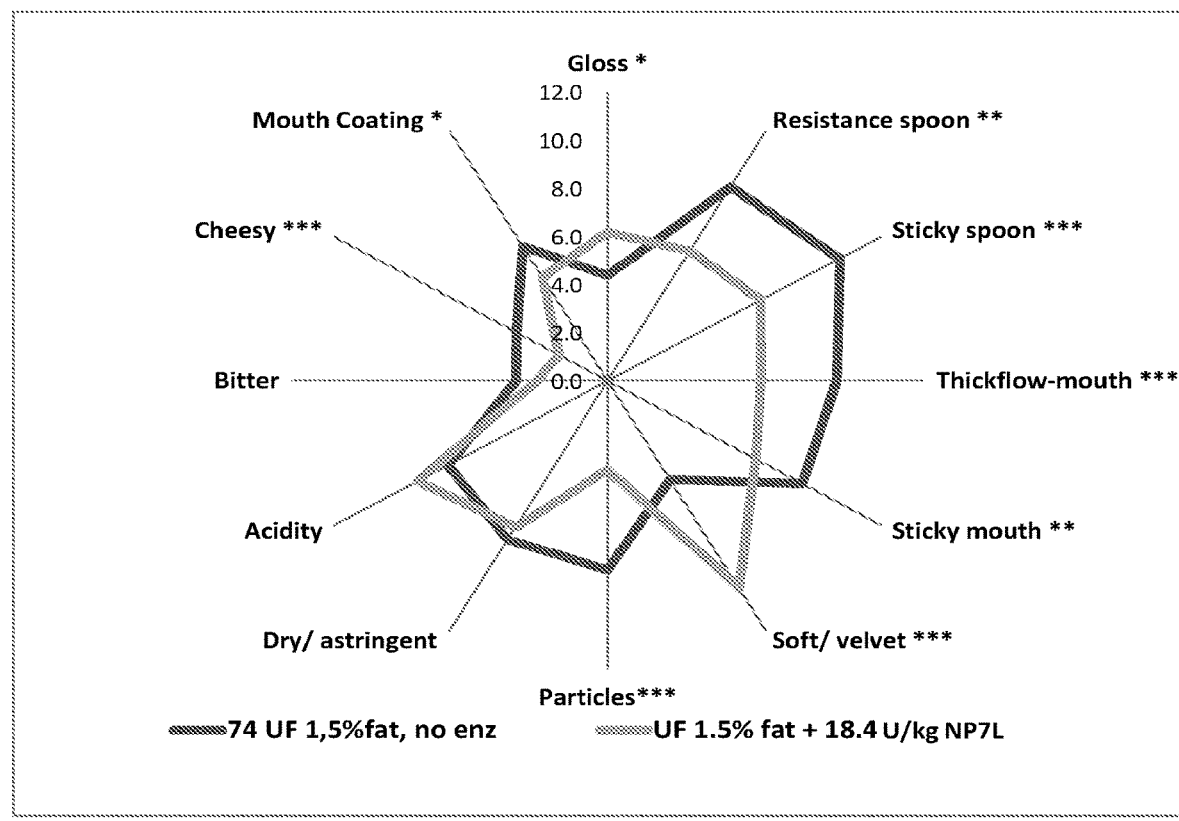
FIG. 17 shows a spidergraph of prior to fermentation concentrated milk followed by lactic acid fermentation (YO-MIX 860, 43 C; 1.5% (w/w) fat; with and without NP7L addition; *$p<0.001$, $p<0.01$, *$p<0.05$).
Figure 18:
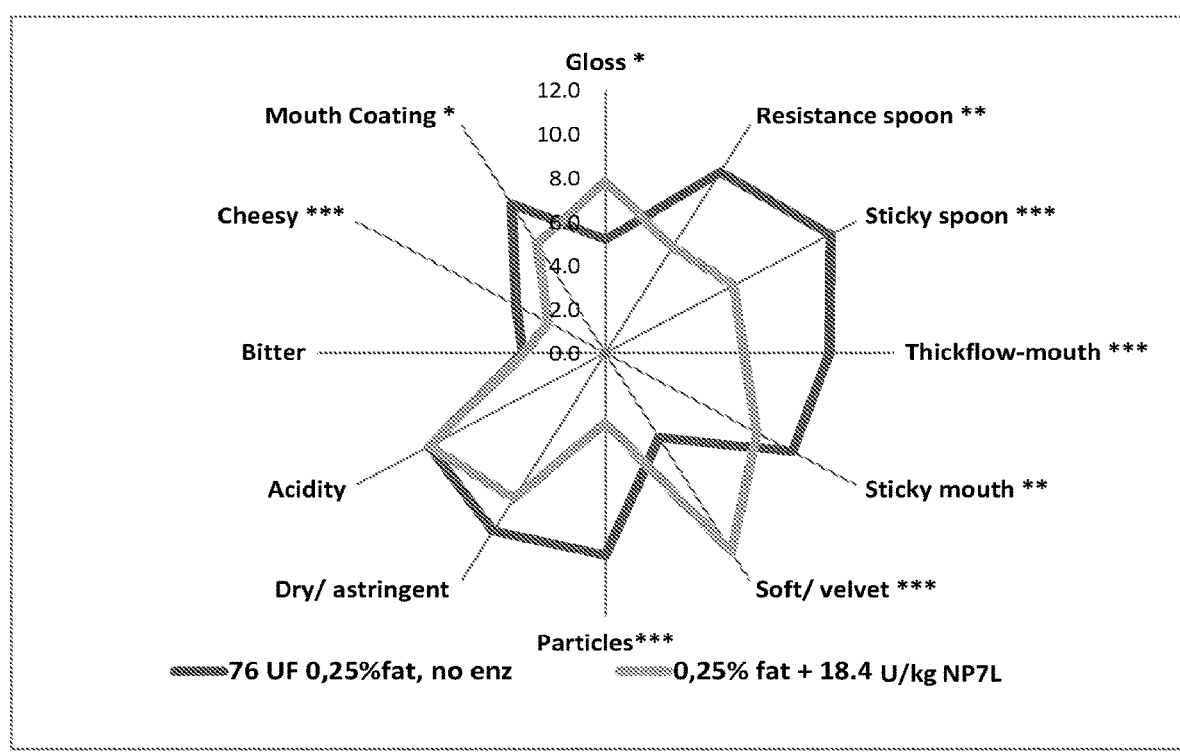
FIG. 18 shows a spidergraph of prior to fermentation concentrated milk followed by lactic acid fermentation (YO-MIX 860, 43 C; 0.25% (w/w) fat; with and without NP7L addition; *$p<0.001$, $p<0.01$, *$p<0.05$).

As shown in FIGS. 17 and 18, upon the addition of the NP7L in a dosage of 18.4 U/kg, there was a significant reduction mouth coating as well as a significant increase in gloss (p<0.05), the high protein yogurt containing 0.25% (w/w) fat as well as 1.5% (w/w) fat. The attribute "gloss" was increased (p<0.05). The resistance on the spoon and the stickness in mouth were significantly reduced (p<0.01). The particle perception, cheesyness, stickiness on the spoon, thickflow in mouth and the soft/velvet feeling were significantly reduced (p<0.001). There was no change in bitterness upon the application of the NP7L (non-significant).

Example 7

Sensory Analysis of High Protein Yogurt

To describe the impact on sensory perceivable product attributes, descriptive sensory analysis was chosen. The basis for the descriptive analysis was ISO 13299 "Sensory analysis—Methodology—General guidance for establishing a sensory profile". In the sensory descriptive analysis, the intensity of each descriptor was evaluated on a line scale with two anchor points indicating low and high intensity, respectively. The anchor points for low and high was taught to the panel in the training/calibration sessions. All samples were evaluated in triplicate. The sensory panel consisted of 7 persons, who have all passed the basic sensory screening test before they were accepted in the panel before taking part in the descriptive analysis of this analysis. The panelists were trained in recognizing and intensity scaling of the product attributes. A definition of the attributes can be found in Table 5.

TABLE 5

Definition of tested attributes in the sensory assessment of high protein yogurt

| Attribute | Explanation |
|---|---|
| 1 Glossy | Evaluate the reflection of light in the sample surface before any manipulation. "Much" is mirror-like. |
| 2 Force | Evaluate the force needed to insert the spoon vertically into the sample until 0.5 cm of the handle is in the sample. |
| 3 Smooth | On the same spoonful, evaluate the smoothness, look at the side edges, or at the sides in the "hole". High score is smooth, low score is grainy. |
| 4 Resistance | How much force is needed to press the tongue towards the palate? |
| 5 Sticky | How difficult is it to remove the tongue from the palate after the above evaluation? Press the tongue repeatedly against the palate and notice release. "Much" is when the tongue seems to stick to the palate. |
| 6 Floury | Evaluate the amount of "flour"/powder in the mouth after swallowing, perceived as not-dissolved sample left in the mouth. |
| 7 Remnant | Wait for 10-15 sec. after swallowing, before evaluating the amount of sample in the mouth. "Much" is if it is necessary to swallow several times. |
| 8 Astringent | When the sample is gone, the astringent sensation in the mouth is evaluated. "Much" is if the throat feels dry, as with tannin acid. |
| 9 Flavour overall | In a new spoonful of sample (approx. 5 ml), evaluate the intensity of flavour/aroma in the mouth. |
| 10 Acidity | Evaluate the intensity of lactic acid taste in the mouth. |
| 11 Bitter taste | Evaluate the intensity of bitter taste in the mouth. |
| 12 Protein flavour | Evaluate the intensity of protein flavour in the mouth (whey protein). |

Figure 19:
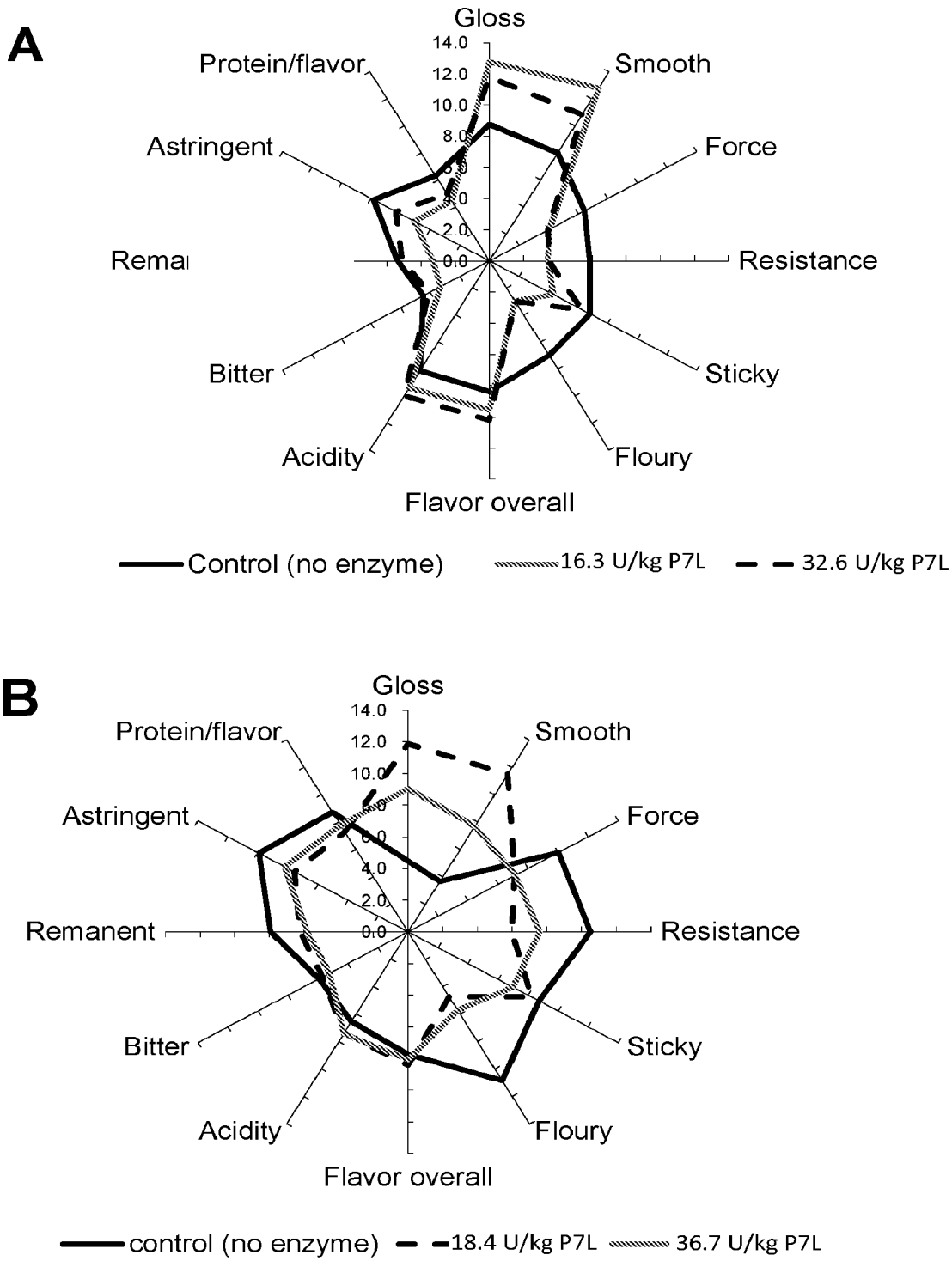
FIG. 19 shows sensory analyses of fortified high protein containing yogurt with 8% (w/w) protein (A) and 9% (w/w) protein (B).

For the sensory analyses, stirred yogurt was produced on a Mini-UHT (Service, Teknik, Denmark). Pre-pasteurized skim-milk (72° C.; 15 s) from Aral Amba (Viby, Denmark) was applied and fortified to 8% (w/w) and 9% (w/w) of protein with milk protein concentrate 70 [5.6% (w/w)] and a WPC 34 [2.0% (w/w)]. The final fat content of the yogurt was 1.5% (w/w). All powder ingredients were mixed at 45° C. except the enzymes. A commercial enzyme product (Protex 7L) was added in the range of 16.3 to 32.6 U/kg for a milk with 8% protein and in the range of 18.4 to 36.7 U/kg for the 9% protein milk. The enzyme dosage corresponded to 0.6% (w/w$_{applied\ protein}$) and 1.2% (w/w$_{applied\ protein}$). The prepared yogurt milk was preheated to 65° C. (P1), homogenized at 65° C./200 bar, heated to 80° C. (P2) and pasteurized at 95° C. for 6 minutes (P3). Subsequently, the milk was cooled down to 5° C. and stored overnight. The next morning, YO-mix 860 (20 DCU/100 L; DuPont, Brabrand, Denmark) was added to initiate the fermentation. The fermentation was conducted at 43° C. and terminated by cooling at pH 4.6-4.65. The yogurt was cooled on a plate heat exchanger with increased back pressure (additional 2 bar) in order to reduce the viscosity of the final product. Until the product was analyzed, the product was stored at 5° C. The sensory data of the 8% (w/w) protein and 9% (w/w) protein containing yogurts (control (no enzyme), 16.3 U/kg and 32.6 U/kg for the 8% protein yogurt and 18.4 U/kg and 36.7 U/kg for the 9% protein yogurt) are shown in FIGS. 19 (A) and (B). As shown in FIG. 19, gloss, smoothness, powdery taste (floury) as well as the astringent perception could be significantly improved upon the application of the P7L in both yogurt trials compared to the non-enzymated yogurt reference. Surprisingly, the bitterness of the enzymated yogurt was not affected (increased) compared to the enzymated yogurts.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

REFERENCES

Beaulieu, M., Pouliot, Y., Pouliot, M. (1999). Thermal aggregation of whey proteins in model solutions as affected by casein/whey protein ratios. *Journal of Food Science* 64(5), 776-780.

Campbell, W. W. & Leidy, H. J. (2007). Dietary protein and resistance training effects on muscle and body composition in older persons. *Journal of the American College of Nutrition*, 26(6), 696-703.

Chever, S., Guyomarc'h, F., Beaucher, E., Famelart, M. H. (2014). High-protein fat-free acid milk gels: Control of protein composition and heat treatment. *International Dairy Journal*, 37, 95-103

Hayes, A., Cribb, P. J. (2008). Effect of whey protein isolate on strength, body composition and muscle hypertrophy during resistance training. *Current Opinion in Clinical Nutrition and Metabolic Care*, 11(1), 40-44.

Jenness, R., Patton, S. (1959). *Principles of Dairy Chemistry*, Chapman & Hall Ltd., London, U.K.

Loveday, S. M., Hindmarsh, J. P., Creamer, L. K., & Singh, H. (2009). Physicochemical changes in a model protein bar during storage. *Food Research International*, 42, 798-806.

Luhovyy, B. L., Akhavan, T., & Anderson, G. H. (2007). Whey proteins in the regulation of food intake and satiety. *Journal of the American College of Nutrition*, 26(6), 704-712.

Purwanti, N. van der Goot, A. J., Boom, R., Vereijken, J. (2010). New directions towards structure formation and stability of protein-rich foods from globular proteins. *Trends in Food Science and Technology*, 21, 85-94.

The invention claimed is:

1. A method for preparing a fermented milk product, the method consisting of:
   (a) treating a milk substrate wherein the milk substrate is fortified with protein or concentrated in order to increase its protein content to at least 10% (w/w) with one or more proteases, wherein one of said one or more proteases is a metalloprotease having at least 95, 96, 97, 98 or 99% identity with the amino acid SEQ ID No.3, and a microorganism; and
   (b) allowing the treated milk substrate to ferment to produce the fermented milk product, wherein the fermented milk product has a decreased viscosity.

2. The method of claim 1, wherein said milk substrate is treated with said one or more proteases prior to a pasteurization step.

3. The method of claim 1, wherein said one or more proteases are added together with said microorganism.

4. The method of claim 1, wherein the microorganism is a lactic acid bacterium.

5. The method according to claim 4, wherein the microorganism is of the genus *Streptococcus, Lactococcus, Lactobacillus, Leuconostoc, Pseudoleuconostoc, Pediococcus, Propionibacterium, Enterococcus, Brevibacterium* and *Bifidobacterium* or any combination thereof.

6. The method according to claim 5, wherein the microorganism is the thermophilic culture YO-MIX™ 860.

7. A fermented milk product, derived from a milk substrate which is fortified with protein or concentrated in order to increase its protein content to at least 10% (w/w), wherein the fermented milk product has a decreased viscosity and which consists of one or more exogenous proteases, wherein one of said one or more proteases is a metalloprotease having at least 95, 96, 97, 98 or 99% identity with the amino acid SEQ ID No.3, and an exogenous microorganism.

8. The fermented milk product according to claim 7, wherein the microorganism is a lactic acid bacterium.

9. The fermented milk product according to claim 8, wherein the microorganism is of the genus *Streptococcus, Lactococcus, Lactobacillus, Leuconostoc, Pseudoleuconostoc, Pediococcus, Propionibacterium, Enterococcus, Brevibacterium* or *Bifidobacterium* or any combination thereof.

10. The fermented milk product according to claim 9, wherein the microorganism is the thermophilic culture YO-MIX™ 860.

11. The fermented milk product according to claim 10, wherein the fermented milk product is a high protein yogurt, Greek yogurt, Labneh or sour cream.

* * * * *

SEQUENCE LISTING

<160> NUMBER OF SEQ ID NOS: 23

<210> SEQ ID NO 1
<211> LENGTH: 270
<212> TYPE: PRT
<213> ORGANISM: Artificial Sequence
<220> FEATURE:
<223> OTHER INFORMATION: Example protease sequence

<400> SEQUENCE: 1

Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
                20                  25                  30

Thr Gly Ile Ser Thr His Pro Asp Leu Asn Ile Arg Gly Gly Ala Ser
            35                  40                  45

Phe Val Pro Gly Glu Pro Ser Thr Gln Asp Gly Asn Gly His Gly Thr
    50                  55                  60

His Val Ala Gly Thr Ile Ala Ala Leu Asp Asn Ser Ile Gly Val Leu
65                  70                  75                  80

Gly Val Ala Pro Ser Ala Glu Leu Tyr Ala Val Lys Val Leu Gly Ala
                85                  90                  95

Ser Gly Ser Gly Ala Ile Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160

Tyr Phe Pro Ala Arg Tyr Ala Asn Ala Met Ala Val Gly Ala Thr Asp
                165                 170                 175

Gln Asn Asn Asn Arg Ala Ser Phe Ser Gln Tyr Gly Ala Gly Leu Asp
            180                 185                 190

Ile Val Ala Pro Gly Val Asn Val Gln Ser Thr Tyr Pro Gly Ser Thr
        195                 200                 205

Tyr Ala Ser Leu Asn Gly Thr Ser Met Ala Thr Pro His Val Ala Gly
    210                 215                 220

Ala Ala Ala Leu Val Lys Gln Lys Asn Pro Ser Trp Ser Asn Val Gln
225                 230                 235                 240

Ile Arg Asn His Leu Lys Asn Thr Ala Thr Ser Leu Gly Ser Thr Asn
                245                 250                 255

Leu Tyr Gly Ser Gly Leu Val Asn Ala Glu Ala Ala Thr Arg
            260                 265                 270

<210> SEQ ID NO 2
<211> LENGTH: 274
<212> TYPE: PRT
<213> ORGANISM: Artificial Sequence
<220> FEATURE:
<223> OTHER INFORMATION: Example protease sequence

<400> SEQUENCE: 2

Ala Gln Thr Val Pro Tyr Gly Ile Pro Leu Ile Lys Ala Asp Lys Val
1               5                   10                  15

Gln Ala Gln Gly Phe Lys Gly Ala Asn Val Lys Val Ala Val Leu Asp
                20                  25                  30

```
Thr Gly Ile Gln Ala Ser His Pro Asp Leu Asn Val Gly Gly Ala
             35                  40                  45
Ser Phe Val Ala Gly Glu Ala Tyr Asn Thr Asp Gly Asn Gly His Gly
 50                  55                  60
Thr His Val Ala Gly Thr Val Ala Ala Leu Asp Asn Thr Thr Gly Val
 65                  70                  75                  80
Leu Gly Val Ala Pro Ser Val Ser Leu Tyr Ala Val Lys Val Leu Asn
                 85                  90                  95
Ser Ser Gly Ser Gly Ser Tyr Ser Gly Ile Val Ser Gly Ile Glu Trp
                100                 105                 110
Ala Thr Thr Asn Gly Met Asp Val Ile Asn Met Ser Leu Gly Gly Ala
            115                 120                 125
Ser Gly Ser Thr Ala Met Lys Gln Ala Val Asp Asn Ala Tyr Ala Arg
130                 135                 140
Gly Val Val Val Val Ala Ala Gly Asn Ser Gly Ser Ser Gly Asn
145                 150                 155                 160
Thr Asn Thr Ile Gly Tyr Pro Ala Lys Tyr Asp Ser Val Ile Ala Val
                165                 170                 175
Gly Ala Val Asp Ser Asn Ser Asn Arg Ala Ser Phe Ser Ser Val Gly
            180                 185                 190
Ala Glu Leu Glu Val Met Ala Pro Gly Ala Gly Val Tyr Ser Thr Tyr
        195                 200                 205
Pro Thr Asn Thr Tyr Ala Thr Leu Asn Gly Thr Ser Met Ala Ser Pro
210                 215                 220
His Val Ala Gly Ala Ala Leu Ile Leu Ser Lys His Pro Asn Leu
225                 230                 235                 240
Ser Ala Ser Gln Val Arg Asn Arg Leu Ser Ser Thr Ala Thr Tyr Leu
                245                 250                 255
Gly Ser Ser Phe Tyr Tyr Gly Lys Gly Leu Ile Asn Val Glu Ala Ala
            260                 265                 270
Ala Gln

<210> SEQ ID NO 3
<211> LENGTH: 521
<212> TYPE: PRT
<213> ORGANISM: Bacillus amyloliquefaciens

<400> SEQUENCE: 3

Met Gly Leu Gly Lys Lys Leu Ser Val Ala Val Ala Ala Ser Phe Met
 1               5                  10                  15
Ser Leu Thr Ile Ser Leu Pro Gly Val Gln Ala Ala Glu Asn Pro Gln
                 20                  25                  30
Leu Lys Glu Asn Leu Thr Asn Phe Val Pro Lys His Ser Leu Val Gln
             35                  40                  45
Ser Glu Leu Pro Ser Val Ser Asp Lys Ala Ile Lys Gln Tyr Leu Lys
 50                  55                  60
Gln Asn Gly Lys Val Phe Lys Gly Asn Pro Ser Glu Arg Leu Lys Leu
 65                  70                  75                  80
Ile Asp Gln Thr Thr Asp Asp Leu Gly Tyr Lys His Phe Arg Tyr Val
                 85                  90                  95
Pro Val Val Asn Gly Val Pro Val Lys Asp Ser Gln Val Ile Ile His
                100                 105                 110
Val Asp Lys Ser Asn Asn Val Tyr Ala Ile Asn Gly Glu Leu Asn Asn
            115                 120                 125
```

-continued

```
Asp Val Ser Ala Lys Thr Ala Asn Ser Lys Lys Leu Ser Ala Asn Gln
    130                 135                 140

Ala Leu Asp His Ala Tyr Lys Ala Ile Gly Lys Ser Pro Glu Ala Val
145                 150                 155                 160

Ser Asn Gly Thr Val Ala Asn Lys Asn Lys Ala Glu Leu Lys Ala Ala
                165                 170                 175

Ala Thr Lys Asp Gly Lys Tyr Arg Leu Ala Tyr Asp Val Thr Ile Arg
            180                 185                 190

Tyr Ile Glu Pro Glu Pro Ala Asn Trp Glu Val Thr Val Asp Ala Glu
        195                 200                 205

Thr Gly Lys Ile Leu Lys Lys Gln Asn Lys Val Glu His Ala Ala Thr
    210                 215                 220

Thr Gly Thr Gly Thr Thr Leu Lys Gly Lys Thr Val Ser Leu Asn Ile
225                 230                 235                 240

Ser Ser Glu Ser Gly Lys Tyr Val Leu Arg Asp Leu Ser Lys Pro Thr
                245                 250                 255

Gly Thr Gln Ile Ile Thr Tyr Asp Leu Gln Asn Arg Glu Tyr Asn Leu
            260                 265                 270

Pro Gly Thr Leu Val Ser Ser Thr Thr Asn Gln Phe Thr Thr Ser Ser
        275                 280                 285

Gln Arg Ala Ala Val Asp Ala His Tyr Asn Leu Gly Lys Val Tyr Asp
    290                 295                 300

Tyr Phe Tyr Gln Lys Phe Asn Arg Asn Ser Tyr Asp Asn Lys Gly Gly
305                 310                 315                 320

Lys Ile Val Ser Val His Tyr Gly Ser Arg Tyr Asn Asn Ala Ala
                325                 330                 335

Trp Ile Gly Asp Gln Met Ile Tyr Gly Asp Gly Asp Gly Ser Phe Phe
            340                 345                 350

Ser Pro Leu Ser Gly Ser Met Asp Val Thr Ala His Glu Met Thr His
        355                 360                 365

Gly Val Thr Gln Glu Thr Ala Asn Leu Asn Tyr Glu Asn Gln Pro Gly
    370                 375                 380

Ala Leu Asn Glu Ser Phe Ser Asp Val Phe Gly Tyr Phe Asn Asp Thr
385                 390                 395                 400

Glu Asp Trp Asp Ile Gly Glu Asp Ile Thr Val Ser Gln Pro Ala Leu
                405                 410                 415

Arg Ser Leu Ser Asn Pro Thr Lys Tyr Gly Gln Pro Asp Asn Phe Lys
            420                 425                 430

Asn Tyr Lys Asn Leu Pro Asn Thr Asp Ala Gly Asp Tyr Gly Gly Val
        435                 440                 445

His Thr Asn Ser Gly Ile Pro Asn Lys Ala Ala Tyr Asn Thr Ile Thr
    450                 455                 460

Lys Ile Gly Val Asn Lys Ala Glu Gln Ile Tyr Tyr Arg Ala Leu Thr
465                 470                 475                 480

Val Tyr Leu Thr Pro Ser Ser Thr Phe Lys Asp Ala Lys Ala Ala Leu
                485                 490                 495

Ile Gln Ser Ala Arg Asp Leu Tyr Gly Ser Gln Asp Ala Ala Ser Val
            500                 505                 510

Glu Ala Ala Trp Asn Ala Val Gly Leu
        515                 520

<210> SEQ ID NO 4
<211> LENGTH: 300
<212> TYPE: PRT
```

<213> ORGANISM: Bacillus pumilus

<400> SEQUENCE: 4

```
Ala Ala Ala Thr Gly Ser Gly Thr Thr Leu Lys Gly Ala Thr Val Pro
1               5                   10                  15

Leu Asn Ile Ser Tyr Glu Gly Gly Lys Tyr Val Leu Arg Asp Leu Ser
            20                  25                  30

Lys Pro Thr Gly Thr Gln Ile Ile Thr Tyr Asp Leu Gln Asn Arg Gln
        35                  40                  45

Ser Arg Leu Pro Gly Thr Leu Val Ser Thr Thr Lys Thr Phe Thr
    50                  55                  60

Ser Ser Ser Gln Arg Ala Ala Val Asp Ala His Tyr Asn Leu Gly Lys
65                  70                  75                  80

Val Tyr Asp Tyr Phe Tyr Ser Asn Phe Lys Arg Asn Ser Tyr Asp Asn
                85                  90                  95

Lys Gly Ser Lys Ile Val Ser Val His Tyr Gly Thr Gln Tyr Asn
            100                 105                 110

Asn Ala Ala Trp Thr Gly Asp Gln Met Ile Tyr Gly Asp Gly Asp Gly
            115                 120                 125

Ser Phe Phe Ser Pro Leu Ser Gly Ser Leu Asp Val Thr Ala His Glu
    130                 135                 140

Met Thr His Gly Val Thr Gln Glu Thr Ala Asn Leu Ile Tyr Glu Asn
145                 150                 155                 160

Gln Pro Gly Ala Leu Asn Glu Ser Phe Ser Asp Val Phe Gly Tyr Phe
                165                 170                 175

Asn Asp Thr Glu Asp Trp Asp Ile Gly Glu Asp Ile Thr Val Ser Gln
            180                 185                 190

Pro Ala Leu Arg Ser Leu Ser Asn Pro Thr Lys Tyr Asn Gln Pro Asp
        195                 200                 205

Asn Tyr Ala Asn Tyr Arg Asn Leu Pro Asn Thr Asp Glu Gly Asp Tyr
    210                 215                 220

Gly Gly Val His Thr Asn Ser Gly Ile Pro Asn Lys Ala Ala Tyr Asn
225                 230                 235                 240

Thr Ile Thr Lys Leu Gly Val Ser Lys Ser Gln Ile Tyr Tyr Arg
                245                 250                 255

Ala Leu Thr Thr Tyr Leu Thr Pro Ser Ser Thr Phe Lys Asp Ala Lys
            260                 265                 270

Ala Ala Leu Ile Gln Ser Ala Arg Asp Leu Tyr Gly Ser Thr Asp Ala
        275                 280                 285

Ala Lys Val Glu Ala Ala Trp Asn Ala Val Gly Leu
    290                 295                 300
```

<210> SEQ ID NO 5
<211> LENGTH: 520
<212> TYPE: PRT
<213> ORGANISM: Bacillus amyloliquefaciens

<400> SEQUENCE: 5

```
Met Gly Leu Gly Lys Lys Leu Ser Val Ala Val Ala Ala Ser Phe Met
1               5                   10                  15

Ser Leu Thr Ile Ser Leu Pro Gly Val Gln Ala Ala Glu Asn Pro Gln
            20                  25                  30

Leu Lys Glu Asn Leu Thr Asn Phe Val Pro Lys His Ser Leu Val Gln
        35                  40                  45
```

```
Ser Glu Leu Pro Ser Val Ser Asp Lys Ala Ile Lys Gln Tyr Leu Lys
     50                  55                  60

Gln Asn Gly Lys Val Phe Lys Gly Asn Pro Ser Glu Arg Leu Lys Leu
 65                  70                  75                  80

Ile Asp Gln Thr Thr Asp Asp Leu Gly Tyr Lys His Phe Arg Tyr Val
                 85                  90                  95

Pro Val Val Asn Gly Val Pro Val Lys Asp Ser Gln Val Ile Ile His
                100                 105                 110

Val Asp Lys Ser Asn Asn Val Tyr Ala Ile Asn Gly Glu Leu Asn Asn
            115                 120                 125

Asp Val Ser Ala Lys Thr Ala Asn Ser Lys Lys Leu Ser Ala Asn Gln
        130                 135                 140

Ala Leu Asp His Ala Tyr Lys Ala Ile Gly Lys Ser Pro Glu Ala Val
145                 150                 155                 160

Ser Asn Gly Thr Val Ala Asn Lys Asn Lys Ala Glu Leu Lys Ala Ala
                165                 170                 175

Ala Thr Lys Asp Gly Lys Tyr Arg Leu Ala Tyr Asp Val Thr Ile Arg
                180                 185                 190

Tyr Ile Glu Pro Glu Pro Ala Asn Trp Glu Val Thr Val Asp Ala Glu
            195                 200                 205

Thr Gly Lys Ile Leu Lys Lys Gln Asn Lys Val Glu His Ala Ala Thr
        210                 215                 220

Thr Gly Thr Gly Thr Thr Leu Lys Gly Lys Thr Val Ser Leu Asn Ile
225                 230                 235                 240

Ser Ser Glu Ser Gly Lys Tyr Val Leu Arg Asp Leu Ser Lys Pro Thr
                245                 250                 255

Gly Thr Gln Ile Ile Thr Tyr Asp Leu Gln Asn Arg Glu Tyr Asn Leu
            260                 265                 270

Pro Gly Thr Leu Val Ser Ser Thr Asn Gln Phe Thr Thr Ser Ser
        275                 280                 285

Gln Arg Ala Ala Val Asp Ala His Tyr Asn Leu Gly Lys Val Tyr Asp
        290                 295                 300

Tyr Phe Tyr Gln Lys Phe Asn Arg Asn Ser Tyr Asp Asn Lys Gly Gly
305                 310                 315                 320

Lys Ile Val Ser Val His Tyr Gly Ser Arg Tyr Asn Asn Ala Ala
                325                 330                 335

Trp Ile Gly Asp Gln Met Ile Tyr Gly Asp Gly Asp Gly Ser Phe Phe
                340                 345                 350

Ser Pro Leu Ser Gly Ser Met Asp Val Thr Ala His Glu Met Thr His
            355                 360                 365

Gly Val Thr Gln Glu Thr Ala Asn Leu Asn Tyr Glu Asn Gln Pro Gly
        370                 375                 380

Ala Leu Asn Glu Ser Phe Ser Asp Val Phe Gly Tyr Phe Asn Asp Thr
385                 390                 395                 400

Glu Asp Trp Asp Ile Gly Glu Asp Ile Thr Ser Gln Pro Ala Leu Arg
                405                 410                 415

Ser Leu Ser Asn Pro Thr Lys Tyr Gly Gln Pro Asp Asn Phe Lys Asn
            420                 425                 430

Tyr Lys Asn Leu Pro Asn Thr Asp Ala Gly Asp Tyr Gly Gly Val His
        435                 440                 445

Thr Asn Ser Gly Ile Pro Asn Lys Ala Ala Tyr Asn Thr Ile Thr Lys
450                 455                 460
```

```
Ile Gly Val Asn Lys Ala Glu Gln Ile Tyr Tyr Arg Ala Leu Thr Val
465                 470                 475                 480

Tyr Leu Thr Pro Ser Ser Thr Phe Lys Asp Ala Lys Ala Ala Leu Ile
                485                 490                 495

Gln Ser Ala Arg Asp Leu Tyr Gly Ser Gln Asp Ala Ala Ser Val Glu
            500                 505                 510

Ala Ala Trp Asn Ala Val Gly Leu
            515                 520

<210> SEQ ID NO 6
<211> LENGTH: 547
<212> TYPE: PRT
<213> ORGANISM: Bacillus thermoproteolyticus

<400> SEQUENCE: 6

Met Lys Met Lys Met Lys Leu Ala Ser Phe Gly Leu Ala Ala Gly Leu
1               5                   10                  15

Ala Ala Gln Val Phe Leu Pro Tyr Asn Ala Leu Ala Ser Thr Glu His
                20                  25                  30

Val Thr Trp Asn Gln Gln Phe Gln Thr Pro Gln Phe Ile Ser Gly Asp
            35                  40                  45

Leu Leu Lys Val Asn Gly Thr Ser Pro Glu Glu Leu Val Tyr Gln Tyr
        50                  55                  60

Val Glu Lys Asn Glu Asn Lys Phe Lys Phe His Glu Asn Ala Lys Asp
65                  70                  75                  80

Thr Leu Gln Leu Lys Glu Lys Asn Asp Asn Leu Gly Phe Thr Phe
                85                  90                  95

Met Arg Phe Gln Gln Thr Tyr Lys Gly Ile Pro Val Phe Gly Ala Val
                100                 105                 110

Val Thr Ser His Val Lys Asp Gly Thr Leu Thr Ala Leu Ser Gly Thr
            115                 120                 125

Leu Ile Pro Asn Leu Asp Thr Lys Gly Ser Leu Lys Ser Gly Lys Lys
        130                 135                 140

Leu Ser Glu Lys Gln Ala Arg Asp Ile Ala Glu Lys Asp Leu Val Ala
145                 150                 155                 160

Asn Val Thr Lys Glu Val Pro Glu Tyr Glu Gln Gly Lys Asp Thr Glu
                165                 170                 175

Phe Val Val Tyr Val Asn Gly Asp Glu Ala Ser Leu Ala Tyr Val Val
                180                 185                 190

Asn Leu Asn Phe Leu Thr Pro Glu Pro Gly Asn Trp Leu Tyr Ile Ile
            195                 200                 205

Asp Ala Val Asp Gly Lys Ile Leu Asn Lys Phe Asn Gln Leu Asp Ala
        210                 215                 220

Ala Lys Pro Gly Asp Val Lys Ser Ile Thr Gly Thr Ser Thr Val Gly
225                 230                 235                 240

Val Gly Arg Gly Val Leu Gly Asp Gln Lys Asn Ile Asn Thr Thr Tyr
                245                 250                 255

Ser Thr Tyr Tyr Tyr Leu Gln Asp Asn Thr Arg Gly Gly Ile Phe Thr
                260                 265                 270

Tyr Asp Ala Lys Tyr Arg Thr Thr Leu Pro Gly Ser Leu Trp Ala Asp
            275                 280                 285

Ala Asp Asn Gln Phe Phe Ala Ser Tyr Asp Ala Pro Ala Val Asp Ala
        290                 295                 300

His Tyr Tyr Ala Gly Val Thr Tyr Asp Tyr Tyr Lys Asn Val His Asn
305                 310                 315                 320
```

```
Arg Leu Ser Tyr Asp Gly Asn Asn Ala Ala Ile Arg Ser Ser Val His
            325                 330                 335

Tyr Ser Gln Gly Tyr Asn Asn Ala Phe Trp Asn Gly Ser Gln Met Val
        340                 345                 350

Tyr Gly Asp Gly Asp Gly Gln Thr Phe Ile Pro Leu Ser Gly Gly Ile
            355                 360                 365

Asp Val Ala His Glu Leu Thr His Ala Val Thr Asp Tyr Thr Ala
370                 375                 380

Gly Leu Ile Tyr Gln Asn Glu Ser Gly Ala Ile Asn Glu Ala Met Ser
385                 390                 395                 400

Asp Ile Phe Gly Thr Leu Val Lys Phe Tyr Ala Asn Lys Asn Pro Asp
                405                 410                 415

Trp Glu Ile Gly Glu Asp Val Tyr Thr Pro Gly Ile Ser Gly Asp Ser
            420                 425                 430

Leu Arg Ser Met Ser Asp Pro Ala Lys Tyr Gly Asp Pro Asp His Tyr
        435                 440                 445

Ser Lys Arg Tyr Thr Gly Thr Gln Asp Asn Gly Gly Val His Ile Asn
    450                 455                 460

Ser Gly Ile Ile Asn Lys Ala Ala Tyr Leu Ile Ser Gln Gly Gly Thr
465                 470                 475                 480

His Tyr Gly Val Ser Val Gly Ile Gly Arg Asp Lys Leu Gly Lys
                485                 490                 495

Ile Phe Tyr Arg Ala Leu Thr Gln Tyr Leu Thr Pro Thr Ser Asn Phe
                500                 505                 510

Ser Gln Leu Arg Ala Ala Ala Val Gln Ser Ala Thr Asp Leu Tyr Gly
            515                 520                 525

Ser Thr Ser Gln Glu Val Ala Ser Val Lys Gln Ala Phe Asp Ala Val
        530                 535                 540

Gly Val Lys
545

<210> SEQ ID NO 7
<211> LENGTH: 314
<212> TYPE: PRT
<213> ORGANISM: Penicillium oxalicum

<400> SEQUENCE: 7

Met Val Cys His Ser Leu Ala Pro Phe Val Val Leu Val Thr Ser Leu
1               5                   10                  15

Phe Phe Leu Gln Ala Lys Cys Ser Pro Val Val Phe Glu Gln Arg Gly
                20                  25                  30

Ile Cys Ala Thr Glu Asp Pro Asp Thr Ser Phe Leu Asp Ala Leu Glu
            35                  40                  45

Arg Val Arg Thr Asp Glu Thr Gln Leu Pro Asp Thr Gly Ser Glu Ala
    50                  55                  60

Arg Asn Gly Pro Ile Glu Ile Glu Thr Trp Phe His Ile Ile Thr Ser
65                  70                  75                  80

Lys Ala Glu Gln Asp Gln Val Ser Asp Asp Met Ile Glu Ser Gln Ile
                85                  90                  95

Ser Ile Leu Gln Asp Ala Tyr Gln Asp Ala Gly Ile Gln Tyr Arg Leu
            100                 105                 110

Gln Gly Val Thr Arg His Val Asn Asp Val Trp Ala Arg Asn Gly Asp
        115                 120                 125
```

Asp Thr Gly Met Lys Ser Ala Leu Arg Lys Gly Thr Tyr Arg Thr Leu
        130                 135                 140

Asn Val Tyr Phe Gln Thr Asp Leu Gln Ala Ser Pro Asp Gln Ala Gly
145                 150                 155                 160

Arg Ala Ser His Arg Gly Ala Ser His Ser Ser Asp Leu Ser Ser Ser
                165                 170                 175

Val Leu Gly Phe Cys Thr Leu Pro Asp Pro Ser Val Asn Ala Thr Ser
            180                 185                 190

Pro Arg Ala Asp Tyr Ile Lys Asp Gly Cys Asn Val Leu Ala Ser Ala
        195                 200                 205

Met Ser Gly Gly Thr Leu Asp Leu Tyr Asn Arg Gly Gly Thr Ala Ile
    210                 215                 220

His Glu Ile Gly His Trp Asn Gly Leu Leu His Thr Phe Gln Gly Glu
225                 230                 235                 240

Ser Cys Ala Glu Asp Asn Pro Gly Asp Tyr Ile Ala Asp Thr Pro Gln
                245                 250                 255

Gln Ser Val Pro Thr Gly Gly Cys Pro Ala Arg Lys Asp Ser Cys Pro
            260                 265                 270

Asn Leu Pro Gly Gln Asp Pro Ile His Asp Phe Met Asp Tyr Ser Ser
        275                 280                 285

Asp Val Cys Tyr Glu Ser Phe Thr Pro Gly Gln Asn Glu Arg Met Arg
    290                 295                 300

Asn Met Trp Ala Ser Met Arg Ala Gly Lys
305                 310

<210> SEQ ID NO 8
<211> LENGTH: 1023
<212> TYPE: DNA
<213> ORGANISM: Penicillium oxalicum

<400> SEQUENCE: 8
atggtctgtc actctttagc tccgttcgtg gttcttgtca catctctctt tttcttgcaa      60
gcgaaatgca gccccgtggt gtttgaacag cgtggcatct gcgctaccga agatccagat    120
acgtccttct tggacgcact cgagcgtgtc agaacagatg agaccagct acctgacact     180 gggtcagagg cccgcaacgg ccccatcgag attgagacct ggttccatat catcaccagc    240
aaagcagagc aagaccaggt ttctgatgac atgatcgagt cccaggtaag tcctacctcc    300
atcgctcctg ttctcgacga cttcaatcgc atgtcatgaa cgaatgctaa gacactcgcc    360
tagatctcca ttctacaaga tgcgtatcag gatgccggta ttcaatatcg actgcaaggt    420
gtcacccgcc atgtgaacga tgtttgggct cgcaacggag atgacacagg catgaagtca    480
gcccttcgaa aagggaccta tcggactcta aacgtttact ccaaaccga cctccaggca     540 tcacccgacc aagccggtcg tgcaagccac cgcggagctt ctcattcaag tgatctctca    600
tccagcgtgc taggattctg caccctcccc gatccaagcg tgaatgccac cagtccccgt    660
gccgactaca ttaaggatgg ctgcaacgtt ctcgctagcg cgatgtccgg aggcacattg    720
gacctttaca accgaggagg aaccgccatc cacgagatcg acattggaa tggccttttg     780 cataccttcc aagggagtc ctgtgccgag ataatccag gggactacat tgccgacacg      840
ccccaacaat ctgtcccaac tggcggatgc cctgctcgaa aggattcttg tcccaatttg    900

```
ccggggcagg accccatcca cgactttatg gactactcat ctgatgtctg ttatgagagt      960
tttacacctg gtcagaatga acgtatgcga aatatgtggg catcgatgcg tgcagggaaa     1020
tag                                                                   1023
```

<210> SEQ ID NO 9
<211> LENGTH: 318
<212> TYPE: PRT
<213> ORGANISM: Aspergillus oryzae

<400> SEQUENCE: 9

```
Met Ser His Phe Pro Thr Leu His Ile Leu Ile Leu Val Ile Ala Asn
1               5                   10                  15

Leu Gln Ile Gln Cys Phe Ala Phe Val Ser Gln Ser Arg Gly Phe Cys
            20                  25                  30

Ala Thr Gly Pro Pro Thr Glu Ser Leu Lys Ala Glu Tyr Arg Arg Leu
        35                  40                  45

Ser Ala Leu Gly Ser Gln Ser Tyr Asn Pro Val Asp Ser Glu Ser Arg
    50                  55                  60

Ala Ala Ile Thr Pro Ile Val Ile Asp Thr Trp Phe His Ile Ile Thr
65                  70                  75                  80

Gly Glu Ala Gly Thr Glu Leu Ile Ser Asp Glu Met Ile Ala Asp Gln
                85                  90                  95

Leu Ser Tyr Leu Gln Asn Ala Tyr Trp Asn Ala Thr Ile Ser Tyr Arg
            100                 105                 110

Leu Gln Gly Val Thr Arg Ser Ala Asn Asp Thr Trp Ala Arg Asn Glu
        115                 120                 125

Asp Glu Met Ala Met Lys Thr Val Leu Arg Arg Gly Ser Tyr Arg Thr
    130                 135                 140

Leu Asn Val Tyr Phe His Thr Asp Leu Gln Ala Ser Pro Asn Ala Gly
145                 150                 155                 160

Ala Arg Ala Phe Asp Ile Val Arg Arg Glu Leu Gly Val Ser Gln Gln
                165                 170                 175

Gln Pro Thr Ser Met Leu Gly Phe Cys Thr Leu Pro Asp Pro Ser Ile
            180                 185                 190

Asn Ala Ser Ser Pro Pro Ser Thr Tyr Ile Lys Asp Gly Cys Asn Val
        195                 200                 205

Leu Ala Glu Thr Met Pro Gly Gly Ser Leu Ala His Tyr Asn Arg Gly
    210                 215                 220

Gly Thr Ala Ile His Glu Ile Gly His Trp Asn Gly Leu Leu His Thr
225                 230                 235                 240

Phe Glu Gly Glu Ser Cys Ser Ser Asp Asn Glu Gly Asp Phe Ile Ala
                245                 250                 255

Asp Thr Pro Gln Gln Ser Lys Pro Thr Glu Gly Cys Pro Ala Gln Lys
            260                 265                 270

Asp Ser Cys Pro Glu Leu Pro Gly Phe Asp Ala Ile His Asn Phe Met
        275                 280                 285

Asp Tyr Ser Ser Asp Glu Cys Tyr Asp Ser Phe Thr Pro Asp Gln Val
    290                 295                 300

Ser Arg Met Arg Ser Met Trp Phe Ala Met Arg Asp Gly Lys
305                 310                 315
```

<210> SEQ ID NO 10
<211> LENGTH: 1908
<212> TYPE: DNA

<213> ORGANISM: Bacillus amyloliquefaciens

<400> SEQUENCE: 10

| | |
|---|---|
| gatcttaaca tttttccccct atcatttttc ccgtcttcat ttgtcatttt ttccagaaaa | 60 |
| aatcgcgtca ttcgactcat gtctaatcca acacgtgtct ctcggcttat cccctgacac | 120 |
| cgcccgccga cagcccgcat gggacgattc tatcaattca gccgcggagt ctagttttat | 180 |
| attgcagaat gcgagattgc tggtttatta acaatata agttttcatt attttcaaaa | 240 |
| aggggggattt attgtgggtt taggtaagaa attgtctgtt gctgtcgccg cttcctttat | 300 |
| gagtttaacc atcagtctgc cgggtgttca ggccgctgag aatcctcagc ttaaagaaaa | 360 |
| cctgacgaat tttgtaccga agcattcttt ggtgcaatca gaattgcctt ctgtcagtga | 420 |
| caaagctatc aagcaatact tgaaacaaaa cggcaaagtc tttaaaggca atccttctga | 480 |
| aagattgaag ctgattgacc aaacgaccga tgatctcggc tacaagcact tccgttatgt | 540 |
| gcctgtcgta acggtgtgc ctgtgaaaga ctctcaagtc attattcacg tcgataaatc | 600 |
| caacaacgtc tatgcgatta acggtgaatt aaacaacgat gtttccgcca aaacggcaaa | 660 |
| cagcaaaaaa ttatctgcaa atcaggcgct ggatcatgct tataaagcga tcggcaaatc | 720 |
| acctgaagcc gtttctaacg gaaccgttgc aaacaaaaac aaagccgagc tgaaagcagc | 780 |
| agccacaaaa gacggcaaat accgcctcgc ctatgatgta accatccgct acatcgaacc | 840 |
| ggaacctgca aactgggaag taaccgttga tgcggaaaca ggaaaaatcc tgaaaaagca | 900 |
| aaacaaagtg gagcatgccg ccacaaccgg aacaggtacg actcttaaag gaaaaacggt | 960 |
| ctcattaaat atttcttctg aaagcggcaa atatgtgctg cgcgatcttt ctaaacctac | 1020 |
| cggaacacaa attattacgt acgatctgca aaaccgcgag tataacctgc cgggcacact | 1080 |
| cgtatccagc accacaaacc agtttacaac ttcttctcag cgcgctgccg ttgatgcgca | 1140 |
| ttacaacctc ggcaaagtgt atgattattt ctatcagaag tttaatcgca acagctacga | 1200 |
| caataaaggc ggcaagatcg tatcctccgt tcattacggc agcagataca ataacgcagc | 1260 |
| ctggatcggc gaccaaatga tttacggtga cggcgacggt tcattcttct cacctctttc | 1320 |
| cggttcaatg gacgtaaccg ctcatgaaat gacacatggc gttacacagg aaacagccaa | 1380 |
| cctgaactac gaaaatcagc cgggcgcttt aaacgaatcc ttctctgatg tattcgggta | 1440 |
| cttcaacgat actgaggact gggatatcgg tgaagatatt acggtcagcc agccggctct | 1500 |
| ccgcagctta tccaatccga caaaatacgg acagcctgat aatttcaaaa attacaaaaa | 1560 |
| ccttccgaac actgatgccg gcgactacgg cggcgtgcat acaaacagcg gaatcccgaa | 1620 |
| caaagccgct tacaatacga ttacaaaaat cggcgtgaac aaagcggagc agatttacta | 1680 |
| tcgtgctctg acggtatacc tcactccgtc atcaacttt aaagatgcaa agccgcttt | 1740 |
| gattcaatct gcgcgggacc tttacggctc tcaagatgct gcaagcgtag aagctgcctg | 1800 |
| gaatgcagtc ggattgtaaa caagaaaaga gaccggaaat ccggtctctt ttttatatct | 1860 |
| aaaaacattt cacagtggct tcaccatgat catatatgtc ttttcccg | 1908 |

<210> SEQ ID NO 11
<211> LENGTH: 521
<212> TYPE: PRT
<213> ORGANISM: Bacillus subtilis
<220> FEATURE:
<221> NAME/KEY: misc_feature
<222> LOCATION: (338)..(338)
<223> OTHER INFORMATION: Xaa can be any naturally occurring amino acid

<400> SEQUENCE: 11

```
Met Gly Leu Gly Lys Lys Leu Ser Val Ala Val Ala Ala Ser Phe Met
1               5                   10                  15

Ser Leu Thr Ile Ser Leu Pro Gly Val Gln Ala Ala Glu Asn Pro Gln
            20                  25                  30

Leu Lys Glu Asn Leu Thr Asn Phe Val Pro Lys His Ser Leu Val Gln
        35                  40                  45

Ser Glu Leu Pro Ser Val Ser Asp Lys Ala Ile Lys Gln Tyr Leu Lys
    50                  55                  60

Gln Asn Gly Lys Val Phe Lys Gly Asn Pro Ser Glu Arg Leu Lys Leu
65                  70                  75                  80

Ile Asp His Thr Thr Asp Asp Leu Gly Tyr Lys His Phe Arg Tyr Val
                85                  90                  95

Pro Val Val Asn Gly Val Pro Val Lys Asp Ser Gln Val Ile Ile His
            100                 105                 110

Val Asp Lys Ser Asn Asn Val Tyr Ala Ile Asn Gly Glu Leu Asn Asn
        115                 120                 125

Asp Ala Ser Ala Lys Thr Ala Asn Ser Lys Lys Leu Ser Ala Asn Gln
130                 135                 140

Ala Leu Asp His Ala Phe Lys Ala Ile Gly Lys Ser Pro Glu Ala Val
145                 150                 155                 160

Ser Asn Gly Asn Val Ala Asn Lys Asn Lys Ala Glu Leu Lys Ala Ala
                165                 170                 175

Ala Thr Lys Asp Gly Lys Tyr Arg Leu Ala Tyr Asp Val Thr Ile Arg
            180                 185                 190

Tyr Ile Glu Pro Glu Pro Ala Asn Trp Glu Val Thr Val Asp Ala Glu
        195                 200                 205

Thr Gly Lys Val Leu Lys Lys Gln Asn Lys Val Glu His Ala Ala Ala
    210                 215                 220

Thr Gly Thr Gly Thr Thr Leu Lys Gly Lys Thr Val Ser Leu Asn Ile
225                 230                 235                 240

Ser Ser Glu Asn Gly Lys Tyr Val Met Arg Asp Leu Ser Lys Pro Thr
                245                 250                 255

Gly Thr Gln Ile Ile Thr Tyr Asp Leu Gln Asn Arg Gln Tyr Asn Leu
            260                 265                 270

Pro Gly Thr Leu Val Ser Ser Thr Thr Asn Gln Phe Thr Thr Ser Ser
        275                 280                 285

Gln Arg Ala Ala Val Asp Ala His Tyr Asn Leu Gly Lys Val Tyr Asp
    290                 295                 300

Tyr Phe Tyr Gln Thr Phe Lys Arg Asn Ser Tyr Asp Asn Arg Gly Gly
305                 310                 315                 320

Lys Ile Val Ser Ser Val His Tyr Gly Ser Arg Tyr Asn Asn Ala Ala
                325                 330                 335

Trp Xaa Gly Asp Gln Met Ile Tyr Gly Asp Gly Asp Gly Ser Phe Phe
            340                 345                 350

Ser Pro Leu Ser Gly Ser Met Asp Val Thr Ala His Glu Met Thr His
        355                 360                 365

Gly Val Thr Gln Glu Thr Ala Asn Leu Asn Tyr Glu Asn Gln Pro Gly
    370                 375                 380

Ala Leu Asn Glu Ser Phe Ser Asp Val Phe Gly Tyr Phe Thr Asp Thr
385                 390                 395                 400
```

```
Glu Asp Trp Asp Ile Gly Glu Asp Ile Thr Val Ser Gln Pro Ala Leu
            405                 410                 415

Arg Ser Leu Ser Asn Pro Thr Lys Tyr Gly Gln Pro Asp His Tyr Lys
            420                 425                 430

Asn Tyr Gln Asn Leu Pro Asn Thr Asp Ala Gly Asp Tyr Gly Gly Val
            435                 440                 445

His Thr Asn Ser Gly Ile Pro Asn Lys Ala Ala Tyr Asn Thr Ile Thr
            450                 455                 460

Lys Ile Gly Val Lys Lys Ala Glu Gln Ile Tyr Tyr Arg Ala Leu Thr
465                 470                 475                 480

Val Tyr Leu Thr Pro Ser Ser Phe Lys Asp Ala Lys Ala Ala Leu
            485                 490                 495

Ile Gln Ser Ala Arg Asp Leu Tyr Gly Ser Gln Asp Ala Ala Ser Val
            500                 505                 510

Glu Ala Ala Trp Asn Ala Val Gly Leu
            515                 520

<210> SEQ ID NO 12
<211> LENGTH: 354
<212> TYPE: PRT
<213> ORGANISM: Elizabethkingia miricola

<400> SEQUENCE: 12

Met Arg Lys Leu Leu Ile Phe Ser Ile Ser Ala Tyr Leu Met Ala Gly
1               5                   10                  15

Ile Val Ser Cys Lys Gly Val Asp Ser Ala Thr Pro Val Thr Glu Asp
            20                  25                  30

Arg Leu Ala Leu Asn Ala Val Asn Ala Pro Ala Asp Asn Thr Val Asn
            35                  40                  45

Ile Lys Thr Phe Asp Lys Val Lys Asn Ala Phe Gly Asp Gly Leu Ser
        50                  55                  60

Gln Ser Ala Glu Gly Thr Phe Thr Phe Pro Ala Asp Val Thr Thr Val
65              70                  75                  80

Lys Thr Ile Lys Met Phe Ile Lys Asn Glu Cys Pro Asn Lys Thr Cys
            85                  90                  95

Asp Glu Trp Asp Arg Tyr Ala Asn Val Tyr Val Lys Asn Lys Thr Thr
            100                 105                 110

Gly Glu Trp Tyr Glu Ile Gly Arg Phe Ile Thr Pro Tyr Trp Val Gly
            115                 120                 125

Thr Glu Lys Leu Pro Arg Gly Leu Glu Ile Asp Val Thr Asp Phe Lys
            130                 135                 140

Ser Leu Leu Ser Gly Asn Thr Glu Leu Lys Ile Tyr Thr Glu Thr Trp
145                 150                 155                 160

Leu Ala Lys Gly Arg Glu Tyr Ser Val Asp Phe Asp Ile Val Tyr Gly
            165                 170                 175

Thr Pro Asp Tyr Lys Tyr Ser Ala Val Val Pro Val Ile Gln Tyr Asn
            180                 185                 190

Lys Ser Ser Ile Asp Gly Val Pro Tyr Gly Lys Ala His Thr Leu Gly
            195                 200                 205

Leu Lys Lys Asn Ile Gln Leu Pro Thr Asn Thr Glu Lys Ala Tyr Leu
            210                 215                 220

Arg Thr Thr Ile Ser Gly Trp Gly His Ala Lys Pro Tyr Asp Ala Gly
225                 230                 235                 240
```

```
Ser Arg Gly Cys Ala Glu Trp Cys Phe Arg Thr His Thr Ile Ala Ile
            245                 250                 255

Asn Asn Ala Asn Thr Phe Gln His Gln Leu Gly Ala Leu Gly Cys Ser
        260                 265                 270

Ala Asn Pro Ile Asn Asn Gln Ser Pro Gly Asn Trp Ala Pro Asp Arg
    275                 280                 285

Ala Gly Trp Cys Pro Gly Met Ala Val Pro Thr Arg Ile Asp Val Leu
290                 295                 300

Asn Asn Ser Leu Thr Gly Ser Thr Phe Ser Tyr Glu Tyr Lys Phe Gln
305                 310                 315                 320

Ser Trp Thr Asn Asn Gly Thr Asn Gly Asp Ala Phe Tyr Ala Ile Ser
            325                 330                 335

Ser Phe Val Ile Ala Lys Ser Asn Thr Pro Ile Ser Ala Pro Val Val
            340                 345                 350

Thr Asn

<210> SEQ ID NO 13
<211> LENGTH: 567
<212> TYPE: PRT
<213> ORGANISM: Elizabethkingia meningoseptica

<400> SEQUENCE: 13

Met Leu Phe Phe Leu Pro Leu Leu Lys Thr Asn Leu Met Gln Lys Ile
1               5                   10                  15

Leu Leu Cys Ser Leu Ile Thr Gly Ala Gln Met Ile Phe Ala Gln Thr
            20                  25                  30

Tyr Glu Ile Thr Tyr Gln Asn Ser Phe Glu Gly Lys Ile Asn Pro Asn
        35                  40                  45

Gln Asn His Ile Ile Ser Ile Thr Asn Ser Asp Lys Thr Leu Leu Phe
    50                  55                  60

Asn Glu Lys Ile Lys Asn Lys Ala Asp Phe Pro Phe Glu Val Asn
65                  70                  75                  80

Glu Ile Asn Arg Lys Asn Asn Glu Val Ser Gln Phe Ala Phe Leu Asn
                85                  90                  95

Asn Asn Glu Ile Val Lys Thr Ser Asp Asn Thr Ile Leu Ala Lys Gln
            100                 105                 110

Glu Phe Lys Pro Thr Ser Glu Thr Gly Lys Ile Leu Gly Tyr Asn Val
        115                 120                 125

Lys Lys Ala Val Thr Ser Val Asn Ser Asn Thr Ile Glu Val Trp Tyr
    130                 135                 140

Thr Asn Asp Leu Lys Val Lys Gly Gly Pro Ser Ile Leu Gly Gln Asp
145                 150                 155                 160

Leu Gly Leu Val Leu Lys Thr Val Arg Asn Gly Ser Ser Val Val Glu
                165                 170                 175

Ala Thr Ser Val Lys Lys Ile Lys Ala Leu Asp Asp Gln Ser Leu Phe
            180                 185                 190

Asn Gly Lys Asn Ile Thr Glu Lys Asp Ala Leu Thr Tyr Lys Asp Met
        195                 200                 205

Ile Trp Lys Ser Arg Phe Ile Thr Ile Pro Val Phe Glu Asn Glu Thr
    210                 215                 220

Ile Asn Phe Ser Asp Ala Ser Lys Ser Asp Gln Val Ile Gln Arg Phe
225                 230                 235                 240

Gly Asn Gly Thr Ile Ile Leu Lys Lys Val Lys Ile Pro Glu Ile Lys
                245                 250                 255
```

```
Gln Gly Asn Thr Ile Phe Val Glu Leu Lys Gln Lys Ser Asn Gly Asp
            260                 265                 270

Ala Tyr Asp Arg Thr Gly Asp Val Phe Ile Ile Pro Gln Glu Arg Ala
        275                 280                 285

Ile Ser Tyr Tyr Thr Gly Leu Thr Gln Gly Val Lys Ser Leu Pro Val
    290                 295                 300

Tyr Gln Asn Gly Asn Gly Lys Ser Tyr Gln Gly Val Ala Leu Thr Pro
305                 310                 315                 320

Asp Tyr Leu Pro Phe Ile Glu Leu Met Arg Phe Thr Pro Phe Gly
                325                 330                 335

Ile Gly His Phe Asn Glu Lys Ile Gln Leu Lys Gly Lys Asn Trp His
            340                 345                 350

Asn Asn Thr Pro Tyr Arg Gln Asp Ile Thr Glu Leu Arg Pro Gln Leu
        355                 360                 365

Ser Gly Lys Glu Ile Leu Ile Gly Ala Phe Ile Gly Asn Tyr Asp Lys
    370                 375                 380

Gly Gly His Gln Ile Ser Leu Glu Leu Ser Ile His Pro Asp Gln Gln
385                 390                 395                 400

Lys Ile Val Asn Asn Phe Val Leu Pro Val Phe Asn Thr Thr Asn
            405                 410                 415

Val Met Glu Met Ala Gly Gln Asp Tyr Pro Thr Met Phe Asn Ser Asp
        420                 425                 430

Lys Gly Val Glu Val Glu Phe Ile Leu Thr Lys Asp Leu Lys Asn Ala
    435                 440                 445

Gln Leu Arg Tyr Ile Thr Thr Gly His Gly Gly Trp Gly Ala Gly Asp
    450                 455                 460

Glu Phe Val Pro Lys Glu Asn Ser Ile Tyr Leu Asp Gly Lys Leu Ala
465                 470                 475                 480

His Ala Phe Thr Pro Trp Arg Thr Asp Cys Gly Ser Tyr Arg Leu Phe
            485                 490                 495

Asn Pro Ala Ser Gly Asn Phe Glu Asp Gly Leu Ser Ser Ser Asp Leu
        500                 505                 510

Ser Arg Ser Asn Trp Cys Pro Gly Thr Ile Thr Asn Pro Val Tyr Ile
    515                 520                 525

Asn Leu Gly Asn Leu Asn Ala Gly Lys His Thr Ile Gln Val Lys Ile
    530                 535                 540

Pro Gln Gly Ala Pro Glu Gly Ser Ser Gln Ser Phe Trp Asn Val Ser
545                 550                 555                 560

Gly Val Leu Leu Gly Gln Glu
            565

<210> SEQ ID NO 14
<211> LENGTH: 313
<212> TYPE: PRT
<213> ORGANISM: Streptomyces plicatus

<400> SEQUENCE: 14

Met Phe Thr Pro Val Arg Arg Val Arg Thr Ala Ala Leu Ala Leu
1               5                   10                  15

Ser Ala Ala Ala Ala Leu Val Leu Gly Ser Thr Ala Ala Ser Gly Ala
            20                  25                  30

Ser Ala Thr Pro Ser Pro Ala Pro Ala Pro Ala Pro Val Lys
        35                  40                  45
```

-continued

Gln Gly Pro Thr Ser Val Ala Tyr Val Glu Val Asn Asn Ser Met
 50                  55                  60

Leu Asn Val Gly Lys Tyr Thr Leu Ala Asp Gly Gly Asn Ala Phe
 65                  70                  75                  80

Asp Val Ala Val Ile Phe Ala Ala Asn Ile Asn Tyr Asp Thr Gly Thr
                     85                  90                  95

Lys Thr Ala Tyr Leu His Phe Asn Glu Asn Val Gln Arg Val Leu Asp
                100                 105                 110

Asn Ala Val Thr Gln Ile Arg Pro Leu Gln Gln Gln Gly Ile Lys Val
                115                 120                 125

Leu Leu Ser Val Leu Gly Asn His Gln Gly Ala Gly Phe Ala Asn Phe
130                 135                 140

Pro Ser Gln Gln Ala Ala Ser Ala Phe Ala Lys Gln Leu Ser Asp Ala
145                 150                 155                 160

Val Ala Lys Tyr Gly Leu Asp Gly Val Asp Phe Asp Asp Glu Tyr Ala
                165                 170                 175

Glu Tyr Gly Asn Asn Gly Thr Ala Gln Pro Asn Asp Ser Ser Phe Val
                180                 185                 190

His Leu Val Thr Ala Leu Arg Ala Asn Met Pro Asp Lys Ile Ile Ser
                195                 200                 205

Leu Tyr Asn Ile Gly Pro Ala Ala Ser Arg Leu Ser Tyr Gly Gly Val
                210                 215                 220

Asp Val Ser Asp Lys Phe Asp Tyr Ala Trp Asn Pro Tyr Gly Thr
225                 230                 235                 240

Trp Gln Val Pro Gly Ile Ala Leu Pro Lys Ala Gln Leu Ser Pro Ala
                245                 250                 255

Ala Val Glu Ile Gly Arg Thr Ser Arg Ser Thr Val Ala Asp Leu Ala
                260                 265                 270

Arg Arg Thr Val Asp Glu Gly Tyr Gly Val Tyr Leu Thr Tyr Asn Leu
                275                 280                 285

Asp Gly Gly Asp Arg Thr Ala Asp Val Ser Ala Phe Thr Arg Glu Leu
                290                 295                 300

Tyr Gly Ser Glu Ala Val Arg Thr Pro
305                 310

<210> SEQ ID NO 15
<211> LENGTH: 243
<212> TYPE: PRT
<213> ORGANISM: Schistosoma japonicum

<400> SEQUENCE: 15

Met Ile Phe Tyr Arg Leu Leu Gly Leu Ile Phe Ile Leu Glu Thr Ile
  1               5                  10                  15

Ile Leu Ile Ser Ser Asn Val Tyr Gly Leu Asp Asn Gly Leu Ala Arg
                 20                  25                  30

Thr Pro Pro Met Gly Trp Met Thr Trp Gln Arg Phe Arg Cys Gln Ile
             35                  40                  45

Asp Cys Lys Glu Tyr Pro Asn Asp Cys Ile Asn Glu Asn Leu Ile Lys
 50                  55                  60

Arg Thr Ala Asp Lys Leu Val Leu Asn Gly Trp Arg Asp Leu Gly Tyr
 65                  70                  75                  80

Lys Tyr Val Ile Ile Asp Asp Cys Trp Pro Ala Arg Lys Arg Asp Ser
                 85                  90                  95

```
Lys Thr Asn Glu Leu Val Pro Asp Pro Asp Arg Phe Pro Asn Gly Met
            100                 105                 110

Lys Asn Val Gly Glu Tyr Leu His Ser Lys Asn Leu Leu Phe Gly Ile
        115                 120                 125

Tyr Leu Asp Tyr Gly Thr Leu Thr Cys Glu Gly Tyr Pro Gly Ser Met
130                 135                 140

Asn Tyr Leu Glu Leu Asp Ala Arg Ser Ile Ala Glu Trp Lys Val Asp
145                 150                 155                 160

Tyr Val Lys Met Asp Gly Cys Tyr Ser Leu Pro Asn Ile Gln Pro Glu
                165                 170                 175

Gly Tyr Glu Asn Phe Ser Arg Leu Leu Asn Thr Thr Gly Arg Pro Met
            180                 185                 190

Val Phe Ser Cys Ser Tyr Pro Ala Tyr Ile Ser Trp Ile Asn Asn Ile
        195                 200                 205

Lys Leu Ile Asp Trp Asn Arg Leu Lys Lys Asn Cys Asn Leu Trp Arg
210                 215                 220

Val Leu Gly Asp Ile Gln Asp Ser Leu Ser Ser Val Val Ser Ile Ile
225                 230                 235                 240

Lys Cys Leu

<210> SEQ ID NO 16
<211> LENGTH: 592
<212> TYPE: PRT
<213> ORGANISM: Paenibacillus polymyxa

<400> SEQUENCE: 16

Met Lys Lys Val Trp Phe Ser Leu Leu Gly Gly Ala Met Leu Leu Gly
1               5                   10                  15

Ser Val Ala Ser Gly Ala Ser Ala Glu Ser Ser Val Ser Gly Pro Ala
            20                  25                  30

Gln Leu Thr Pro Thr Phe His Ala Glu Gln Trp Lys Ala Pro Ser Ser
        35                  40                  45

Val Ser Gly Asp Asp Ile Val Trp Ser Tyr Leu Asn Arg Gln Lys Lys
50                  55                  60

Ser Leu Leu Gly Val Asp Ser Ser Val Arg Glu Gln Phe Arg Ile
65                  70                  75                  80

Val Asp Arg Thr Ser Asp Lys Ser Gly Val Ser His Tyr Arg Leu Lys
                85                  90                  95

Gln Tyr Val Asn Gly Ile Pro Val Tyr Gly Ala Glu Gln Thr Ile His
            100                 105                 110

Val Gly Lys Ser Gly Glu Val Thr Ser Tyr Leu Gly Ala Val Ile Asn
        115                 120                 125

Glu Asp Gln Gln Glu Ala Thr Gln Gly Thr Thr Pro Lys Ile Ser
130                 135                 140

Ala Ser Glu Ala Val Tyr Thr Ala Tyr Lys Glu Ala Ala Arg Ile
145                 150                 155                 160

Glu Ala Leu Pro Thr Ser Asp Asp Thr Ile Ser Lys Asp Ala Glu Glu
                165                 170                 175

Pro Ser Ser Val Ser Lys Asp Thr Tyr Ala Glu Ala Ala Asn Asn Asp
            180                 185                 190

Lys Thr Leu Ser Val Asp Lys Asp Glu Leu Ser Leu Asp Lys Ala Ser
        195                 200                 205

Val Leu Lys Asp Ser Lys Ile Glu Ala Val Glu Ala Glu Lys Ser Ser
210                 215                 220
```

```
Ile Ala Lys Ile Ala Asn Leu Gln Pro Glu Val Asp Pro Lys Ala Glu
225                 230                 235                 240

Leu Tyr Tyr Tyr Pro Lys Gly Asp Asp Leu Leu Val Tyr Val Thr
            245                 250                 255

Glu Val Asn Val Leu Glu Pro Ala Pro Leu Arg Thr Arg Tyr Ile Ile
            260                 265                 270

Asp Ala Asn Asp Gly Ser Ile Val Phe Gln Tyr Asp Ile Ile Asn Glu
            275                 280                 285

Ala Thr Gly Thr Gly Lys Gly Val Leu Gly Asp Ser Lys Ser Phe Thr
            290                 295                 300

Thr Thr Ala Ser Gly Ser Ser Tyr Gln Leu Lys Asp Thr Thr Arg Gly
305                 310                 315                 320

Asn Gly Ile Val Thr Tyr Thr Ala Ser Asn Arg Gln Ser Ile Pro Gly
            325                 330                 335

Thr Leu Leu Thr Asp Ala Asp Asn Val Trp Asn Asp Pro Ala Gly Val
            340                 345                 350

Asp Ala His Ala Tyr Ala Ala Lys Thr Tyr Asp Tyr Tyr Lys Ser Lys
            355                 360                 365

Phe Gly Arg Asn Ser Ile Asp Gly Arg Gly Leu Gln Leu Arg Ser Thr
            370                 375                 380

Val His Tyr Gly Ser Arg Tyr Asn Asn Ala Phe Trp Asn Gly Ser Gln
385                 390                 395                 400

Met Thr Tyr Gly Asp Gly Asp Gly Ser Thr Phe Ile Ala Phe Ser Gly
            405                 410                 415

Asp Pro Asp Val Val Gly His Glu Leu Thr His Gly Val Thr Glu Tyr
            420                 425                 430

Thr Ser Asn Leu Glu Tyr Tyr Gly Glu Ser Gly Ala Leu Asn Glu Ala
            435                 440                 445

Phe Ser Asp Val Ile Gly Asn Asp Ile Gln Arg Lys Asn Trp Leu Val
            450                 455                 460

Gly Asp Asp Ile Tyr Thr Pro Asn Ile Ala Gly Asp Ala Leu Arg Ser
465                 470                 475                 480

Met Ser Asn Pro Thr Leu Tyr Asp Gln Pro Asp His Tyr Ser Asn Leu
            485                 490                 495

Tyr Lys Gly Ser Ser Asp Asn Gly Gly Val His Thr Asn Ser Gly Ile
            500                 505                 510

Ile Asn Lys Ala Tyr Tyr Leu Leu Ala Gln Gly Gly Thr Phe His Gly
            515                 520                 525

Val Thr Val Asn Gly Ile Gly Arg Asp Ala Ala Val Gln Ile Tyr Tyr
530                 535                 540

Ser Ala Phe Thr Asn Tyr Leu Thr Ser Ser Asp Phe Ser Asn Ala
545                 550                 555                 560

Arg Ala Ala Val Ile Gln Ala Ala Lys Asp Leu Tyr Gly Ala Asn Ser
            565                 570                 575

Ala Glu Ala Thr Ala Ala Ala Lys Ser Phe Asp Ala Val Gly Val Asn
            580                 585                 590

<210> SEQ ID NO 17
<211> LENGTH: 504
<212> TYPE: PRT
<213> ORGANISM: Serratia liquefaciens
```

<400> SEQUENCE: 17

```
Met Ser Ile Cys Leu Ile Glu Asn Asn Gln Leu Met Ser Gly Ile Glu
1               5                   10                  15

Pro Met Gln Ser Thr Lys Lys Ala Ile Glu Ile Thr Glu Ser Ser Leu
            20                  25                  30

Ala Ala Ala Gly Ser Gly Tyr Asn Ala Val Asp Asp Leu Leu His Tyr
        35                  40                  45

His Glu Arg Gly Asn Gly Ile Gln Val Asn Gly Lys Asp Ser Phe Ser
    50                  55                  60

Thr Glu Gln Ala Gly Leu Phe Ile Thr Arg Glu Asn Gln Thr Trp Asn
65                  70                  75                  80

Gly Tyr Lys Val Phe Gly Gln Pro Val Lys Leu Thr Phe Ser Phe Pro
                85                  90                  95

Asp Tyr Lys Phe Ser Ser Thr Asn Val Ala Gly Asp Thr Gly Leu Ser
            100                 105                 110

Lys Phe Ser Ala Glu Gln Gln Gln Ala Lys Leu Ser Leu Gln Ser
        115                 120                 125

Trp Ser Asp Val Ala Asn Ile Thr Phe Thr Glu Val Gly Ala Gly Gln
130                 135                 140

Lys Ala Asn Ile Thr Phe Gly Asn Tyr Ser Gln Asp Arg Pro Gly His
145                 150                 155                 160

Tyr Asp Tyr Asp Thr Gln Ala Tyr Ala Phe Leu Pro Asn Thr Ile Tyr
                165                 170                 175

Gln Gly Gln Asn Leu Gly Gly Gln Thr Trp Tyr Asn Val Asn Gln Ser
            180                 185                 190

Asn Val Lys His Pro Ala Ser Glu Asp Tyr Gly Arg Gln Thr Phe Thr
        195                 200                 205

His Glu Ile Gly His Ala Leu Gly Leu Ser His Pro Gly Asp Tyr Asn
    210                 215                 220

Ala Gly Glu Gly Asn Pro Thr Tyr Arg Asp Ala Ser Tyr Ala Glu Asp
225                 230                 235                 240

Thr Arg Glu Phe Ser Leu Met Ser Tyr Trp Ser Glu Thr Asn Thr Gly
                245                 250                 255

Gly Asp Asn Gly Gly His Tyr Ala Ala Ala Pro Leu Leu Asp Asp Ile
            260                 265                 270

Ser Ala Ile Gln His Leu Tyr Gly Ala Asn Leu Thr Thr Arg Thr Gly
        275                 280                 285

Asp Thr Val Tyr Gly Phe Asn Ser Asn Thr Gly Arg Asp Phe Leu Ser
    290                 295                 300

Thr Thr Ser Asn Ser Gln Lys Val Ile Phe Ala Ala Trp Asp Ala Gly
305                 310                 315                 320

Gly Asn Asp Thr Phe Asp Phe Ser Gly Tyr Thr Ala Asn Gln Arg Ile
                325                 330                 335

Asn Leu Asn Glu Lys Ser Phe Ser Asp Val Gly Gly Leu Lys Gly Asn
            340                 345                 350

Val Ser Ile Ala Ala Gly Val Thr Ile Glu Asn Ala Ile Gly Gly Ser
        355                 360                 365

Gly Asn Asp Val Ile Val Gly Asn Ala Ala Asn Val Leu Lys Gly
    370                 375                 380

Gly Ala Gly Asn Asp Val Leu Phe Gly Gly Gly Ala Asp Glu Leu
385                 390                 395                 400
```

```
Trp Gly Gly Ala Gly Lys Asp Thr Phe Val Phe Ser Ala Val Ser Asp
                405                 410                 415

Ser Ala Pro Gly Ala Ser Asp Trp Ile Lys Asp Phe Gln Lys Gly Ile
            420                 425                 430

Asp Lys Ile Asp Leu Ser Phe Phe Asn Gln Gly Ala Gln Gly Gly Asp
                435                 440                 445

Gln Ile His Phe Val Asp His Phe Ser Gly Ala Ala Gly Glu Ala Leu
        450                 455                 460

Leu Ser Tyr Asn Ala Ser Asn Asn Val Ser Asp Leu Ala Leu Asn Ile
465                 470                 475                 480

Gly Gly His Gln Ala Pro Asp Phe Leu Val Lys Ile Val Gly Gln Val
                485                 490                 495

Asp Val Ala Thr Asp Phe Ile Val
                500
```

<210> SEQ ID NO 18
<211> LENGTH: 369
<212> TYPE: PRT
<213> ORGANISM: Aspergillus niger

<400> SEQUENCE: 18

```
Met Ser Ala Arg Asn Asn His Thr Tyr Thr Phe Ile Gln Pro Gln Ile
1               5                   10                  15

Leu Gln His Ile Ser Thr Ser Pro Asn Ala Ser Ser Lys Ala Arg Arg
            20                  25                  30

Ala Ala Thr Arg Thr Leu Thr Leu Ala Asn Glu Ile His Gln Thr Arg
        35                  40                  45

Val Ser Ser Ser Pro Tyr Ile Ser Leu Thr Ser His Ala Gln Ala Arg
    50                  55                  60

Glu Ile Tyr Asp Cys Arg Asn Lys Arg Gly Leu Pro Gly Leu Leu Val
65                  70                  75                  80

Arg Thr Glu Ser Ser Ser Ala Pro Thr Thr Gln Asp Asp Thr Val Asn
                85                  90                  95

His Val Tyr Asn Ser Phe Gly Ile Phe Leu His Phe Leu Ser Ser Val
                100                 105                 110

Leu Gly Arg Gln Ser Ile Asp Asn Asp Asn Leu Arg Leu Ile Gly Cys
            115                 120                 125

Leu His Tyr Asp Lys Asn Leu Asp Asn Ala Phe Trp Asn Gly Gln Glu
        130                 135                 140

Ile Ile Phe Gly Asp Gly Asp Gly Val Tyr Phe Ala Gly Phe Pro Lys
145                 150                 155                 160

Ser Leu Asp Val Val His Glu Leu Met His Gly Val Thr Asp His
                165                 170                 175

Thr Ala Gly Leu Leu Tyr Glu Gly Gln Ser Gly Ala Leu Ser Glu Ser
            180                 185                 190

Ile Ser Asp Val Phe Ala Cys Val Ile Glu Gln Trp Trp Arg Gly Gln
        195                 200                 205

Gly Val Glu Glu Ala Asp Trp Val Val Gly Arg Gly Val Phe Val Trp
    210                 215                 220

Pro Lys Gly Lys Lys Gly Ala Gly Ala Gly Ala Gly Glu Met Gly Leu
225                 230                 235                 240

Arg Ser Leu Lys Ala Pro Gly Thr Ala Tyr Asp Asp Pro Val Leu Gly
                245                 250                 255
```

```
Arg Asp Gly Gln Pro Ser His Met Lys Glu Leu Val Cys Thr Glu Glu
            260                 265                 270

Asp Asn Gly Gly Val His Trp Asn Ser Gly Ile Pro Ser His Ala Phe
        275                 280                 285

Tyr Leu Cys Ala Val Glu Phe Gly Gly Arg Ser Trp Glu Lys Ala Ala
    290                 295                 300

Ile Val Trp Tyr Arg Ala Leu Leu Asp Pro Arg Val Glu Pro Asn Cys
305                 310                 315                 320

Ser Phe Gln Arg Phe Ala Ser Val Thr Val Asp Ile Ala Glu Ala Met
                325                 330                 335

Phe Gly Gly Glu Ala Gly Glu Val Val Lys Arg Ala Trp Val Ala Val
            340                 345                 350

Gly Val Glu Val Gly Met Val Leu Trp Thr Val Lys Gly Asp Thr Gly
        355                 360                 365

Cys

<210> SEQ ID NO 19
<211> LENGTH: 375
<212> TYPE: PRT
<213> ORGANISM: Aspergillus terreus

<400> SEQUENCE: 19

Met Ala His Leu Cys Ala Phe Val Pro Gln Tyr Val Leu Glu Gly Ile
1               5                   10                  15

Val Glu Lys Gly Leu Ala Pro Glu His Ile Ile Asn Arg Cys Gln Ser
            20                  25                  30

Thr Ile Asp Lys Thr Thr Gln Leu Arg Asp Thr Arg Gly Arg His Val
        35                  40                  45

Gln Ser Ile Ala Ala Ala Gln Gln Arg Ile Ser Gln Gly Ile Ile
    50                  55                  60

Pro Pro Tyr Ile Leu Glu Ser Ile Ala Arg Asn Pro Ala Thr Glu Gln
65                  70                  75                  80

Gln Arg Glu Ala Ala Arg His Thr Leu Ala Leu Ser Thr Lys His Arg
                85                  90                  95

Thr Ala Ala Arg Gly Gly Lys Leu Leu Ser Glu Ala Glu Asp Pro
            100                 105                 110

Thr Asn Asn Ala Asn Glu Cys Tyr Asn Gly Leu Gly Lys Ser Tyr Asp
        115                 120                 125

Phe Tyr Phe Asn Phe Gln Arg Asn Ser Val Asp Asp Asn Gly Phe
    130                 135                 140

Glu Leu Asp Gly Phe Val His Ala Gly Asp Leu Tyr Asn Ala Tyr Trp
145                 150                 155                 160

Asp Gly Tyr Glu Leu Val Phe Gly Asp Gly Asp Gly Val Ile Phe Asp
                165                 170                 175

Gly Phe Thr Asp Glu Leu Asp Val Ile Gly His Glu Phe Ser His Gly
            180                 185                 190

Val Val Glu His Thr Ser Pro Leu Pro Tyr Ala Phe Gln Ser Gly Ala
        195                 200                 205

Leu Asn Glu Ser Leu Ala Asp Ala Phe Gly Val Met Ile Lys Gln Trp
    210                 215                 220

Gly Glu Gly Thr Pro Lys Thr Val Asp Gln Ala Asp Trp Leu Val Gly
225                 230                 235                 240

Glu Gly Ile Trp Ala Glu Gly Val Asn Gly Arg Ala Leu Arg Asp Met
                245                 250                 255
```

```
Ala Asn Pro Gly Thr Ala Tyr Asp Asp Pro Arg Val Gly Lys Asp Pro
            260                 265                 270

Gln Pro Ala His Trp Lys Asp Phe Lys Lys Leu Ser Ala Ser Asp Asp
            275                 280                 285

Glu Gly Gly Val His Ile Asn Ser Gly Ile Pro Asn Arg Ala Phe Tyr
            290                 295                 300

Leu Ala Ala Thr Lys Ile Gly Gly Tyr Ala Trp Gly Ala Gly Ala
305                 310                 315                 320

Ile Trp Tyr Arg Ala Leu Ala Ser Gly Lys Leu Arg Lys Asp Gly Lys
                325                 330                 335

Ala Lys Phe Lys Asp Phe Ala Asp Leu Thr Ile Glu Asn Ala Gly Glu
            340                 345                 350

His Val Asp Lys Val Arg Glu Ala Trp Thr Leu Val Gly Tyr Pro Phe
            355                 360                 365

Ala Glu Glu Arg His Glu Leu
            370             375

<210> SEQ ID NO 20
<211> LENGTH: 319
<212> TYPE: PRT
<213> ORGANISM: Aspergillus kawachii

<400> SEQUENCE: 20

Met Thr Leu Leu Leu Asn Leu His Ala Leu Phe Thr Ala Ile Val Phe
1               5                   10                  15

Ala Asn Leu Ser Thr Arg Cys Ser Ala Leu Leu Ser Gly Arg Asp Phe
            20                  25                  30

Cys Ser Thr Pro Ala Pro Asp Glu Ser Leu Arg Ala Glu His Arg Arg
        35                  40                  45

Leu Tyr Asp Leu Gln Ala Gln Arg Gly Ser Thr Ala Glu Glu Ser Arg
    50                  55                  60

Glu Val Val Ser Met Ile Glu Ile Glu Thr Trp Phe His Ile Val Ser
65                  70                  75                  80

Ser Asn Glu Ala Ser Asn Ala Val Ser Asp Asp Met Ile Thr Ser Gln
                85                  90                  95

Leu Ser Tyr Leu Gln Lys Ala Tyr Glu Ser Ala Thr Ile Ser Tyr Arg
            100                 105                 110

Leu Glu Gly Ile Thr Arg His Ile Asn Asp Ser Trp Ala Arg Asn Asp
        115                 120                 125

Asp Glu Leu Gly Met Lys Asn Ala Leu Arg Arg Gly Ile Tyr Ser Thr
    130                 135                 140

Leu Asn Val Tyr Phe Gln Thr Asp Leu Gln Ala Ser Ser Asp Asp Thr
145                 150                 155                 160

Ser Arg Gly Phe Pro Tyr Asn Gly Asn Arg Arg Thr Asp Val Ser Gly
                165                 170                 175

Gln Ser Ser Thr Thr Val Leu Gly Phe Cys Thr Leu Pro Asp Pro Ser
            180                 185                 190

Val Asn Ser Ser Pro Arg Ser Ser Tyr Ile Lys Asp Gly Cys Asn
        195                 200                 205

Val Leu Ala Asp Thr Met Pro Gly Gly Ser Leu Ala Gln Tyr Asn Gln
    210                 215                 220

Gly Gly Thr Ala Val His Glu Val Gly His Trp Asn Gly Leu Leu His
225                 230                 235                 240
```

```
Thr Phe Glu Gly Glu Ser Cys Ser Pro Asp Asn Glu Gly Asp Tyr Ile
                245                 250                 255

Asp Asp Thr Pro Glu Gln Ser Glu Pro Thr Ser Gly Cys Pro Ala Glu
            260                 265                 270

Lys Asp Ser Cys Pro Asp Leu Pro Gly Leu Asp Ala Ile His Asn Phe
        275                 280                 285

Met Asp Tyr Ser Ser Asp Cys Tyr Glu Ser Phe Thr Pro Asp Gln
    290                 295                 300

Ala Glu Arg Met Arg Ser Met Trp Ser Ala Met Arg Glu Gly Lys
305                 310                 315

<210> SEQ ID NO 21
<211> LENGTH: 318
<212> TYPE: PRT
<213> ORGANISM: Aspergillus oryzae

<400> SEQUENCE: 21

Met Ser His Phe Pro Thr Leu His Ile Leu Ile Val Ile Ala Asn
1               5                   10                  15

Leu Gln Ile Gln Cys Phe Ala Phe Val Ser Gln Ser Arg Gly Phe Cys
                20                  25                  30

Ala Thr Gly Pro Pro Thr Glu Ser Leu Lys Ala Glu Tyr Arg Arg Leu
            35                  40                  45

Ser Ala Leu Gly Ser Gln Ser Tyr Asn Pro Val Asp Ser Glu Ser Arg
        50                  55                  60

Ala Ala Ile Thr Pro Ile Val Ile Asp Thr Trp Phe His Ile Thr
65                  70                  75                  80

Gly Glu Ala Gly Thr Glu Leu Ile Ser Asp Glu Met Ile Ala Asp Gln
                85                  90                  95

Leu Ser Tyr Leu Gln Asn Ala Tyr Trp Asn Ala Thr Ile Ser Tyr Arg
            100                 105                 110

Leu Gln Gly Val Thr Arg Ser Ala Asn Asp Thr Trp Ala Arg Asn Glu
        115                 120                 125

Asp Glu Met Ala Met Lys Thr Val Leu Arg Arg Gly Ser Tyr Arg Thr
130                 135                 140

Leu Asn Val Tyr Phe His Thr Asp Leu Gln Ala Ser Pro Asn Ala Gly
145                 150                 155                 160

Ala Arg Ala Phe Asp Ile Val Arg Arg Glu Leu Gly Val Ser Gln Gln
                165                 170                 175

Gln Pro Thr Ser Met Leu Gly Phe Cys Thr Leu Pro Asp Pro Ser Ile
            180                 185                 190

Asn Ala Ser Ser Pro Pro Ser Thr Tyr Ile Lys Asp Gly Cys Asn Val
        195                 200                 205

Leu Ala Glu Thr Met Pro Gly Gly Ser Leu Ala His Tyr Asn Arg Gly
210                 215                 220

Gly Thr Ala Ile His Glu Ile Gly His Trp Asn Gly Leu Leu His Thr
225                 230                 235                 240

Phe Glu Gly Glu Ser Cys Ser Asp Asn Glu Gly Asp Phe Ile Ala
                245                 250                 255

Asp Thr Pro Gln Gln Ser Lys Pro Thr Glu Gly Cys Pro Ala Gln Lys
            260                 265                 270

Asp Ser Cys Pro Glu Leu Pro Gly Phe Asp Ala Ile His Asn Phe Met
        275                 280                 285
```

```
Asp Tyr Ser Ser Asp Glu Cys Tyr Asp Ser Phe Thr Pro Asp Gln Val
        290                 295                 300

Ser Arg Met Arg Ser Met Trp Phe Ala Met Arg Asp Gly Lys
305                 310                 315

<210> SEQ ID NO 22
<211> LENGTH: 311
<212> TYPE: PRT
<213> ORGANISM: Penicillium roqueforti

<400> SEQUENCE: 22

Met Val Cys His Ser Phe Phe Gln Leu Val Ile Phe Ile Thr Val Phe
1               5                   10                  15

Leu Gln Ala Trp Cys Ser Pro Phe Ala Leu Gln Lys Arg Gly Ala Cys
            20                  25                  30

Ala Thr Glu Asp Pro Gly Ala Asn Phe Leu His Glu Val Arg Arg Leu
        35                  40                  45

Gln Ser Asp Glu Ala Asp Leu Ala Ile Ser Gln Ala Arg Lys Ala Pro
    50                  55                  60

Ile Glu Ile Glu Thr Trp Phe His Ile Ile Ser Ser Lys Ser Glu Ser
65                  70                  75                  80

Thr Gln Val Thr Asp Asn Met Ile Asn Ser Gln Phe Ser Ile Leu Gln
                85                  90                  95

Gln Ser Tyr Ala Asp Ser Gly Ile Ser Tyr Arg Leu Gln Gly Val Thr
            100                 105                 110

Arg Asn Val Asn Asp Lys Trp Ala Ser Asn Ala Asp Asp Thr Ala Met
        115                 120                 125

Lys Thr Thr Leu Arg Lys Gly Ser Tyr Arg Thr Leu Asn Val Tyr Phe
    130                 135                 140

Gln Thr Asp Leu Gln Ala Ser Pro Glu Gln Ala Gly Arg Ala Phe Gly
145                 150                 155                 160

His Arg Gly Ala Val Thr Asn Asn Asp Leu Ala Ser Ser Val Leu Gly
                165                 170                 175

Phe Cys Thr Leu Pro Asp Pro Ser Val Asn Ala Ser Ser Pro Ala Ser
            180                 185                 190

Gln Tyr Ile Lys Asp Gly Cys Asn Val Leu Ala Lys Thr Met Pro Gly
        195                 200                 205

Gly Ser Leu Asp Leu Tyr Asn Arg Gly Gly Thr Ala Ile His Glu Ile
    210                 215                 220

Gly His Trp Asn Gly Leu Leu His Thr Phe Gln Gly Glu Ser Cys Ser
225                 230                 235                 240

Val Asp Asn Pro Gly Asp His Ile Ser Asp Thr Pro Gln Gln Ser Thr
                245                 250                 255

Pro Thr Asp Gly Cys Pro Asp Gln Lys Asp Ser Cys Pro Asp Ser Pro
            260                 265                 270

Gly Leu Asp Ala Val His Asp Phe Met Asp Tyr Ser Ser Asp Val Cys
        275                 280                 285

Tyr Glu Arg Phe Thr Pro Gly Gln Gly Glu Arg Met Arg Ser Met Trp
    290                 295                 300

Ile Ser Met Arg Glu Gly Lys
305                 310

<210> SEQ ID NO 23
<211> LENGTH: 5
<212> TYPE: PRT
```

```
-continued

<213> ORGANISM: Artificial Sequence
<220> FEATURE:
<223> OTHER INFORMATION: Sequence motif
<220> FEATURE:
<221> NAME/KEY: misc_feature
<222> LOCATION: (3)..(4)
<223> OTHER INFORMATION: Xaa can be any naturally occurring amino acid

<400> SEQUENCE: 23

His Glu Xaa Xaa His
1               5
```